US011924941B2

United States Patent
Takagimoto et al.

(10) Patent No.: US 11,924,941 B2
(45) Date of Patent: Mar. 5, 2024

(54) LIGHT EMISSION CONTROL SYSTEM, LIGHT EMISSION SYSTEM, LIGHT EMISSION CONTROL DEVICE, AND LIGHT EMISSION DEVICE

(71) Applicant: Rohm Co., Ltd., Kyoto (JP)

(72) Inventors: Shinsuke Takagimoto, Kyoto (JP); Akira Aoki, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 94 days.

(21) Appl. No.: 17/774,316

(22) PCT Filed: Sep. 25, 2020

(86) PCT No.: PCT/JP2020/036424
§ 371 (c)(1),
(2) Date: May 4, 2022

(87) PCT Pub. No.: WO2021/106344
PCT Pub. Date: Jun. 3, 2021

(65) Prior Publication Data
US 2022/0388446 A1  Dec. 8, 2022

(30) Foreign Application Priority Data

Nov. 26, 2019 (JP) .................................. 2019-213370

(51) Int. Cl.
*H05B 45/48* (2020.01)
*H05B 47/16* (2020.01)
(Continued)

(52) U.S. Cl.
CPC ............. *H05B 45/48* (2020.01); *H05B 47/16* (2020.01); *H05B 47/165* (2020.01); *H05B 47/20* (2020.01); *B60Q 1/381* (2022.05); *F21Y 2115/10* (2016.08)

(58) Field of Classification Search
CPC ...... H05B 45/48; H05B 47/16; H05B 47/165; H05B 47/20; B60Q 1/381; F21Y 2115/10
See application file for complete search history.

(56) References Cited

U.S. PATENT DOCUMENTS 6,914,956 B2 * 7/2005 Kawasaki ............. G11C 19/00
377/68
9,109,888 B2 * 8/2015 Korekado ................ G01C 3/08
(Continued)

FOREIGN PATENT DOCUMENTS

JP    S-48113375    12/1973
JP    2008-091311    4/2008
(Continued)

OTHER PUBLICATIONS

International Search Report in International Appln. No. PCT/JP2020/036424, dated Oct. 27, 2020, 4 pages (with English Translation).

*Primary Examiner* — Mohamed Barakat
(74) *Attorney, Agent, or Firm* — Fish & Richardson P.C.

(57) ABSTRACT

In a first light emission control device, a clock signal is generated, and after a first driving sequence starts to be performed in which the respective states of light-emitting elements in a first light-emitting element array are sequentially switched synchronously with the clock signal, at a particular time point a characteristic of the clock signal is changed from a first characteristic to a second characteristic. After the change, in a second light emission control device, a second driving sequence is performed in which the respective states of light-emitting elements in a second light-emitting element array are sequentially switched synchronously with the clock signal.

22 Claims, 20 Drawing Sheets

(51) Int. Cl.
*H05B 47/165* (2020.01)
*H05B 47/20* (2020.01)
*B60Q 1/38* (2006.01)
*F21Y 115/10* (2016.01)

(56) References Cited

U.S. PATENT DOCUMENTS

| | | | |
|---|---|---|---|
| 2010/0117557 A1* | 5/2010 | Ohno | G03G 15/04045 |
| | | | 315/294 |
| 2012/0098451 A1* | 4/2012 | Okawa | H05B 47/185 |
| | | | 315/210 |
| 2016/0309552 A1* | 10/2016 | Kuerschner | H05B 47/16 |
| 2018/0054862 A1* | 2/2018 | Takagimoto | H05B 47/20 |
| 2021/0039550 A1 | 2/2021 | Miyashita et al. | |

FOREIGN PATENT DOCUMENTS

| | | |
|---|---|---|
| JP | 2019-057518 | 4/2019 |
| WO | WO 2019/208545 | 10/2019 |

* cited by examiner

FIG.5
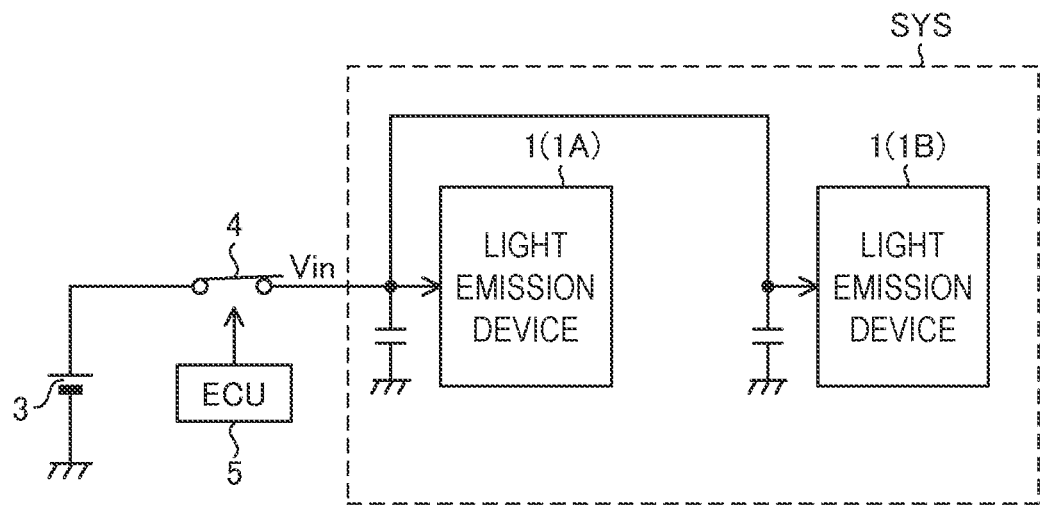
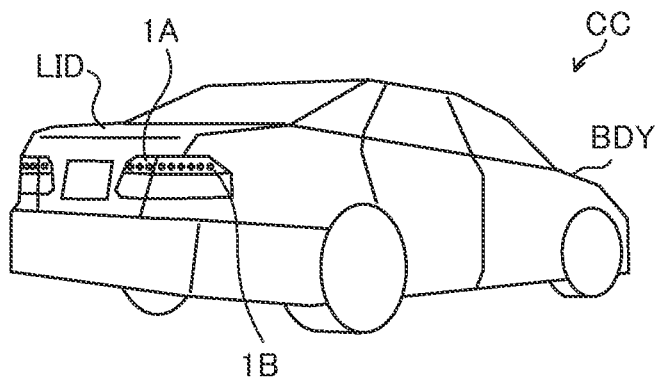
FIG.6A
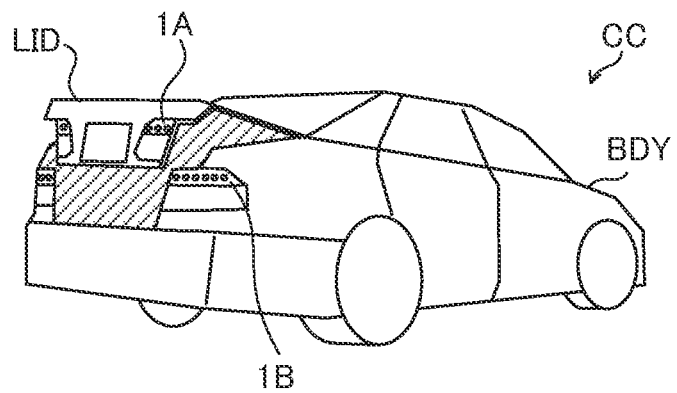
FIG.6B

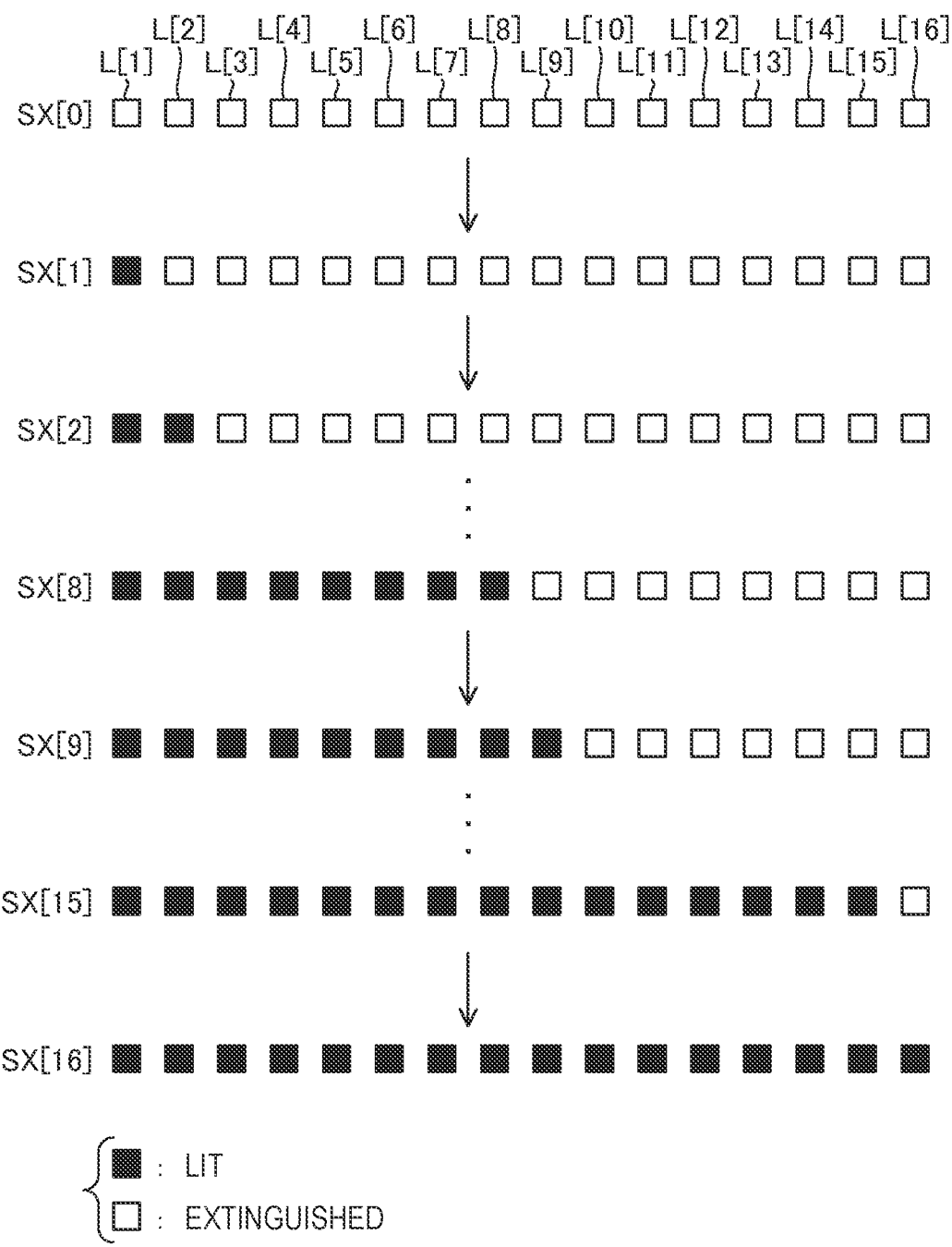

| CNT1 | CNT2 | CLOCK SIGNAL GENERATION | CLOCK SIGNAL CHARACTERISTIC | TRANSISTOR 141 |
|---|---|---|---|---|
| 1 | 0 | ○ | 1ST | SWITCHING |
| 1 | 1 | ○ | 2ND | SWITCHING |
| 0 | 0 | × | — | HELD OFF |
| 0 | 1 | × | — | HELD ON |

DUTY FACTOR : $\dfrac{t_H}{t_L + t_H}$

PULSE WIDTH : $t_H$

Sclk

| | WAVEFORM | DUTY FACTOR | PULSE WIDTH |
|---|---|---|---|
| 1ST CHARACTERISTIC | ⎍⎍ | SMALL (e.g., 20%) | SMALL (e.g., 200 μS) |
| 2ND CHARACTERISTIC | ⎍ | GREAT (e.g., 80%) | GREAT (e.g., 800 μS) |

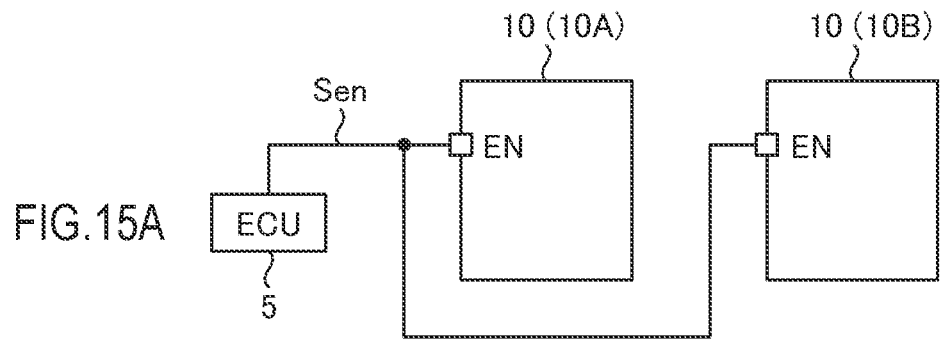
FIG.15A
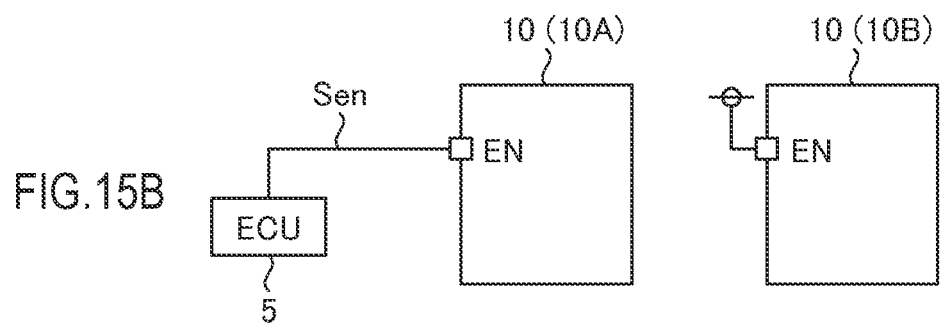
FIG.15B
FIG.16
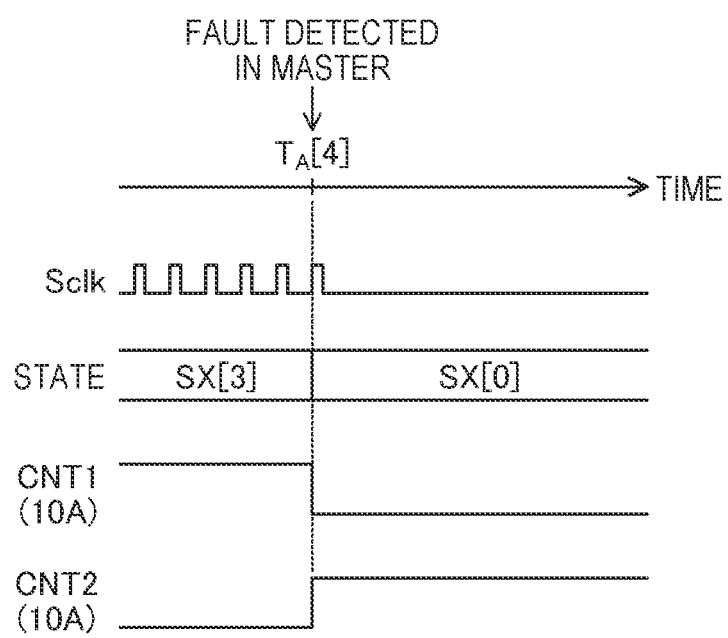

MASTER FAULT CONDITION
(AFTER FAULT DETECTION)

FIG.20 SLAVE FAULT CONDITION (AFTER FAULT DETECTION)

| $V_{SEL1}$ | $V_{SEL2}$ | $V_{SEL3}$ | LED | | | | | | | |
|---|---|---|---|---|---|---|---|---|---|---|
| | | | 1 | 2 | 3 | 4 | 5 | 6 | 7 | 8 |
| Lo | Lo | Lo | ○ | ○ | ○ | ○ | ○ | ○ | ○ | ○ |
| Hi | Lo | Lo | ○ | ○ | ○ | ○ | ○ | ○ | ○ | × |
| Lo | Hi | Lo | ○ | ○ | ○ | ○ | ○ | ○ | × | × |
| Hi | Hi | Lo | ○ | ○ | ○ | ○ | ○ | × | × | × |
| Lo | Lo | Hi | ○ | ○ | ○ | ○ | × | × | × | × |
| Hi | Lo | Hi | ○ | ○ | ○ | × | × | × | × | × |
| Lo | Hi | Hi | ○ | ○ | × | × | × | × | × | × |
| Hi | Hi | Hi | ○ | × | × | × | × | × | × | × |

LIGHT EMISSION CONTROL SYSTEM, LIGHT EMISSION SYSTEM, LIGHT EMISSION CONTROL DEVICE, AND LIGHT EMISSION DEVICE

TECHNICAL FIELD

The present disclosure relates to light emission control systems, light emission systems, light emission control devices, and light emission devices.

BACKGROUND ART

Today, direction indicator lamps (turn indicator lamps) for vehicle onboard applications are in practical use which employ sequential lighting of a plurality of light-emitting elements to make a light-emitting region appear to flow. Such direction indicator lamps are called sequential winkers or the like.

CITATION LIST

Patent Literature

Patent Document 1: JP-A-2008-091311

SUMMARY OF DISCLOSURE

Technical Problem

To control the lighting of a plurality of light-emitting elements, use is often made of a plurality of light emission control devices. For example, in a design where a light-emitting element array arranged on the trunk lid and a light-emitting element array arranged on the main body together constitute a rear direction indicator lamp, a light emission control device for driving and controlling the light-emitting element array on the trunk lid is arranged in the trunk lid, and a light emission control device for driving and controlling the light-emitting element array on the main body is arranged in the main body; the two light emission control devices operate in coordination to achieve, as a whole, sequential lighting whereby light appears to flow.

Sequential lighting proceeds as constant shifting from one lighting state to another (e.g., from a state where i light-emitting elements are lit to a state where (i+1) light-emitting elements are lit), and here the lighting state is expected to change at regular time intervals. Using a microprocessor permits easy control of timing, but leads to increased cost, and thus should better be avoided. It is also expected to use as few leads (cables) as possible among a plurality of light emission control devices. Inconveniently, known schemes leave room in terms of various requirements including those mentioned above (this will be discussed in detail later).

Instead of sequential lighting, sequential extinguishing may be used whereby the number of light-emitting elements lit is gradually reduced. Inconveniently, sequential extinguishing finds itself in similar circumstances as sequential lighting. While circumstances have been discussed in connection with sequential lighting and sequential extinguishing with focus on vehicle onboard applications, similar circumstances are encountered in any other applications where sequential lighting or sequential extinguishing is employed.

An object of the present disclosure is to provide a light emission control system, a light emission system, a light emission control device, and a light emission device that allow satisfactory sequential lighting or sequential extinguishing (e.g., that achieve, at low cost and in a wiring-saving manner, such control as to permit the lighting state to change at regular time intervals).

Solution to Problem

According to one aspect of the present disclosure, a light emission control system includes: a first light emission control device including a first controller configured to be able to perform control whereby to light or extinguish individually a plurality of light-emitting elements included in a first light-emitting element array, a clock generator configured to generate a clock signal with a variable characteristic, and a first clock terminal connected to a clock lead across which to transmit the clock signal; and a second light emission control device including a second controller configured to be able to perform control whereby to light or extinguish individually a plurality of light-emitting elements included in a second light-emitting element array, and a second clock terminal connected to the clock lead. The first controller is configured, when triggered by the fulfillment of a predetermined condition, to perform a first driving sequence in which the first controller sequentially switches between the lit and extinguished states the light-emitting elements in the first light-emitting element array synchronously with the clock signal. The clock generator is configured, at a particular time point after the start of the first driving sequence, to change the characteristic of the clock signal from a predetermined first characteristic to a predetermined second characteristic. The second controller is configured, after the characteristic of the clock signal received at the second clock terminal is changed from the first characteristic to the second characteristic, to perform a second driving sequence in which the second controller sequentially switches between the lit and extinguished states the light-emitting elements in the second light-emitting element array synchronously with the clock signal and to determine the time point at which to start the second driving sequence with reference to the time point at which the characteristic of the clock signal received at the second clock terminal is changed. (A first configuration.)

In the light emission control system of the first configuration described above, the first light emission control device may further include a first fault detector configured to detect a fault in any of the light-emitting elements in the first light-emitting element array based on the voltage at the connection node between the first light emission control device and each of the light-emitting elements in the first light-emitting element array. The first controller may be configured, when the first fault detector detects a fault in any of the light-emitting elements in the first light-emitting element array, to extinguish all the light-emitting elements in the first light-emitting element array with priority over the first driving sequence and hold the potential at the first clock terminal at a predetermined potential. (A second configuration.)

In the light emission control system of the second configuration described above, the second controller may be configured, when the potential at the second clock terminal is held for a predetermined length of time or longer, to extinguish all the light-emitting elements in the second light-emitting element array with priority over the second driving sequence. (A third configuration.)

In the light emission control system of the first configuration described above, the second light emission control device may further include a second fault detector configured to detect a fault in any of the light-emitting elements in the second light-emitting element array based on the voltage at the connection node between the second light emission control device and each of the light-emitting elements in the second light-emitting element array. The second controller may be configured, when the second fault detector detects a fault in any of the light-emitting elements in the second light-emitting element array, to extinguish all the light-emitting elements in the second light-emitting element array with priority over the second driving sequence and hold the potential at the second clock terminal at a predetermined potential. The first controller may be configured, when a potential at the first clock terminal is held for a predetermined length of time or longer, to extinguish all the light-emitting elements in the first light-emitting element array with priority over the first driving sequence. (A fourth configuration.)

In the light emission control system of any of the first to fourth configurations described above, before the fulfillment of the predetermined condition, all the light-emitting elements in the first and second light-emitting element arrays may be in the extinguished state. The first controller may be configured, after the fulfillment of the predetermined condition, in the first driving sequence, to sequentially increase the number of light-emitting elements lit in the first light-emitting element array at time intervals synchronous with the clock signal. The second controller may be configured, in the second driving sequence, to sequentially increase the number of light-emitting elements lit in the second light-emitting element array at time intervals synchronous with the clock signal. (A fifth configuration.)

In the light emission control system of any of the first to fourth configurations described above, with the fulfillment of the predetermined condition, the first and second controllers may light all the light-emitting elements in the first and second light-emitting element arrays. The first controller may be configured, after the fulfillment of the predetermined condition, in the first driving sequence, to sequentially reduce the number of light-emitting elements lit in the first light-emitting element array at time intervals synchronous with the clock signal. The second controller may be configured, in the second driving sequence, to sequentially reduce the number of light-emitting elements lit in the second light-emitting element array at time intervals synchronous with the clock signal. (A sixth configuration.)

In the light emission control system of any of the first to sixth configurations described above, the characteristic of the clock signal may be the duty factor or pulse width of the clock signal. (A seventh configuration.)

In the light emission control system of any of the first to seventh configurations described above, the predetermined condition may be fulfilled by the light emission control system being supplied with electric power. (An eighth configuration.)

In the light emission control system of any of the first to seventh configurations described above, the predetermined condition may be fulfilled by the light emission control system starting to be fed with a predetermined signal. (A ninth configuration.)

In the light emission control system of any of the first to ninth configurations described above, the first and second light emission control devices may be two light emission control devices that share a common configuration. The two light emission control devices may respectively have external terminals for setting. The two light emission control devices may be configured such that feeding different voltages to the respective external terminals for setting of the two light emission control devices causes one of the two light emission control devices operate as the first light emission control device and the other to operate as the second light emission control device. (A tenth configuration.)

According to another aspect of the present disclosure, a light emission system includes: a first light-emitting element array including a plurality of light-emitting elements; a second light-emitting element array including another plurality of light-emitting elements; a driving current feeder configured to be able to supply each of the light-emitting elements in the first and second light-emitting element arrays with a driving current for lighting it; and the light emission control system according to any of the first to tenth configurations described above. (An eleventh configuration.)

According to another aspect of the present disclosure, a light emission control device includes: a controller configured to be able to perform control whereby to light or extinguish individually a plurality of light-emitting elements included in a light-emitting element array; a clock generator configured to be able to generate a clock signal with a variable characteristic; and a clock terminal. The light emission control device operates in either a first mode or a second mode. The controller and the clock generator are configured such that, in the first mode, in which the clock signal generated by the clock generator is fed to the clock terminal, the controller, when triggered by the fulfillment of a predetermined condition, performs a first driving sequence in which the controller sequentially switches between the lit and extinguished states the light-emitting elements in the light-emitting element array synchronously with the clock signal, and the clock generator, at a particular time point after the start of the first driving sequence, changes a characteristic of the clock signal from a predetermined first characteristic to a predetermined second characteristic; and in the second mode, in which the clock signal generated by the clock generator ceases to be fed to the clock terminal and another clock signal generated by another light emission control device is received at the clock terminal, the controller, after a characteristic of the other clock signal received at the clock terminal is changed from the first characteristic to the second characteristic, performs a second driving sequence in which the controller sequentially switches between the lit and extinguished states the light-emitting elements in the light-emitting element array synchronously with the other clock signal, and determines the time point at which to start the second driving sequence with reference to the time point at which the characteristic of the other clock signal received at the clock terminal is changed. (A twelfth configuration.)

The light emission control device of the twelfth configuration described above may further include a fault detector configured to detect a fault in any of the light-emitting elements in the light-emitting element array based on the voltage at the connection node between the light emission control device and each of the light-emitting elements in the light-emitting element array. The controller may be configured such that, in the first mode, when the fault detector detects a fault in any of the light-emitting elements in the light-emitting element array, the controller extinguishes all the light-emitting elements in the light-emitting element array with priority over the first driving sequence and holds the potential at the clock terminal at a predetermined potential. (A thirteenth configuration.)

In the light emission control device of the thirteenth configuration described above, the controller may be configured, in the second mode, when the potential at the clock terminal is held for a predetermined length of time or longer, to extinguish all the light-emitting elements in the light-emitting element array with priority over the second driving sequence. (A fourteenth configuration.)

The light emission control device of the twelfth configuration described above may further include a fault detector configured to detect a fault in any of the light-emitting elements in the light-emitting element array based on the voltage at the connection node between the light emission control device and each of the light-emitting elements in the light-emitting element array. The controller may be configured such that, in the second mode, when the fault detector detects a fault in any of the light-emitting elements in the light-emitting element array, the controller extinguishes all the light-emitting elements in the light-emitting element array with priority over the second driving sequence and holds the potential at the clock terminal at a predetermined potential; and, in the first mode, when the potential at the clock terminal is held for a predetermined length of time or longer, the controller extinguishes all the light-emitting elements in the light-emitting element array with priority over the first driving sequence. (A fifteenth configuration.)

In the light emission control device of any of the twelfth to fifteenth configurations described above, before the fulfillment of the predetermined condition, all the light-emitting elements in the light-emitting element arrays may be in the extinguished state. The controller may be configured such that, in the first mode, after the fulfillment of the predetermined condition, in the first driving sequence, the controller sequentially increases the number of light-emitting elements lit in the light-emitting element array at time intervals synchronous with the clock signal; and, in the second mode, in the second driving sequence, the controller sequentially increases the number of light-emitting elements lit in the light-emitting element array at time intervals synchronous with the another clock signal. (A sixteenth configuration.)

In the light emission control device of any of the twelfth to fifteenth configurations described above, with the fulfillment of the predetermined condition, the controller may light all the light-emitting elements in the light-emitting element array. The controller may be configured such that, in the first mode, after the fulfillment of the predetermined condition, in the first driving sequence, the controller sequentially reduces the number of light-emitting elements lit in the light-emitting element array at time intervals synchronous with the clock signal; and, in the second mode, in the second driving sequence, the controller sequentially reduces the number of light-emitting elements lit in the light-emitting element array at time intervals synchronous with the another clock signal. (A seventeenth configuration.)

In the light emission control device of any of the twelfth to seventeenth configurations described above, the characteristic of the clock signal may be the duty factor or pulse width of the clock signal. The characteristic of the other clock signal may be the duty factor or pulse width of the other clock signal. (An eighteenth configuration.)

In the light emission control device of any of the twelfth to eighteenth configurations described above, the predetermined condition may be fulfilled by the light emission control device starting to be supplied with electric power. (A nineteenth configuration.)

In the light emission control device of any of the twelfth to eighteenth configurations described above, the predetermined condition may be fulfilled by the light emission control device being fed with a predetermined signal. (A twentieth configuration.)

The light emission control device of any of the twelfth to twentieth configurations described above may further include an external terminal for setting. The light emission control device may operate in either of the first and second modes in accordance with the voltage fed to the external terminal for setting. (A twenty-first configuration.)

According to another aspect of the present disclosure, a light emission device includes: a light-emitting element array including a plurality of light-emitting elements; a driving current feeder configured to be able to supply each of the light-emitting elements in the light-emitting element array with a driving current for lighting it; and the light emission control device of any of the twelfth to twenty-first configurations. (A twenty-second configuration.)

Advantageous Effects of Disclosure

According to the present disclosure, it is possible to provide a light emission control system, a light emission system, a light emission control device, and a light emission device that allow satisfactory sequential lighting or sequential extinguishing (e.g., that achieve, at low cost and in a wiring-saving manner, such control that the lighting state changes at regular time intervals).

BRIEF DESCRIPTION OF DRAWINGS

FIG. 5 is a diagram showing a relationship of the light emission system with an external device according to the first embodiment of the present disclosure.

FIGS. 6A and 6B are exterior views of a vehicle with a trunk closed and open, respectively, according to the first embodiment of the present disclosure.

FIG. 8 is a diagram showing a sequence of sequential lighting operation according to the first embodiment of the present disclosure.

FIGS. 15A and 15B are diagram showing a configuration with an enable signal introduced in it in Practical Example EX1_2 belonging to the first embodiment of the present disclosure.

FIG. 16 is a timing chart observed in a first master fault condition in Practical Example EX1_3 belonging to the first embodiment of the present disclosure.

DESCRIPTION OF EMBODIMENTS

Figure 1:
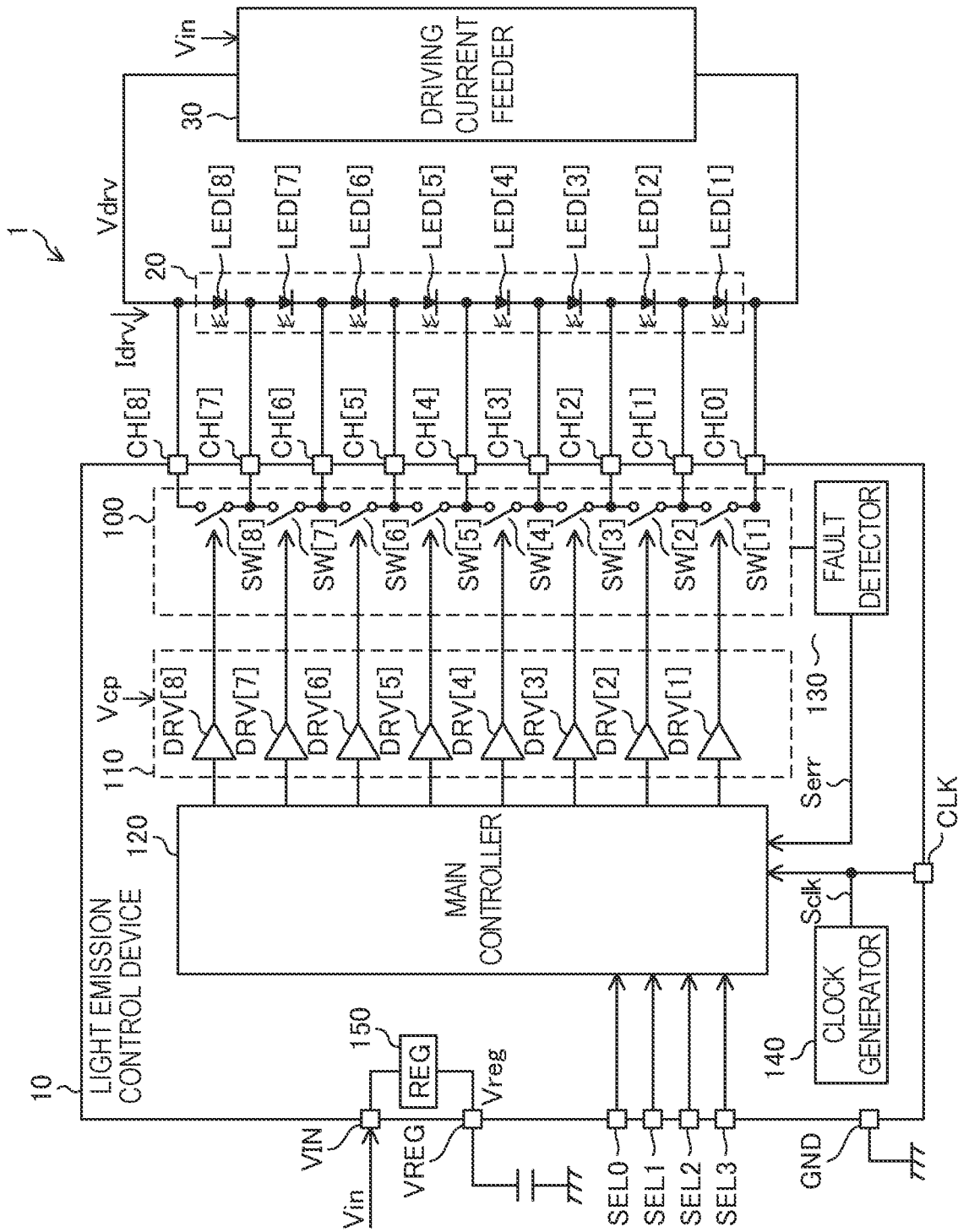
FIG. 1 is an overall configuration diagram of a light emission device according to a first embodiment of the present disclosure.

Hereinafter, examples of implementing the present disclosure will be described specifically with reference to the accompanying drawings. Among the different diagrams referred to in the course, the same parts are identified by the same reference signs, and in principle no overlapping description of the same parts will be repeated. In the present description, for the sake of simplicity, symbols and reference signs referring to information, signals, physical quantities, elements, parts, and the like are occasionally used with omission or abbreviation of the names of the information, signals, physical quantities, elements, parts, and the like corresponding to those symbols and reference signs. For example, the light emission control device (see FIG. 1) described later and identified by "10" is sometimes mentioned as the light emission control device 10 and is other times abbreviated to the device 10, all designations referring to the same entity.

First, some of the terms used to describe embodiments of the present disclosure will be defined. "Ground" refers to an electrically conductive part at a reference potential of 0 V (zero volts), or to a potential of 0 V itself. A potential of 0 V is occasionally referred to as a ground potential. In embodiments of the present disclosure, any voltage mentioned with no particular reference mentioned is a potential relative to the ground. "Level" denotes the level of a potential, and for any signal or voltage, "high level" has a higher potential than "low level". For any signal or voltage, its being at high level means its level being equal to high level, and its being at low level means its level being equal to low level. A level of a signal is occasionally referred to as a signal level, and a level of a voltage is occasionally referred to as a voltage level.

For a given signal or voltage, a transition from low level to high level is termed an up edge, and the time point of a transition from low level to high level is termed an up-edge time point. Likewise, for a given signal or voltage, a transition from high level to low level is termed a down edge, and the time point of a transition from high level to low level is termed a down-edge time point.

For any transistor configured as an FET (field-effect transistor), which can be a MOSFET, "on state" refers to a state where the drain-source channel of the transistor is conducting, and "off state" refers to a state where the drain-source channel of the transistor is not conducting (cut off). Similar definitions apply for any transistor that is not classified as an FET. Unless otherwise stated, any MOSFET can be understood to be an enhancement MOSFET. "MOSFET" is an abbreviation of "metal-oxide-semiconductor field-effect transistor".

Any switching element (switch element) can be configured with one or more FETs (field-effect transistors). When a given switching element is in the on state, the switching element conducts between two terminals; when a given switching element is in the off state, the switching element does not conduct between two terminals.

For any transistor or switching element, its switching from the off state to the on state is referred to as its being turned on, and its switching from the on state to the off state is referred to as its being turned off. For any transistor or switching element, a period in which it is in the on state is often referred to as the on period, and a period in which it is in the off state is often referred to as the off period. In the following description, for any transistor or switching element, its being in the on or off state is often referred to simply as its being on or off respectively.

For any signal that takes as its signal level high level or low level, the period in which the signal is at high level is referred to as the high-level period and the period in which the signal is at low level is referred to as the low-level period. The same applies to any voltage that takes as its voltage level high level or low level.

INDUSTRIAL APPLICABILITY

First Embodiment

A first embodiment of the present disclosure will be described. FIG. 1 is an overall configuration diagram of a light emission device 1 according to the first embodiment of the present disclosure. The light emission device 1 includes a light emission control device 10, a light-emitting element array 20, and a driving current feeder 30.

Figure 2:
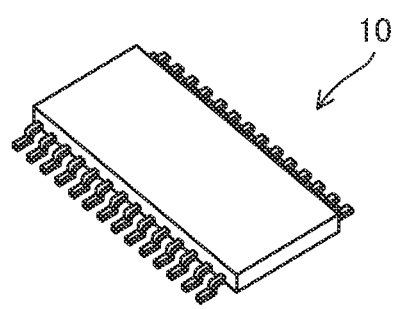
FIG. 2 is an exterior perspective view of the light emission device according to the first embodiment of the present disclosure.

The light emission control device 10 is a control device that operates by being supplied with a positive direct-current input voltage Vin so as to light or extinguish individually a plurality of light-emitting elements that constitute the light-emitting element array 20. As shown in FIG. 2, the light emission control device 10 is an electronic component (semiconductor device) formed by sealing a semiconductor integrated circuit in a casing (package) made of resin, and is formed by integrating on a semiconductor substrate the circuits that constitute the light emission control device 10. The casing of the light emission control device 10 has a plurality of external terminals formed so as to be exposed out of it. The plurality of external terminals include terminals CH[0] to CH[8], VIN, VREG, SEL0 to SEL3, CLK, and GND shown in FIG. 1, and also includes other terminals that are not shown in FIG. 1. It should be noted that the number of external terminals on the light emission control device 10 and the exterior appearance of the light emission control device 10 as they are shown in FIG. 2 are merely illustrative.

The light-emitting element array 20 is a light-emitting member composed of a plurality of light-emitting elements. Here, the light-emitting element array 20 is assumed to be composed of up to eight light-emitting elements; in the example in FIG. 1, the light-emitting element array 20 is composed of a total of eight light-emitting elements LED[1] to LED[8]. The light-emitting element array 20 may be composed of seven or less light-emitting elements, and this will be discussed later. In this embodiment, the light-emitting elements LED[1] to LED [8] are connected in series with each other. Each of these light-emitting elements may be a single light-emitting diode or a light-emitting diode aggregate formed by connecting together a plurality of light-emitting diodes in series or in parallel. In the following description, unless necessary, each light-emitting element is dealt with as a single diode. In the present description, a light-emitting element that is not emitting light is referred to as being non-light-emitting or extinguished. To convey the opposite of being extinguished, a light-emitting element that is emitting light is referred to as being lit. For a light-emitting element, its emitting light is synonymous with its being lit. This is true equally with light-emitting segments described later.

The driving current feeder 30 operates based on the input voltage Vin, and supplies the light-emitting element array 20 with a driving current Idrv for making the light-emitting elements in the light-emitting element array 20 emit light. Of the light-emitting elements LED[1] to LED[8], the light-emitting element LED[1] is connected at the lowest-potential position, and the light-emitting element LED[8] is connected at the highest-potential position. The cathode of the light-emitting element LED[i+1] is connected to the anode of the light-emitting element LED[i]. Here, i is any integer. The voltage that is supplied from the driving current feeder 30 to the anode of the light-emitting element LED[8] is referred to as the driving voltage Vdrv. As a result of a voltage being applied between the anode of the light-emitting element LED[8] and the cathode of the light-emitting element LED[1] by the driving current feeder 30, the driving current Idrv is supplied to the light-emitting element array 20. It should however be noted that, as will be described later, each light-emitting element is connected to a corresponding one of switch elements in a switch circuit 100 in parallel with it, and accordingly that the driving current Idrv passes through a parallel circuit of the light-emitting element array 20 and the switch circuit 100. Here, a configuration is assumed where the cathode of the light-emitting element LED[1] is not connected to the ground; instead, a configuration may be employed where the cathode of the light-emitting element LED[1] is connected to the ground The generation of the driving voltage Vdrv may be achieved in coordination with a circuit within the light emission control device 10. Here, it is assumed that the driving current feeder 30 generates the driving voltage Vdrv based on the input voltage Vin; instead, the driving current feeder 30 may be a circuit that generates the driving voltage Vdrv by being supplied as a supply voltage a voltage other than the input voltage Vin.

The light emission control device 10 includes a switch circuit 100, a driver circuit 110, a main controller 120, a fault detector 130, a clock generator 140, and an internal power supply circuit 150, and is provided with the plurality of external terminals mentioned above.

Of the plurality of external terminals mentioned above, the terminal CH[8] is connected to the anode of the light-emitting element LED[8], and the terminal CH[0] is connected to the cathode of the light-emitting element LED[1]. For any integer i that satisfies $1 \le i \le 7$, the terminal CH[i] is connected to the cathode of the light-emitting element LED[i+1] and to the anode of the light-emitting element LED[i]. The terminal VIN is suppled with the input voltage Vin. The terminal GND is connected to the ground. The functions of the terminals SEL0 to SEL3 and CLK will be described later.

The switch circuit 100 is composed of switch elements corresponding to a plurality of channels. Here, it is assumed that the switch circuit 100 is composed of switch elements corresponding to eight channels, and these will be referred to as the switch elements SW[1] to SW[8]. The switch element SW[i] corresponds to the light-emitting element LED[i], and is connected in parallel with the light-emitting element LED[i] via the corresponding external terminals.

Specifically, for any integer i that satisfies $1 \le i \le 8$, the switch element SW[i] is provided between the terminals CH[i] and CH[i−1]. For any integer i that satisfies $1 \le i \le 8$, when the switch element SW[i] is on, the terminals CH[i] and CH[i−1] are short-circuited together via the switch element SW[i] and the driving current Idrv ceases to pass through the light-emitting element LED[i], so that the light-emitting element LED[i] does not emit light. For any integer i that satisfies $1 \le i \le 8$, when the switch element SW[i] is off, the switch element SW[i] is open across its terminals and the driving current Idrv passes through the light-emitting element LED[i], so that the light-emitting element LED[i] emits light (needless to say, however, with the driving current feeder 30 not operating, the light-emitting element LED[i] does not emit light).

The driver circuit 110 is composed of drivers DRV[1] to DRV[8] that drives individually the switch elements SW[1] to SW[8] respectively under the control of the main controller 120. For any integer i, in accordance with the output signal of the driver DRV[i], the switch element SW[i] is kept on or off. It should be noted that the input voltage Vin is boosted by a charge pump circuit (not shown in FIG. 1), and based on the resulting boosted voltage Vcp, the drivers DRV[1] to DRV[8] drive the switch elements SW[1] to SW[8]. The switch element SW[i] can be configured with an N-channel MOSFET. In that case, the drain and source of the MOSFET as the switch element SW[i] are connected to the terminals CH[i] and CH[i−1] respectively, and the driver DRV[i] feeds the gate of the MOSFET as the switch element SW[i] with a gate signal for turning on and off the switch element SW[i].

The main controller 120 performs, as its main function, a driving sequence in which, using the driver circuit 110, it sequentially switches the switch elements SW[1] to SW[8] between the on and off states according to a predetermined pattern; the main controller 120 also comprehensively controls the operation of different blocks within the light emission control device 10. Through the driving sequence, the light-emitting elements LED[1] to LED[8] are sequentially switched between the lit and extinguished states. Thus the driving sequence can be understood as a sequence of operation for sequentially switching the light-emitting elements LED[1] to LED[8] between the lit and extinguished states.

The fault detector 130 detects a fault in the light-emitting elements LED[1] to LED[8] based on the voltages at the terminals CH[0] to CH[8] (i.e., the voltages at the connection nodes between the light emission control device 10 and the light-emitting elements LED[1] to LED[8]), and feeds a signal Serr indicating the result of the detection to the main controller 120. A fault in the light-emitting element LED[i] can be a short fault in which, irrespective of the state of the switch element SW[i], the light-emitting element LED[i] remains short-circuited between its anode and cathode or an open fault in which the light-emitting element LED[i] remains open between its anode and cathode.

The fault detector 130 can detect a short fault or open fault in the light-emitting element LED [i] based on the voltage between the terminals CH[i] and CH[i−1] with the switch element SW[i] off. Specifically, for example, if, with the switch element SW[i] off, the voltage between the terminals CH[i] and CH[i−1] is less than a predetermined short determination voltage $V_{SHORT}$, the light-emitting element LED[i] can be judged to have a short fault; if, with the switch element SW[i] off, the voltage between the terminals CH[i] and CH[i−1] is more than a predetermined open determination voltage $V_{OPEN}$, the light-emitting element LED[i] can be judged to have an open fault; otherwise the light-emitting element LED[i] can be judged to have no fault ($V_{SHORT}<V_{OPEN}$). The fault detector 130 can be configured with a window comparator for each channel.

The fault detector 130 feeds the main controller 120 with the signal Serr with the logic value "1" only when a fault is detected in any one or more of the light-emitting elements LED[1] to LED[8]; otherwise the fault detector 130 feeds the main controller 120 with the signal Serr with the logic value "0". On receiving the signal Serr with the logic value "1", the main controller 120 performs a predetermined fault handling process. The fault handling process includes a process of terminating the driving sequence being performed and a process of extinguishing all the light-emitting elements LED[1] to LED[8]. Turning on all the switch elements SW[1] to SW[8] permits all the light-emitting elements LED[1] to LED[8] to be extinguished.

The clock generator 140 generates a clock signal Sclk with a predetermined clock frequency. The clock signal Sclk is a rectangular-wave signal of which the signal level alternates between low and high levels. In a given light emission control device 10, the driving sequence mentioned above can be performed synchronously with a clock signal Sclk generated within the light emission control device 10, or can be performed synchronously with a clock signal Sclk fed from another light emission control device 10 (this will be described in detail later). In a given light emission control device 10, the clock signal Sclk generated within the light emission control device 10 can be fed out via the terminal CLK (this will be described in detail later).

The clock frequency can be set by use of an RC circuit composed of a resistor and a capacitor based on the time constant determined by the respective characteristics of the resistor and the capacitor, or can be set by use of a crystal oscillator. The components for determining the clock frequency may all or partly be provided as discrete components outside the light emission control device 10 to be externally connected to the light emission control device 10.

The internal power supply circuit 150 generates based on the input voltage Vin one or more internal supply voltages including an internal supply voltage Vreg (e.g., 3.3 V). The circuits, including the main controller 120, within the light emission control device 10 each operate by using an internal supply voltage generated by the internal power supply circuit 150. The internal supply voltage Vreg is applied to the terminal VREG, and between the terminal VREG and the ground, a capacitor is provided.

Figure 3:
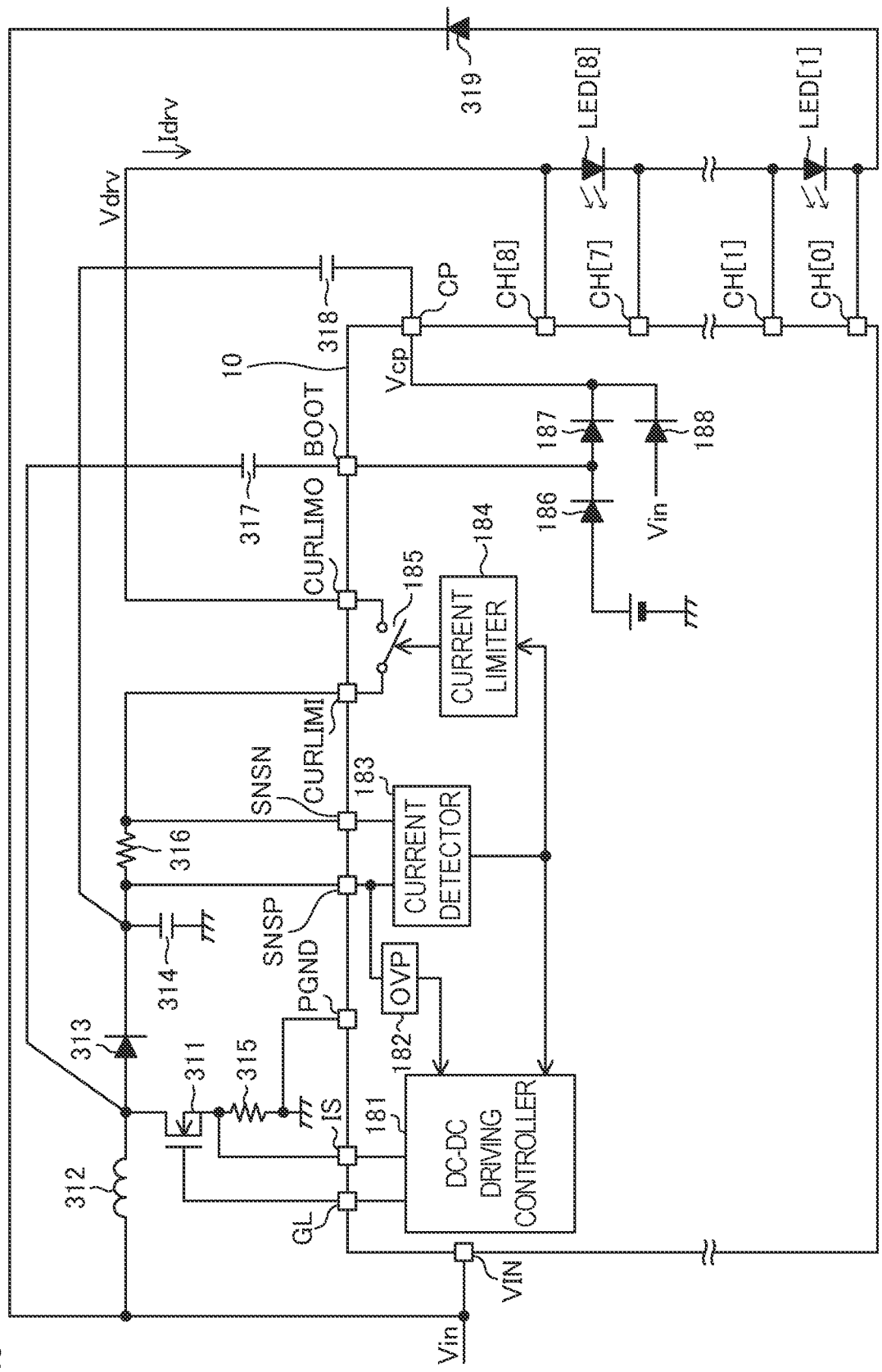
FIG. 3 is a diagram showing a configuration example of a driving current feeder according to the first embodiment of the present disclosure.

The driving current feeder 30 may be of any configuration so long as it can supply the driving current Idrv to the light-emitting elements; FIG. 3 shows one configuration example of the driving current feeder 30. In the configuration example in FIG. 3, the driving current feeder 30 includes a transistor 311 configured as an N-channel MOSFET, an inductor 312, a free-wheel diode 313, a smoothing capacitor 314, sense resistors 315 and 316, capacitors 317 and 318, and a diode 319. In the configuration example in FIG. 3, the light emission control device 10 is provided with a plurality of external terminals including terminals GL, IS, PGND, SNSP, SNSN, CURLIMI, CURLIMO, BOOT, and CP, and the light emission control device 10 includes a DC-DC driving controller 181, an overvoltage detector 182, a current detector 183, a current limiter 184, a switch element 185, and diodes 186 to 188.

The components shown in FIG. 3 are interconnected as follows. One terminal of the inductor 312 is connected to the terminal VIN and to the cathode of the diode 319. The other terminal of the inductor 312 is connected to the drain of the transistor 311, to the anode of the free-wheel diode 313, and to one terminal of the capacitor 317. The other terminal of the capacitor 317 is connected to the terminal BOOT. The source of the transistor 311 is connected to one terminal of the sense resistor 315 and to the terminal IS. The other terminal of the sense resistor 315 is connected to the ground and to the terminal PGND. The gate of the transistor 311 is connected to the terminal GL.

The cathode of the free-wheel diode 313 is connected via the smoothing capacitor 314 to the ground, and is also connected to one terminal of the sense resistor 316 and to the terminal SNSP. The other terminal of the sense resistor 316 is connected to the terminal SNSN and to the terminal CURLIMI. Within the light emission control device 10, the terminal CURLIMI is connected to one terminal of the switch element 185, and the terminal CURLIMO is connected to the other terminal of the switch element 185. The terminal CURLIMO is also connected to the terminal CH[8] and to the anode of the light-emitting element LED[8]. The anode of the diode 319 is connected to the terminal CH[0] and to the cathode of the light-emitting element LED[1]. Thus, with the required input voltage Vin supplied to the terminal VIN, switching the transistor 311 causes a voltage boosted from the input voltage Vin to appear at the cathode of the free-wheel diode 313; thus, with the switch element 185 on, the boosted voltage is applied as the driving voltage Vdrv to the anode of the light-emitting element LED[8], and now the driving current Idrv is ready to be supplied.

The cathode of the free-wheel diode 313 is connected via the capacitor 318 to the terminal CP. The anode of the diode 186 is fed with a positive direct-current voltage (which may be different from Vreg) generated in the internal power supply circuit 150. The anode of the diode 188 is fed with the input voltage Vin. The cathode of the diode 186 and the anode of the diode 187 are connected to the terminal BOOT, and the respective cathodes of the diodes 187 and 188 are connected to the terminal CP. These diodes 186 to 188 and the capacitors 317 and 318 constitute a charge pump circuit, which produces, through the switching of the transistor 311, the boosted voltage Vcp at the terminal CP.

The DC-DC driving controller 181 is connected to the terminals GL and IS, and switches the transistor 311 (i.e., turns it on and off alternately) by feeding the transistor 311 with a gate signal based on, for example, the voltage drop across the sense resistor 315. The DC-DC driving controller 181 is connected to the main controller 120 in FIG. 1, and these exchange the required signals with each other.

The overvoltage detector 182 is connected to the terminal SNSP. If the voltage at the terminal SNSP is equal to or more than a predetermined overvoltage threshold value, the overvoltage detector 182 judges the voltage at the terminal SNSP to be in an overvoltage state. If the voltage at the terminal SNSP is judged to be in an overvoltage state, the DC-DC driving controller 181 suspends the switching of the transistor 311 until the overvoltage state is eliminated. The overvoltage threshold value is given hysteresis.

The current detector 183 is connected to the terminals SNSP and SNSN. The current detector 183 detects the voltage between the terminals SNSP and SNSN (i.e., the voltage drop across the sense resistor 316) and thereby detects the magnitude of the current passing through the sense resistor 316 (i.e., the magnitude of the driving current Idrv). The result of the detection by the current detector 183 is fed to the DC-DC driving controller 181.

The current limiter 184 turns on or off the switch element 185 under the control of the DC-DC driving controller 181. The switch element 185 is on in principle; when the current detector 183 detects an overcurrent state where the magnitude of the driving current Idrv is equal to or more than a predetermined overcurrent threshold value, under the control of the DC-DC driving controller 181, the current limiter 184 turns off the switch element 185. The off state of the switch element 185 based on the detection of an overcurrent state may be kept for a predetermined time, or may be kept until the light emission control device 10 ceases to be supplied with the input voltage Vin.

Detection of an overvoltage state or an overcurrent state is irrelevant to the essence of the present disclosure; accordingly, in the following description, no consideration is given to an overvoltage state or an overcurrent state and, unless otherwise stated, the switch element 185 is assumed to be held on throughout.

[Light Emission System]

Figure 4:
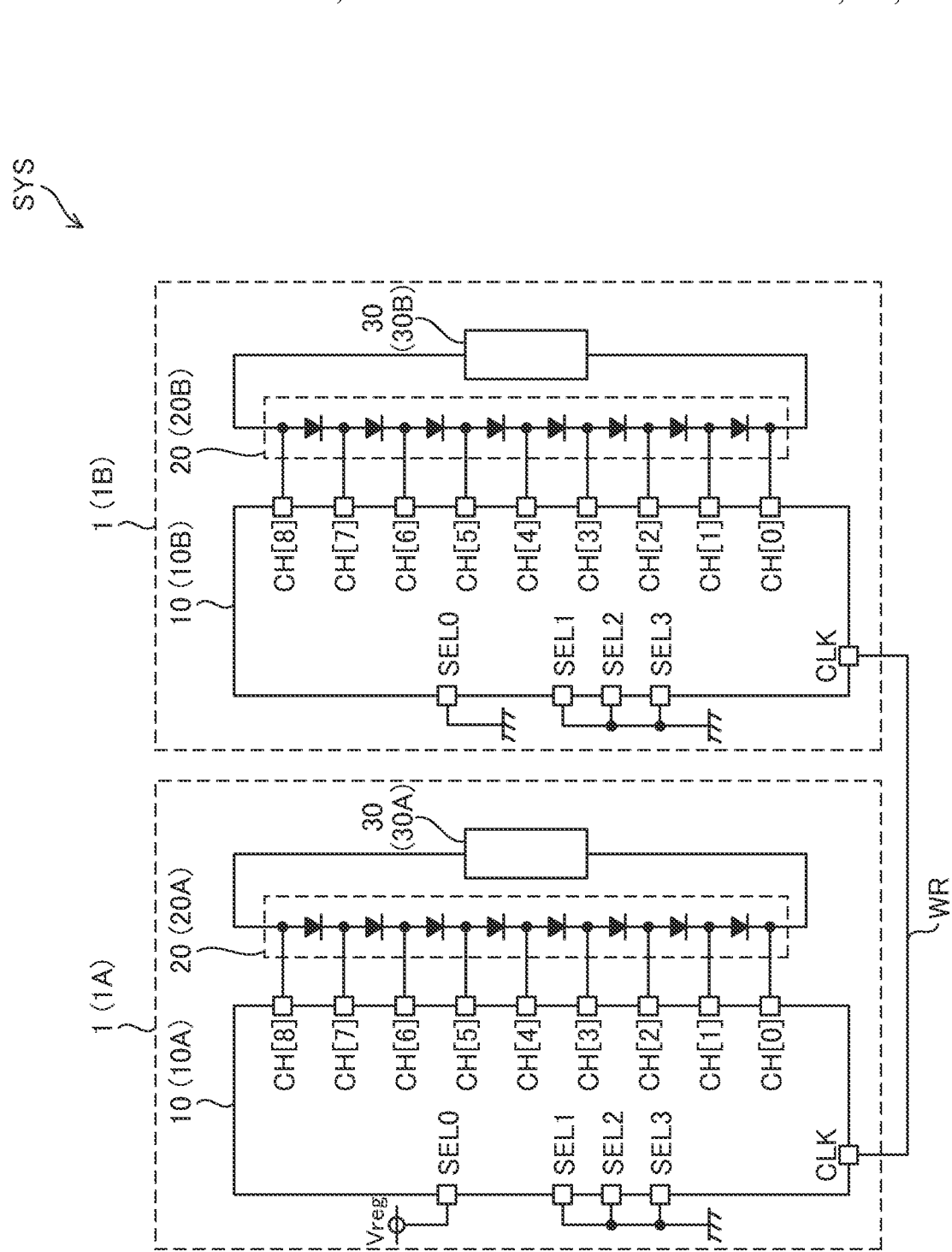
FIG. 4 is a configuration diagram of a light emission system according to the first embodiment of the present disclosure.

A plurality of light emission devices 1 each configured as described above can be used to build a light emission system. FIG. 4 shows the configuration of a light emission system SYS composed of two light emission devices 1. The two light emission devices 1 share a common ground potential. The two light emission devices 1 share a common configuration. The two light emission devices 1, however, may have different numbers of light-emitting elements (here the two are assumed to have the same number of light-emitting elements). At least the two light emission devices 1 have their respective light emission control devices 10 configured similarly (identically).

When a light emission control device 10 is mounted on a circuit board, the terminals SEL0 to SEL3 are individually connected to the terminal VREG or GND (see FIG. 1). As mentioned above, with the light emission control device 10 supplied with the input voltage Vin, the terminal VREG is fed with the voltage Vreg, which is a positive direct-current voltage. In the light emission system SYS in FIG. 4, of the two light emission devices 1, in one light emission device 1, the terminal SEL0 of the light emission control device 10 is connected to the terminal VREG (i.e., fed with the voltage Vreg) and, in the other light emission device 1, the terminal SEL0 of the light emission control device 10 is connected to the terminal GND (i.e., connected to the ground).

The light emission control device 10 having the terminal SEL0 connected to the terminal VERG (i.e., having the terminal SEL0 fed with a relatively high-level potential (voltage Vreg)) will be referred to specifically as the light emission control device 10A. The light emission control device 10 having the terminal SEL0 connected to the terminal GND (i.e., having the terminal SEL0 fed with a relatively low-level potential (ground potential)) will be referred to specifically as the light emission control device 10B. The light emission device 1 that includes the light emission control device 10A will be referred to specifically as the light emission device 1A, and the light-emitting element array 20 and the driving current feeder 30 in the light emission device 1A will occasionally be referred to specifically as the light-emitting element array 20A and the driving current feeder 30A respectively. Likewise, the light emission device 1 that includes the light emission control device 10B will be referred to specifically as the light emission device 1B, and the light-emitting element array 20 and the driving current feeder 30 in the light emission device 1B will occasionally be referred to specifically as the light-emitting element array 20B and the driving current feeder 30B respectively.

As described above, the terminal SEL0 serves as an external terminal for setting, and feeding the two terminals SEL0 of the two light emission control devices 10 with different voltages permits one of the two light emission control devices 10 to operate as the light emission control device 10A and the other to operate as the light emission control device 10B.

Each light emission control device 10 can operate in either a master mode or a slave mode. A light emission control device 10 having the terminal SEL0 fed with the voltage Vreg (i.e., the light emission control device 10A) operates in the master mode, and a light emission control device 10 having the terminal SEL0 fed with the ground potential (i.e., the light emission control device 10B) operates in the slave mode. Instead, a light emission control device 10 having the terminal SEL0 fed with the ground potential may operate in the master mode, and a light emission control device 10 having the terminal SEL0 fed with the voltage Vreg may operate in the slave mode. Or, a light emission control device 10 having the terminal SEL0 fed with a voltage equal to or more than a predetermined threshold voltage may operate in the master mode, and a light emission control device 10 having the terminal SEL0 fed with a voltage less than the predetermined threshold voltage may operate in the slave mode; or the other way around.

In each of the two light emission devices 1, the terminals SEL1 to SEL3 are individually connected to the terminal VREG or GND, and in accordance with how they are connected, the number of light-emitting elements to be controlled by the light emission control device 10 is set.

Here, it is assumed that, in each of the two light emission devices 1, the terminals SEL1 to SEL3 are all connected to the terminal GND (i.e., connected to the ground) with the result that the number of light-emitting elements to be controlled by the light emission control device 10 is set at eight (the connection-based setting mentioned above will be described in detail later).

The light emission control devices 10A and 10B have their respective terminals CLK connected to a clock lead WR, which is a cable provided between the light emission control devices 10A and 10B. Thus, the terminal CLK of the light emission control device 10A and the terminal CLK of the light emission control device 10B are connected together by the clock lead WR.

FIG. 5 shows the relationship between the light emission system SYS and a device connected to the light emission system SYS. In this embodiment, it is assumed that the light emission system SYS is mounted on a vehicle CC (see FIGS. 6A and 6B) such as an automobile.

Mounted on the vehicle CC are, in addition to the light emission system SYS, a battery 3, a switch element 4, and an ECU 5. The battery 3 is a secondary cell configured as a lead-acid storage battery, and outputs a positive direct-current voltage relative to the ground.

The switch element 4 is provided between the battery 3 and the light emission devices 1A and 1B. Only with the switch element 4 on, based on the output voltage of the battery 3, the input voltage Vin is supplied as a positive direct-current voltage to the light emission devices 1A and 1B (accordingly, the input voltage Vin is supplied as a positive direct-current voltage to the respective terminals VIN of the light emission control devices 10A and 10B). The input voltage Vin may be the output voltage of the battery 3 as it is, or any other direct-current voltage generated based on the output voltage of the battery 3. Incidentally, a capacitor may be inserted between the lead from the switch element 4 to the light emission device 1A and the ground, near the light emission device 1A, and a capacitor may be inserted between the lead from the switch element 4 to the light emission device 1B and the ground, near the light emission device 1B.

With the switch element 4 off, the supply of the input voltage Vin to the light emission devices 1A and 1B is cut off (i.e., the voltage supplied to the respective terminals VIN of the light emission control devices 10A and 10B equals zero), and thus the light emission devices 1A and 1B remains inoperative. With the light emission devices 1A and 1B inoperative, no driving voltage Vdrv or driving current Idrv is supplied to either of the light-emitting element arrays 20A and 20B, and thus the light-emitting elements included in the light-emitting element arrays 20A and 20B all remain in the extinguished state.

The ECU 5 is one of the electronic control units mounted on the vehicle CC, and controls the switch element 4 between the on and off states.

Here, for the sake of concrete description, it is assumed that the light emission system SYS constitutes a right turn lamp among one of the rear direction indicator lamps of the vehicle CC. FIG. 6A shows the exterior appearance of the vehicle CC with the trunk closed, and FIG. 6B shows the exterior appearance of the vehicle CC with the trunk open. The body of the vehicle CC includes a main body BDY and a trunk lid LID. The trunk lid LID is the lid of the trunk arranged as a luggage compartment in a rear part of the vehicle CC, and is fitted to the main body BDY so as to be freely opened and closed relative to it. Lifting the trunk lid of the trunk in the closed state (FIG. 6A) brings the trunk into the open state (FIG. 6B).

On the vehicle CC, the light emission device 1A is arranged in a right rear end part of the trunk lid LID, while the light emission device 1B is arranged in a right rear end part of the main body BDY. The light emission control device 10A is mounted on a first circuit board arranged in the trunk lid LID, and the light emission control device 10B is mounted on a second circuit board arranged in the main body BDY. With the trunk closed, the light-emitting element array 20A in the light emission device 1A and the light-emitting element array 20B in the light emission device 1B together constitute a single right turn lamp.

Figure 7:
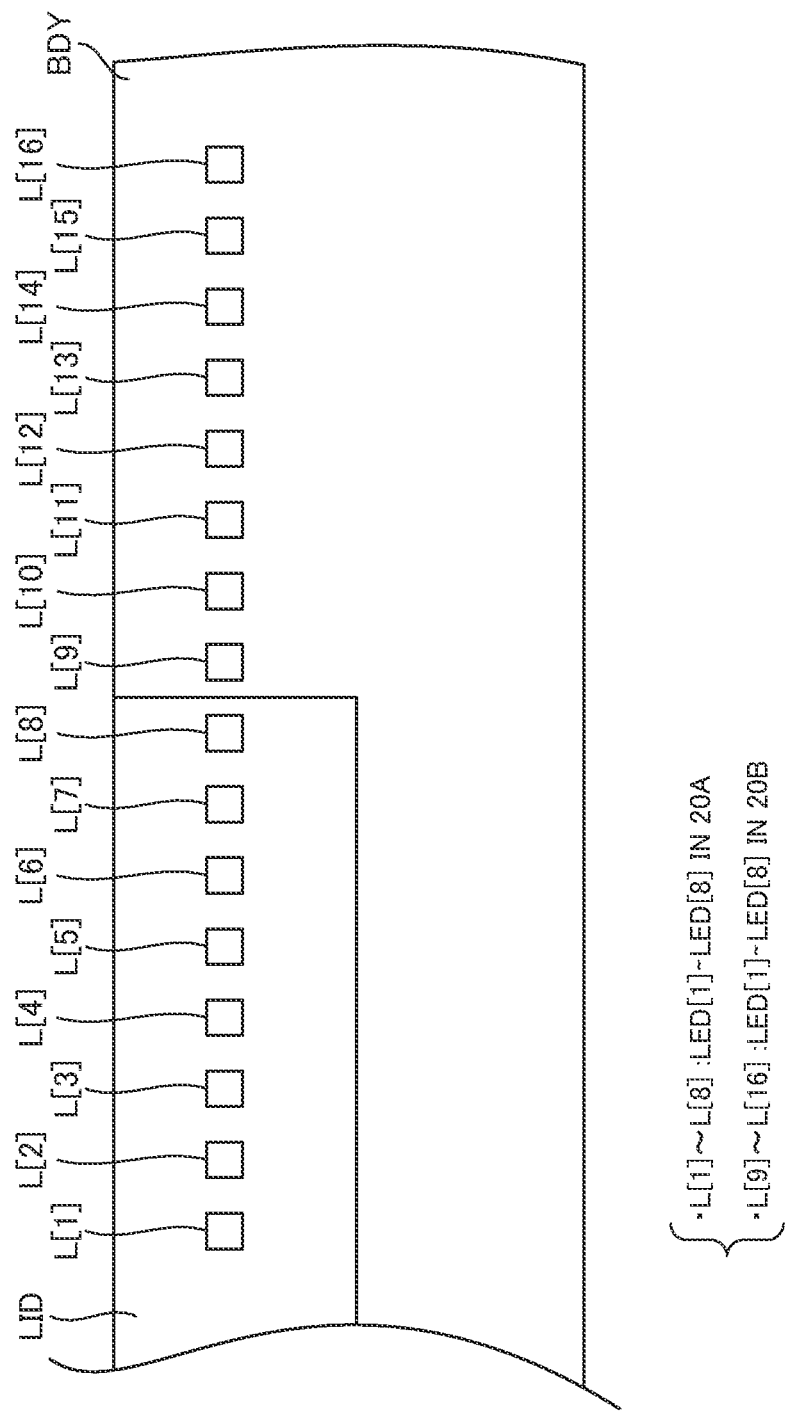
FIG. 7 is structural diagram of a right turn lamp provided on a vehicle according to the first embodiment of the present disclosure.

FIG. 7 shows, in a simplified form, the structure of the right turn lamp as seen from behind the vehicle CC. In the example in FIG. 7, the right turn lamp includes light-emitting segments L[1] to L[16]. With the vehicle CC lying on a road surface parallel to the horizontal plane, the light-emitting segments L[1] to L[16] are arrayed generally in a straight line along the horizontal plane, with the light-emitting segments L[i] and L[i+1] adjacent to each other, and with the light-emitting segment L[i+1] located to the right of the light-emitting segment L[i] as seen from behind the vehicle CC (where i is an integer). Instead the light-emitting segments L[1] to L[16] may be arrayed not in a straight line but in a bent line or in a curved line. The light-emitting segments L[1] to L[8] are provided on the trunk lid LID, and the light-emitting segments L[9] to L[16] are provided on the main body BDY.

The light-emitting segments L[1] to L[8] are constituted by the light-emitting elements LED[1] to LED[8] in the light-emitting element array 20A. That is, for any integer i that satisfies 1≤i≤8, the light-emitting segment L[i] is constituted by the light-emitting element LED[i] in the light-emitting element array 20A, and is lit and extinguished as the light-emitting element LED[i] in the light-emitting element array 20A is lit and extinguished. The light-emitting segments L[9] to L[16] are constituted by the light-emitting elements LED[1] to LED[8] in the light-emitting element array 20B. That is, for any integer i that satisfies 1≤i≤8, the light-emitting segment L[i+8] is constituted by the light-emitting element LED[i] in the light-emitting element array 20B, and is lit and extinguished as the light-emitting element LED[i] in the light-emitting element array 20B is lit and extinguished.

Near the driver's seat in the vehicle CC, a turn lever to be operated by the driver is provided, and how the turn lever is operated is conveyed to the ECU 5. With the turn lever inclined in the right turn direction from a predetermined neutral position, the ECU 5 turns on and off the switch element 4 periodically and alternately and thereby intermittently supplies the light emission system SYS (the light emission devices 1A and 1B) with electric power based on the input voltage Vin; with the turn lever not inclined in the right turn direction, the ECU 5 keeps the switch element 4 off.

With the light emission system SYS supplied with electric power based on the input voltage Vin, the light emission devices 1A and 1B operate in coordination to perform sequential lighting operation in which as time passes it increases the number of light-emitting segments lit from the light-emitting segment L[1] toward the light-emitting segment L[16].

FIG. 8 shows the sequence of sequential lighting operation. The state where all the light-emitting segments L[1] to L[16] are extinguished (i.e., the state where all the light-emitting elements in the light-emitting element arrays 20A and 20B are extinguished) will be referred to the all-extinguished state SX[0], and the state where all the light-emitting segments L[1] to L[16] are lit (i.e., the state where all the light-emitting elements in the light-emitting element arrays 20A and 20B are lit) will be referred to the all-lit state SX[16]. For any integer j that satisfies $1 \leq j \leq 15$, the state where, of the light-emitting segments L[1] to L[16], only light-emitting segments L[1] to L[j] are lit will be referred to as the state SX[j]. In the state SX[j] with $1 \leq j \leq 8$, of all the light-emitting elements in the light-emitting element arrays 20A and 20B, only the light-emitting elements LED[1] to LED[j] in the light-emitting element array 20A are lit. In the state SX[j] with $9 \leq j \leq 15$, in the light-emitting element array 20A, all the light-emitting elements LED[1] to LED[8] are lit and, in the light-emitting element array 20B, only the light-emitting elements LED[1] to LED[j−8] are lit.

In sequential lighting operation, starting with the all-extinguished state SX[0] up to the all-lit state SX[16], a transition from the state SX[i] to the state SX[i+1] occurs at regular time intervals. Once the all-lit state SX[16] is reached, the all-lit state SX[16] is kept until, when the switch element 4 turns off and as a result the light emission system SYS ceases to be supplied with the input voltage Vin, a return to the all-extinguished state SX[0] occurs.

In sequential lighting operation, the transition interval from the state SX[i] to the state SX[i+1] is required to be constant irrespective of the value of the integer i (this requirement will be referred to as the equal time interval requirement). Moreover, to permit signal transmission across a lead between the light emission devices 1A and 1B, the lead (cable) needs to be laid from the light emission device 1A arranged in the trunk lid LID first via the main body BDY then to the light emission device 1B. Thus, as few leads as possible are required to be laid between the light emission devices 1A and 1B (this requirement will be referred to as the wiring-saving requirement).

Examples of the configuration and operation of the light emission system SYS that meet the equal time interval requirement and the wiring-saving requirement mentioned above will be described below by way of practical examples. The first embodiment includes Practical Examples EX1_1 to EX1_6 described below. Unless otherwise stated and unless inconsistent, any features described above in connection with the first embodiment are applicable to Practical Examples EX1_1 to EX1_6 described below. For any feature of any practical example that contradicts what has been described above in connection with the first embodiment, the description of that feature given in connection with that practical example can prevail. Among Practical Examples EX1_1 to EX1_6, unless inconsistent, any feature described in connection with one practical example is applicable to any other practical example (i.e., any two or more of the practical examples may be combined together).

Practical Example Ex1_1

Practical Example EX1_1 will be described. In connection with Practical Example EX1_1, sequential lighting operation will be described in detail; prior to that, with reference to FIG. 9A, a configuration of the part of the light emission control device 10 that is involved in achieving sequential lighting operation will be described. The light emission control device 10 in FIG. 9A corresponds, when operating in the master mode, to the light emission control device 10A and, when operating in the slave mode, to the light emission control device 10B.

In the light emission control device 10, the clock generator 140 includes a transistor 141 configured as an N-channel MOSFET and a signal generator 142. The light emission control device 10 also includes a buffer circuit BF as a component that is connected to the terminal CLK.

The drain of the transistor 141 and the input terminal of the buffer circuit BF are connected to the terminal CLK. The source of the transistor 141 is connected to the ground. The signal generator 142 can, by use of an RC circuit or a crystal oscillator as mentioned above, generate a rectangular-wave signal with a predetermined clock frequency. Feeding the generated rectangular-wave signal to the gate of the transistor 141 permits the transistor 141 to perform switching at the clock frequency. Though not shown in FIG. 9A, the terminal CLK is pulled up to the terminal VREG via a pull-up resistor as will be described later (see FIG. 13). Accordingly, as the transistor 141 performs switching at the clock frequency, a clock signal Sclk with the clock frequency appears at the terminal CLK. The high level of the clock signal Sclk, the high level of the potential at the terminal CLK, and the high level of the potential on the clock lead WR is substantially equal to the potential of the voltage Vreg. The low level of the clock signal Sclk, the low level of the potential at the terminal CLK, and the low level of the potential on the clock lead WR is substantially equal to the ground potential.

Figure 9A:
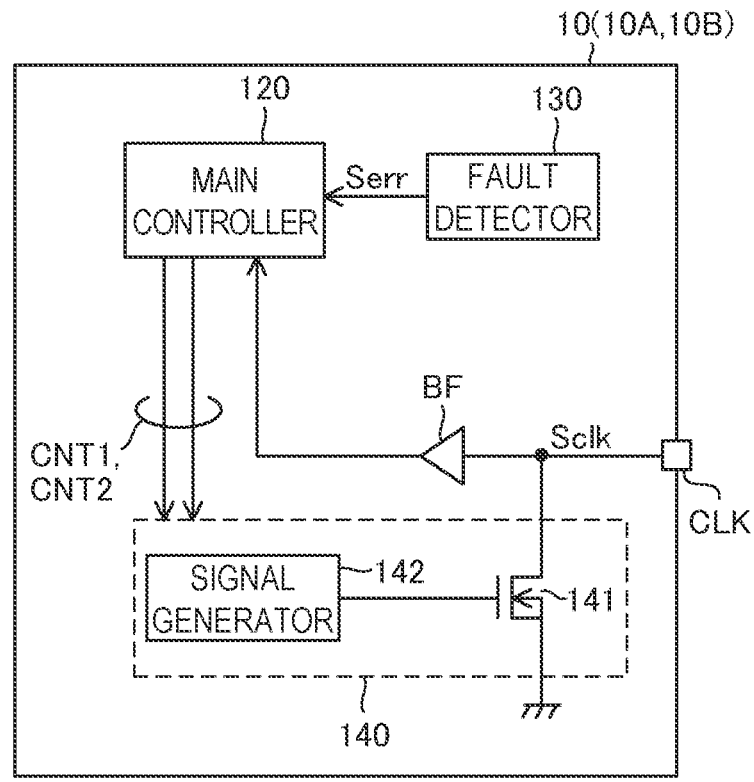
FIGS. 9A and 9B are configuration diagrams of part of a light emission control device involved in achieving sequential lighting operation in Practical Example EX1_1 belonging to the first embodiment of the present disclosure.
Figure 9B:
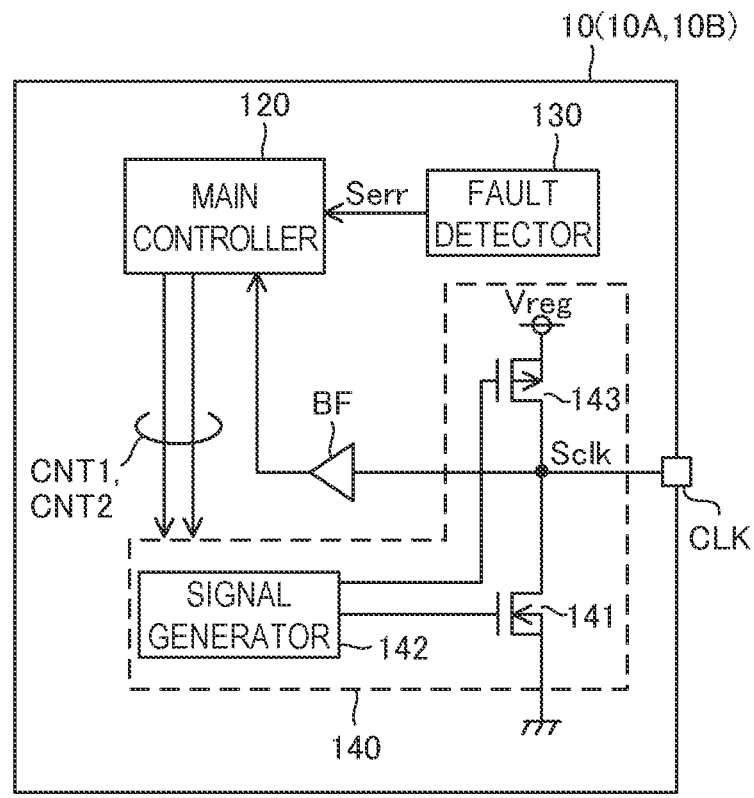

The clock generator 140 may instead be a circuit that can at a time be in one of a high state where it keeps the potential at the terminal CLK high, a low state where it keeps the potential at the terminal CLK low, and a Hiz state where it keeps the impedance at the terminal CLK sufficiently high. Specifically, for example, as shown in FIG. 9B, the clock generator 140 configured as described above may be additionally provided with a transistor 143 configured as a P-channel MOSFET. In the configuration in FIG. 9B, the source of the transistor 143 is fed with the voltage Vreg, and the drain of the transistor 143 is, together with the drain of the transistor 141, connected to the terminal CLK. In the configuration in FIG. 9B, the signal generator 142 controls the respective gate potentials of the transistors 141 and 143 to switch the state of the terminal CLK among the high state, the low state, and the Hiz state. With the transistors 141 and 143 off and on respectively, the high state results; with the transistors 141 and 143 on and off respectively, the low state results; and with the transistors 141 and 143 both off, the Hiz state results. Never are the transistors 141 and 143 both on. Thus the configuration in FIG. 9A can be modified to the configuration in FIG. 9B. The following description deals with, as an example, a case where the configuration in FIG. 9A is employed.

The output terminal of the buffer circuit BF is connected to the main controller 120, so that the signal at the terminal CLK is fed through the buffer circuit BF to the main controller 120. That is, if the signal at the terminal CLK is at high level, a high-level signal is fed from the buffer circuit BF to the main controller 120; if the signal at the terminal CLK is at low level, a low-level signal is fed from the buffer circuit BF to the main controller 120. Moreover, as mentioned above, the signal Serr from the fault detector 130 is fed to the main controller 120.

The main controller 120 feeds control signals CNT1 and CNT2 to the clock generator 140 and thereby controls the operation of the clock generator 140. The control signals CNT1 and CNT2 are each a binary signal that takes a value of either "0" or "1".

Figures 10, 11, 12:
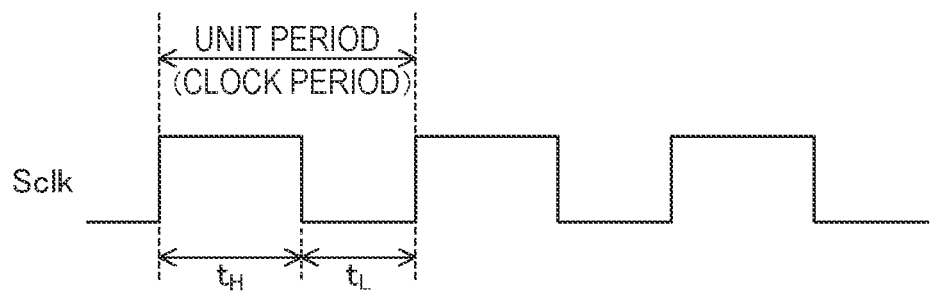
FIG. 10 is a diagram showing a relationship between control signals and a clock signal in Practical Example EX1_1 belonging to the first embodiment of the present disclosure.
FIG. 11 is a diagram illustrating characteristics of the clock signal in Practical Example EX1_1 belonging to the first embodiment of the present disclosure.
FIG. 12 is a diagram comparing a first and a second characteristic with respect to a characteristic of the clock signal in Practical Example EX1_1 belonging to the first embodiment of the present disclosure.

FIG. 10 shows the relationship of the control signals CNT1 and CNT2 with the operation of the clock generator 140. When the value of the control signal CNT1 is "1", in the clock generator 140, the signal generator 142 generates a rectangular-wave signal with a predetermined clock frequency, and feeds the generated rectangular-wave signal to the gate of the transistor 141 to make the transistor 141 perform switching at the clock frequency. Thus, a clock signal Sclk with the clock frequency appears at the terminal CLK. In the high-level period of the rectangular-wave signal generated by the signal generator 142, the clock signal Sclk too is at high level, and in the low-level period of the rectangular-wave signal generated by the signal generator 142, the clock signal Sclk too is at low level.

The clock generator 140 (signal generator 142) is configured to be able to change a characteristic of the clock signal Sclk while generating and outputting it. The characteristic of the clock signal Sclk can be its duty factor or pulse width. The clock generator 140 may be configured such that the characteristic of the clock signal Sclk is variable in three or more steps. Here, it is assumed that the characteristic of the clock signal Sclk is variable in two steps, namely between a first characteristic and a second characteristic. The first and second characteristics differ from each other. When the value of the control signal CNT1 is "1", if the value of the control signal CNT2 is "0", the clock generator 140 generates and outputs the clock signal Sclk with the first characteristic and, if the value of the control signal CNT2 is "1", the clock generator 140 generates and outputs the clock signal Sclk with the second characteristic.

FIG. 11 shows the waveform of the clock signal Sclk. The signal level of the clock signal Sclk alternates between high and low levels. In the clock signal Sclk, one high-level period and one low-level period that are adjacent to each other constitute a unit period. The length of the unit period is equal to the length of the clock period which is equal to the reciprocal of the clock frequency. Within one unit period, the length in time of the high-level period of the clock signal Sclk is represented by $t_H$ and the length in time of the low-level period of the clock signal Sclk is represented by $t_L$. The duty factor of the clock signal Sclk denotes the value of $t_H/(t_H+t_L)$ in each unit period, and the pulse width of the clock signal Sclk denotes the length of time $t_H$ in each unit period. A modification is possible in which $t_L/(t_H+t_L)$ is taken as the duty factor of the clock signal Sclk, and a modification is possible in which the length of time $t_L$ is taken as the pulse width of the clock signal Sclk (the following description will not discuss those modifications).

FIG. 12 shows an example of the waveform, duty factor, and pulse width of the clock signal Sclk. Compared with the duty factor of the clock signal Sclk with the first characteristic, the duty factor of the clock signal Sclk with the second characteristic is greater. Compared with the pulse width of the clock signal Sclk with the first characteristic, the pulse width of the clock signal Sclk with the second characteristic is greater. For example, the duty factor of the clock signal Sclk with the first and second characteristics is 20% and 80% respectively and then, assuming that the clock frequency is 1 kHz (kilohertz), the pulse width of the clock signal Sclk with the first and second characteristics is 200 microseconds and 800 microseconds respectively. Since the clock frequency is constant, as the duty factor of the clock signal Sclk changes, the pulse width of the clock signal Sclk changes. Thus it can be understood that the change of the duty factor of the clock signal Sclk is equivalent to the change of the pulse width of the clock signal Sclk.

Here, for the sake of concrete description, it is assumed that, compared with the duty factor and pulse width of the clock signal Sclk with the first characteristic, the duty factor and pulse width of the clock signal Sclk with the second characteristic are greater. A modification however is possible in which, compared with the duty factor and pulse width of the clock signal Sclk with the first characteristic, the duty factor and pulse width of the clock signal Sclk with the second characteristic are smaller.

Referring back to FIG. 10, when the value of the control signal CNT1 is "0", in the clock generator 140, the generation of the clock signal Sclk is suspended and the transistor 141 is held off or on. When the value of the control signal CNT1 is "0", if the value of the control signal CNT2 is "0", the clock generator 140 keeps the transistor 141 off and, if the value of the control signal CNT2 is "1", the clock generator 140 keeps the transistor 141 on. In one light emission control device 10, holding the transistor 141 off brings about a state where the clock signal Sclk from another light emission control device 10 can be received at the terminal CLK. In one light emission control device 10, holding the transistor 141 on causes the potential on the clock lead WR and at the terminal CLK to be held at low level (ground potential) irrespective of whether the clock signal Sclk is being generated in another light emission control device 10.

Figure 13:
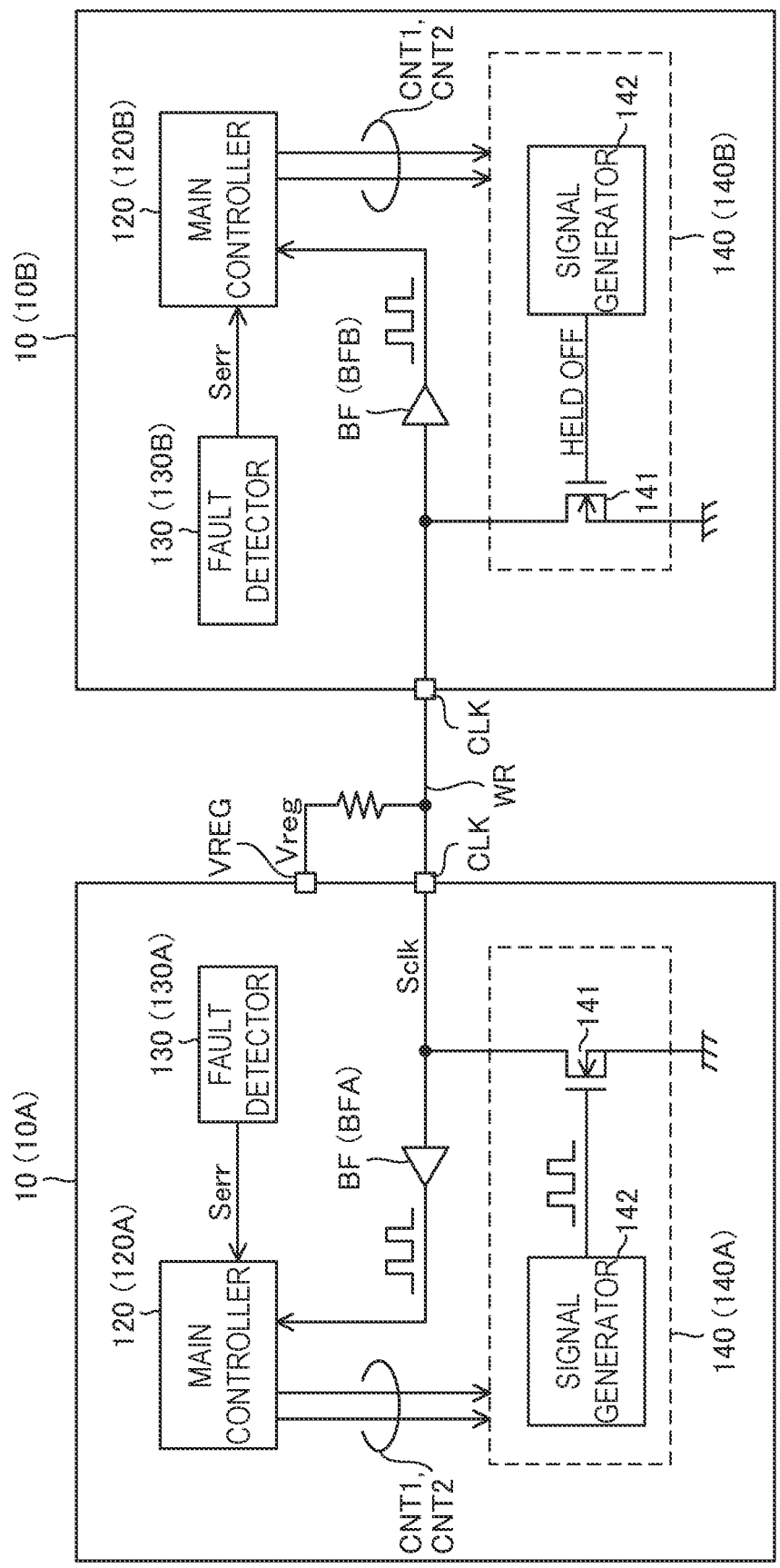
FIG. 13 is a diagram showing a state of two light emission control devices in a normal condition in Practical Example EX1_1 belonging to the first embodiment of the present disclosure.

With reference to FIG. 13, a detailed description will be given of the sequential lighting operation on the light emission system SYS, assuming a normal condition, that is, a condition where no fault (short fault or open fault) whatever is present in any of the light-emitting elements constituting the light-emitting element arrays 20A and 20B. In the following description, as necessary, the main controller 120, the fault detector 130, the clock generator 140, and the buffer circuit BF in the light emission control device 10A will be identified by the reference signs "120A", "130A", "140A", and "BFA" respectively, and the main controller 120, the fault detector 130, the clock generator 140, and the buffer circuit BF in the light emission control device 10B will be identified by the reference signs "120B", "130B", "140B", and "BFB" respectively.

In the light emission control device 10 operating in the master mode, that is, in the light emission control device 10A, the terminal CLK is connected via a pull-up resistor to the terminal VREG. In the light emission control device 10A, the value of the control signal CNT1 is "1" (the control signal CNT2 will be discussed later). On the other hand, in the light emission control device 10 operating in the slave mode, that is, in the light emission control device 10B, the values of the control signals CNT1 and CNT2 are both "0". Accordingly, in the light emission control device 10A, the transistor 141 is switched at the clock frequency to yield the clock signal Sclk with the first or second characteristic at the terminal CLK, and the clock signal Sclk generated by the clock generator 140A is fed via the clock lead WR to the terminal CLK of the light emission control device 10B. As a result, in both of the light emission control devices 10A and 10B, the main controllers 120 are fed with a common clock signal Sclk via the buffer circuit BF (here, signal delay and waveform distortion are ignored). Any clock frequency may be used, and a frequency as low as several hundred hertz to several kilohertz suffices; thus signal delay and waveform distortion can be ignored.

Figure 14:
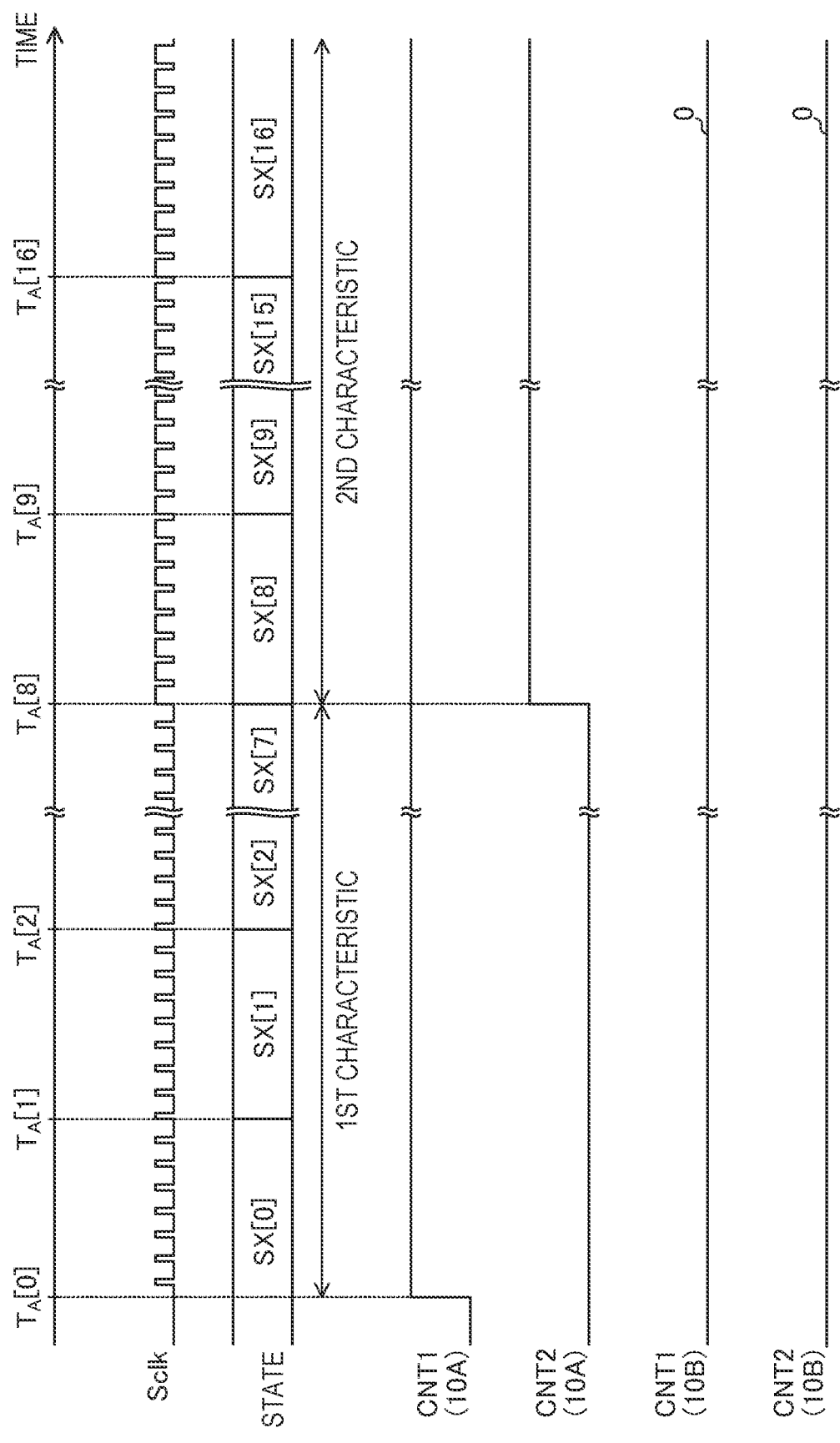
FIG. 14 is a diagram showing a sequence of sequential lighting operation in a normal condition in Practical Example EX1_1 belonging to the first embodiment of the present disclosure.

FIG. 14 is a timing chart of sequential lighting operation in the normal condition. When the light emission system SYS starts to be supplied with the input voltage Vin, the light emission control devices 10A and 10B (the main controllers 120A and 120B) start up substantially at the same time. Time point $T_A[0]$ is the time point when a predetermined start-up delay time has elapsed since the light emission control devices 10A and 10B (the main controllers 120A and 120B)

started up. In the light emission control device 10A, when the main controller 120A starts up, the value of the control signal CNT1 is "0", and at time point $T_A[0]$, the value of the control signal CNT1 is switched from "0" to "1"; at this time the value of the control signal CNT2 is "0". In the light emission control device 10A, the value of the control signal CNT1 being switched from "0" to "1" triggers the start of the generation and output of the clock signal Sclk with the first characteristic (see FIG. 10). In the normal condition, from time point $T_A[0]$ on, the value of the control signal CNT1 in the light emission control device 10A is kept at "0". On the other hand, in the light emission control device 10B operating in the slave mode, the value of the control signal CNT1 is "0" throughout. Moreover, in the light emission control device 10B, the value of the control signal CNT2 is in principle "0" so that the transistor 141 is held off. In the normal condition, as in principle, the value of the control signal CNT2 in the light emission control device 10B is "0".

In the light emission control device 10A, when the input voltage Vin starts to be supplied and the main controller 120A starts up, under the control of the main controller 120A, all the switch elements SW[1] to SW[8] are on, and thus all the light-emitting elements in the light-emitting element array 20A are in the extinguished state. Alternatively, in the light emission control device 10A, instead of all the switch elements SW[1] to SW[8] being kept on, the switch element 185 in FIG. 3 may be kept off to keep all the light-emitting elements in the light-emitting element array 20A extinguished (this applies to any operation described later that keeps all the light-emitting elements in the light-emitting element array 20A extinguished).

In the light emission control device 10B, when the input voltage Vin starts to be supplied and the main controller 120B starts up, under the control of the main controller 120B, all the switch elements SW[1] to SW[8] are on, and thus all the light-emitting elements in the light-emitting element array 20B are in the extinguished state. Alternatively, in the light emission control device 10B, instead of all the switch elements SW[1] to SW[8] being kept on, the switch element 185 in FIG. 3 may be kept off to keep all the light-emitting elements in the light-emitting element array 20B extinguished (this applies to any operation described later that keeps all the light-emitting elements in the light-emitting element array 20B extinguished).

At time point $T_A[0]$, all the light-emitting elements in the light-emitting element arrays 20A and 20B are in the extinguished state (that is, the all-extinguished state SX[0] is present). Starting at time point $T_A[0]$, the main controller 120A counts the number of clock pulses in the clock signal Sclk fed from the buffer circuit BFA and executes, every time the number of clock pulses increases by a predetermined number, a transition from the SX[i] to SX[i+1], starting with the all-extinguished state SX[0] up to the state SX[8]. The number of clock pulses in the clock signal Sclk denotes the number of times that an up edge or down edge occurs in the clock signal Sclk. Here, it is assumed that the predetermined number is "8". The predetermined number may be any integer other than "8". In the following description, it is assumed that the number of times that an up edge occurs in the clock signal Sclk corresponds to the number of clock pulses in the clock signal Sclk.

That is, starting at time point $T_A[0]$, at time point $T_A[1]$, when the number of times that an up edge has occurred in the clock signal Sclk becomes "8", the main controller 120A turns off, of the switch elements SW[1] to SW[8], only the switch element SW[1] to execute a transition from the all-extinguished state SX[0] to the state SX[1]. After that, starting at time point $T_A[1]$, at time point $T_A[2]$, when the number of times that an up edge has occurred in the clock signal Sclk has increased by another "8", the main controller 120A, while keeping the switch element SW[1] off, turns off, of the switch elements SW[2] to SW[8], only the switch element SW[2] to execute a transition from the state SX[1] to the state SX[2]. After that, similar operation is repeated. Time point $T_A[i]$ is the time point when a transition occurs from the state SX[i−1] to the state SX[i].

At the time point when the number of clock pulses that has been counted starting at time point $T_A[0]$ becomes "64", that is, at time point $T_A[8]$, the main controller 120A switches the value of the control signal CNT2 from "0" to "1", and after that keeps the value of the control signal CNT2 at "1". In the normal condition, from time point $T_A[8]$ on, the main controller 120A keeps all the switch elements SW[1] to SW[8] off and thereby keeps all the light-emitting elements in the light-emitting element array 20A lit.

At time point $T_A[8]$, under the control of the main controller 120A, the characteristic of the clock signal Sclk output from the clock generator 140A switches from the first characteristic to the second characteristic. In the light emission control device 10B, the main controller 120B can perform characteristic check operation whereby it determines whether the characteristic of the clock signal Sclk fed via the buffer circuit BFB is the first or second characteristic. Through the characteristic check operation, the main controller 120B detects as a characteristic change time point the time point that the characteristic of the clock signal Sclk switches from the first characteristic to the second characteristic. The detected characteristic change time point is, here, time point $T_A[8]$.

After the characteristic of the clock signal Sclk switches form the first characteristic to the second characteristic, the slave-side main controller 120B counts the number of clock pulses in the clock signal Sclk fed from the buffer circuit BFB, and executes a shift from the state SX[i] to the state SX[i+1] every time the number of clock pulses increases by eight, starting with the state SX[8] up to the state SX[16].

That is, starting at time point $T_A[8]$, at time point $T_A[9]$, when the number of times that an up edge has occurred in the clock signal Sclk becomes "8", the main controller 120B turns off, of the switch elements SW[1] to SW[8], only the switch element SW[1] to execute a transition from the state SX[8] to the state SX[9]. After that, starting at time point $T_A[9]$, at time point $T_A[10]$, when the number of times that an up edge has occurred in the clock signal Sclk has increased by another "8", the main controller 120B, while keeping the switch element SW[1] off, turns off, of the switch elements SW[2] to SW[8], only the switch element SW[2] to execute a transition from the state SX[9] to the state SX[10]. After that, similar operation is repeated.

At the time point when the number of clock pulses that has been counted starting at time point $T_A[8]$ becomes "64", that is, at time point $T_A[16]$, a transition occurs from the state SX[15] to the all-lit state SX[16]. After that, until the light emission devices 1A and 1B cease to be supplied with the input voltage Vin, the all-lit state SX[16] is kept. In the normal condition, the clock generator 140A continues to generate and output the clock signal Sclk after time point $T_A[16]$ until the light emission device 1A ceases to be supplied with the input voltage Vin.

As described above, in this practical example, a light emission system SYS is built with a configuration (for convenience' sake, referred to as the configuration $W_{P1}$) as described below. The light emission system SYS with the configuration $W_{P1}$ includes:

a light emission control device 10A including:

- a first switch circuit (100) composed of switch elements (SW[1] to SW[8]), corresponding to a plurality of channels, each connected in parallel with one of a plurality of light-emitting elements (LED[1] to LED[8]) included in a first light-emitting element array (20A);
- a first controller (120A) that can perform control whereby to control between the on and off states the switch elements in the first switch circuit (100) and thereby light or extinguish individually the light-emitting elements in the first light-emitting element array (20A);
- a clock generator (140A) that generates a clock signal (Sclk) with a variable characteristic; and
- a first clock terminal (CLK) connected to a clock lead (WR) across which to transmit the clock signal; and a light emission control device 10B including:

- a second switch circuit (100) composed of switch elements (SW[1] to SW[8]), corresponding to a plurality of channels, each connected in parallel with one of a plurality of light-emitting elements (LED[1] to LED[8]) included in a second light-emitting element array (20B);
- a second controller (120A) that can perform control whereby to control between the on and off states the switch elements in the second switch circuit (100) and thereby light or extinguish individually the light-emitting elements in the second light-emitting element array (20B); and
- a second clock terminal (CLK) connected to the clock lead (WR).

And the light emission system SYS with the configuration $W_{P1}$ operates such that:

in the light emission control device 10A, when triggered by the fulfillment of a predetermined sequence start condition (e.g., the start of supply of electric power), the first controller (120A) performs a first driving sequence in which it, synchronously with the clock signal (Sclk), sequentially switches between the on and off states the switch elements in the first switch circuit and thereby sequentially switch between the lit and extinguished states the light-emitting elements in the first light-emitting element array, in the light emission control device 10A, at a particular time point (here, at time point $T_A[8]$) after the start of the first driving sequence, the clock generator (140A) changes a characteristic of the clock signal from a predetermined first characteristic to a predetermined second characteristic, and in the light emission control device 10B, after the characteristic of the clock signal received at the second clock terminal (CLK) is changed from the first characteristic to the second characteristic, the second controller (120A) performs a second driving sequence in which it, synchronously with the clock signal, sequentially switches between the on and off states the switch elements in the second switch circuit and thereby sequentially switch between the lit and extinguished states the light-emitting elements in the second light-emitting element array (20B), and the second controller (120A) determines the time point at which to start the second driving sequence with reference to the time point at which the characteristic of the clock signal received at the second clock terminal is changed.

With the light emission control devices 10A and 10B configured as described above, it is possible to meet the equal time interval requirement and the wiring-saving requirement mentioned above.

It can be understood that the light emission control devices 10A and 10B constitute the light emission control system.

In sequential lighting operation, the first driving sequence denotes a sequence of operation in which the light-emitting elements in the first light-emitting element array (20A) are switched between the lit and extinguished states sequentially from the state SX[0] to the state SX[8]. In sequential lighting operation, the second driving sequence is a sequence performed subsequently to the first driving sequence, and denotes a sequence of operation in which the light-emitting elements in the second light-emitting element array (20B) are switched between the lit and extinguished states sequentially from the state SX[8] to the state SX[16].

Through the first driving sequence in Practical Example EX1_1, after the fulfillment of the sequence start condition (e.g., after the start of supply of electric power), the number of light-emitting elements lit in the first light-emitting element array (20A) increases sequentially at time intervals synchronous with the clock signal. Through the second driving sequence in Practical Example EX1_1, the number of light-emitting elements lit in the second light-emitting element array (20B) increases sequentially at time intervals synchronous with the clock signal. Here, while in the example in FIG. 14 the time intervals synchronous with the clock signal equal eight times the clock period, this is not meant as any limitation; the time intervals may be any integer times the clock period.

In the example of operation described above, time point $T_A[8]$ corresponds to the particular time point (the time point that the characteristic of the clock signal changes from the first characteristic to the second characteristic). Time point $T_A[8]$ can be said to be the time point that the first driving sequence ends. The particular time point may be any other time point after the start of the first driving sequence; for example, after the time point $T_A[8]$ of the transition from the state SX[7] to the state SX[8], the time point of the fourth up edge in the clock signal Sclk may be taken as the particular time point. In that case, after the characteristic of the clock signal Sclk switches from the first characteristic to the second characteristic, when the number of clock pulses in the clock signal Sclk fed from the buffer circuit BFB reaches "4", the slave-side main controller 120B can execute the transition from the state SX[8] to the state SX[9]. After the time point $T_A[9]$ of the transition from the state SX[8] to the state SX[9], operation proceeds as described above. Any time point between time points $T_A[6]$ and $T_A[7]$ or between time points $T_A[7]$ and $T_A[8]$ may be taken as the particular time point.

The sequence start condition mentioned above is fulfilled when the light emission system SYS (light emission control system) starts to be supplied with electric power. When the light emission system SYS starts to be supplied with electric power is, put otherwise, when the light emission devices 1A and 1B, or the light emission control devices 10A and 10B, start to be supplied with electric power. Here, the start of supply of electric power refers to the start of supply of electric power based on the input voltage Vin resulting from the switch element 4 (FIG. 5) turning on. That is, triggered by the light emission system SYS (light emission control devices 10A and 10B) starting to be supplied with electric power based on the input voltage Vin, the light emission control device 10A starts the first driving sequence.

As described above, when the turn lever provided near the driver's seat in the vehicle CC is inclined in the right turn direction from the predetermined neutral position, the ECU 5 turns on and off the switch element 4 periodically and alternately and thereby intermittently supplies the light emission system SYS (the light emission devices 1A and 1B) with electric power based on the input voltage Vin. In each period at which the switch element 4 is repeatedly turned on and off, the length of time for which the switch element 4 is kept on is longer than the length of time between time points $T_A[0]$ and $T_A[16]$, and is, for example, twice the length of time between time points $T_A[0]$ and $T_A[16]$. Thus, so long as the turn lever remains inclined in the right turn direction, sequential lighting operation involving sequential transitions from the all-extinguished state SX[0] via the states SX[1] to SX[15] to the all-lit state SX[16] is performed repeatedly.

Now, the significance of a configuration according to the present disclosure will be discussed in comparison with some reference configurations described in the course. As a first reference configuration, a configuration is possible where a single light emission control device that includes switch elements corresponding to 16 channels is arranged in the trunk lid LID, and with this single light emission control device, the extinguishing and lighting of light-emitting elements LED[1] to LED[16] are controlled. With the first reference configuration, it is easy to meet the equal time interval requirement but it is necessary to lay a number of leads (cables) to connect the single light emission control device arranged in the trunk lid LID with the light-emitting elements LED[9] to LED[16] arranged on the main body BDY. This is impractical.

As a second reference configuration, a configuration is possible where a light emission control device for controlling light-emitting elements LED[1] to LED[8] is arranged in the trunk lid LID and a light emission control device for controlling the light-emitting elements LED[9] to LED[16] is arranged in the main body BDY, with the two light emission control devices each generating a clock signal independently. Inconveniently, with the second reference configuration, a deviation in clock frequency between the two light emission control devices may result in, for example, a transition from the state SX[1] to the state SX[2] taking 15 milliseconds while a transition from the state SX[9] to the state SX[10] takes 25 milliseconds (that is, it is difficult to meet the equal time interval requirement). In addition, to achieve a smooth transition from the state SX[8] to the state SX[9], it is necessary to take an extra measure (e.g., communication between the first and second light emission control devices).

For example, a third reference configuration based on the second reference configuration is possible as follows. In the third reference configuration, an MCU (micro-controller unit) is provided in the trunk lid LID and a CAN (controller area network) transceiver is provided between the MCU and the light emission control device in the main body BDY. The MCU gives instructions to the light emission control device in the trunk lid LID to achieve sequential lighting of the light-emitting elements on the trunk lid LID, and gives instructions via the CAN transceiver to the light emission control device in the main body to achieve sequential lighting of the light-emitting elements on the main body. By letting the MCU specify the time point at which to light each light-emitting element, it is possible to meet the equal time interval requirement mentioned above. However, with the third reference configuration, sequential lighting requires a CAN transceiver and an MCU, leading to increased cost. Also, leads for communication need to be laid between the trunk lid LID and the main body BDY. Furthermore, comparatively high-speed communication across the CAN may cause high electromagnetic noise emission.

Various other configurations are possible including one in which more than one MCU are used to achieve timing control needed in sequential lighting; in any case, the need for an MCU and communication invites inconveniences similar to those with the third reference configuration.

By contrast, with the configuration of this practical example, no MCU is needed (contributing to low cost), and the desired sequential lighting can be achieved by simply transmitting the clock signal Sclk, which can have a low frequency, between the light emission control devices 10A and 10B.

Incidentally, in the light emission control device 10A, the clock generator 140 may, while generating and outputting the clock signal Sclk, perform slew rate control. Slew rate control is operation whereby to control or limit the gradient of the potential change of the clock signal Sclk. Specifically, for example, in slew rate control, when the clock signal Sclk is turned from low level to high level, the signal generator 142 feeds a constant current to the gate of the transistor 141 over a predetermined length of time so as to gradually increase the gate potential of the transistor 141; when the clock signal Sclk is turned from high level to low level, the signal generator 142 absorbs a constant current from the gate of the transistor 141 over a predetermined length of time so as to gradually decrease the gate potential of the transistor 141. This makes the gradient of the potential change of the clock signal Sclk gentle, and helps keep the electromagnetic noise emitted from the clock lead WR negligibly low. Since the clock signal Sclk can have a low frequency (of about 1 kHz), slew rate control can be performed without any practical problem. Considering the strict regulations on electromagnetic noise emission in vehicle onboard applications, low electromagnetic noise emission is extremely helpful.

Practical Example Ex1_2

Practical Example EX1_2 will be described. In Practical Example EX1_1, the sequence start condition is fulfilled by the light emission system SYS starting to be supplied with electric power. This, however, is not meant to limit the sequence start condition. The sequence start condition may be fulfilled by the light emission system SYS being fed with a predetermined signal. A specific example of this will be described below.

As shown in FIG. 15A, each light emission control device 10 can be provided with, as one external terminal, an enable terminal EN. The ECU 5 feeds the enable terminal EN of each light emission control device 10 with an enable signal Sen that has either the value "1" or "0". With a "0" enable signal Sen fed to the enable terminal EN, each light emission control device 10 suspends its operation including the generation of the clock signal Sclk and the switching of the transistor 311 in FIG. 3, bringing about the all-extinguished state SX[0]. Only with a "1" enable signal Sen fed to the enable terminal EN does each light emission control device 10 perform the various kinds of operation described in connection with this embodiment.

The ECU 5 turns on the switch element 4 (see FIG. 5) whenever necessary. In Practical Example EX1_2, it can be understood that the switch element 4 is kept on throughout. With the turn lever provided near the driver's seat inclined in the right turn direction from the predetermined neutral position, the ECU 5, while keeping the switch element 4 on, switches between the value "1" and "0" periodically and alternately the enable signal Sen that is fed to each light emission control device 10 (i.e., the light emission control devices 10A and 10B). In terms of the example in FIG. 14, in each period at which the value of the enable signal Sen is changed, the length of time for which the value of the enable signal Sen is kept at "1" is longer than the length of time between time points $T_A[0]$ and $T_A[16]$, and is, for example, twice the length of time between time points $T_A[0]$ and $T_A[16]$. Thus, so long as the turn lever remains inclined in the right turn direction, sequential lighting operation involving sequential transitions from all-extinguished state SX[0] via the states SX[1] to SX[15] up to all-lit state SX[16] is performed repeatedly. In Practical Example EX1_2, time point $T_A[0]$ can be understood to be the time point when the value of the enable signal Sen switches from "0" to "1".

As described above, feeding of a predetermined signal (here, a "1" enable signal Sen) to the light emission system SYS can be taken as the fulfillment of the sequence start condition to start sequential lighting operation including the first and second driving sequences. This, in the configuration in FIG. 15A, requires a lead (cable) for transmitting the predetermined signal between the ECU 5 and the light emission control devices 10A and 10B. Considering this, the scheme in which the start of supply of electric power is taken as the fulfillment of the sequence start condition is more advantageous. In the configuration shown in FIGS. 6A and 6B, the light emission control devices 10A and 10B are mounted on separate circuit boards; otherwise, that is, in applications where the light emission control devices 10A and 10B can be mounted on a common circuit board, the controller shown in FIG. 15A can be particularly useful.

Another possible configuration is as follows. As shown in FIG. 15B, the ECU 5 feeds the enable signal Sen to, of the light emission control devices 10A and 10B, only the light emission control device 10A operating in the master mode. On the other hand, the enable terminal EN of the light emission control device 10B is kept connected to the terminal VREG. Here, it is assumed that, when the enable signal Sen has the potential of the voltage Vreg, the enable signal Sen has the value "1". With reference to the time point at which the clock signal Sclk from the light emission control device 10A changes from the first characteristic to the second characteristic, the light emission control device 10B starts sequential lighting of the light-emitting elements in the light-emitting element array 20B, and this allows the voltage at the enable terminal EN of the light emission control device 10B to be held at the voltage corresponding to "1".

With the turn lever provided near the driver's seat inclined in the right turn direction from the predetermined neutral position, the ECU 5 in the configuration in FIG. 15B, while keeping the switch element 4 on, switches between the value "1" and "0" periodically and alternately the enable signal Sen that is fed to the light emission control device 10A. In terms of the example in FIG. 14, in each period at which the value of the enable signal Sen is changed, the length of time for which the value of the enable signal Sen is kept at "1" is longer than the length of time between time points $T_A[0]$ and $T_A[16]$, and is, for example, twice the length of time between time points $T_A[0]$ and $T_A[16]$. Thus, also with the configuration in FIG. 15B, so long as the turn lever remains inclined in the right turn direction, sequential lighting operation involving sequential transitions from all-extinguished state SX[0] via the states SX[1] to SX[15] up to all-lit state SX[16] is performed repeatedly. When the value of the enable signal Sen fed to the light emission control device 10A switches from "1" to "0", the light emission control device 10A stops generating and outputting the clock signal Sclk; thus, all the light-emitting elements in the light-emitting element array 20B are extinguished promptly through slave-side monitoring operation, which will be described later.

Practical Example Ex1_3

Practical Example EX1_3 will be described. A law or regulation directed to vehicles (e.g., a Japanese law or regulation at the time of the filing of the present application) may require that, if any of a plurality of light-emitting elements constituting a turn lamp is faulty, all the light-emitting elements be extinguished (in the following description this requirement will be referred to as the all-extinguished-at-fault requirement). In Practical Example EX1_3, and also in Practical Example EX1_4 presented later, a technology for meeting the all-extinguished-at-fault requirement will be described. In Practical Example EX1_3, a description will be given of operation performed when a fault occurs in a light-emitting element in the light-emitting element array 20A (see FIG. 4).

For the sake of concrete description, a master fault condition will be considered in which a fault (open fault or short fault) is present, among all the light-emitting elements in the light-emitting element arrays 20A and 20B, only in the light-emitting element LED[4] in the light-emitting element array 20A. After the start of the first driving sequence in the light emission control device 10A, until immediately before time point $T_A[4]$, operation proceeds as described in connection with Practical Example EX1_1.

As a first master fault condition as one example of a master fault condition, consider the following situation: at time point $T_A[4]$, the main controller 120A turns off the switch element SW[4] to try to light the light-emitting element LED[4]; however, a fault (open fault or short fault) is present in the light-emitting element LED[4] and the fault is detected by the fault detector 130A immediately after time point $T_A[4]$. FIG. 16 is a timing chart obtained in the first master fault condition.

In the light emission control device 10A in the first master fault condition, on detecting the fault in the light-emitting element LED[4], the fault detector 130A transmits a signal Serr indicating the fault to the main controller 120A. In response to the signal Serr, in the light emission control device 10A, the main controller 120A substitute "1" in a fault flag FLGA which it keeps in it. In the light emission control device 10A, when the main controller 120A starts up, an initial value "0" is stored in the fault flag FLGA; only in response to the receipt of a signal Serr indicating the detection of a fault in a light-emitting element from the fault detector 130A does the main controller 120A substitute and latch "1" in the fault flag FLGA.

In the light emission control device 10A, if the value in the fault flag FLGA is "1", the main controller 120A, with priority over the first driving sequence it can perform, extinguishes all the light-emitting elements in the light-emitting element array 20A, and in addition makes the values of the control signals CNT1 and CNT2 "0" and "1" respectively.

In terms of the example in FIG. 16, in the light emission control device 10A, when triggered by the receipt of the signal Serr indicating the detection of the fault, the main controller 120A suspends the first driving sequence it is performing and turns on all the switch elements SW[1] to SW[8] (or turns off the switch element 185 in FIG. 3), thereby extinguishing all the light-emitting elements in the light-emitting element array 20A and thereafter holding all the light-emitting elements in the light-emitting element array 20A in the extinguished state; in addition, the main controller 120A switches the values of the control signals CNT1 and CNT2 for the clock generator 140A to "0" and "1" respectively and thereafter holds the values of the control signals CNT1 and CNT2 at "0" and "1" respectively.

Figure 17:
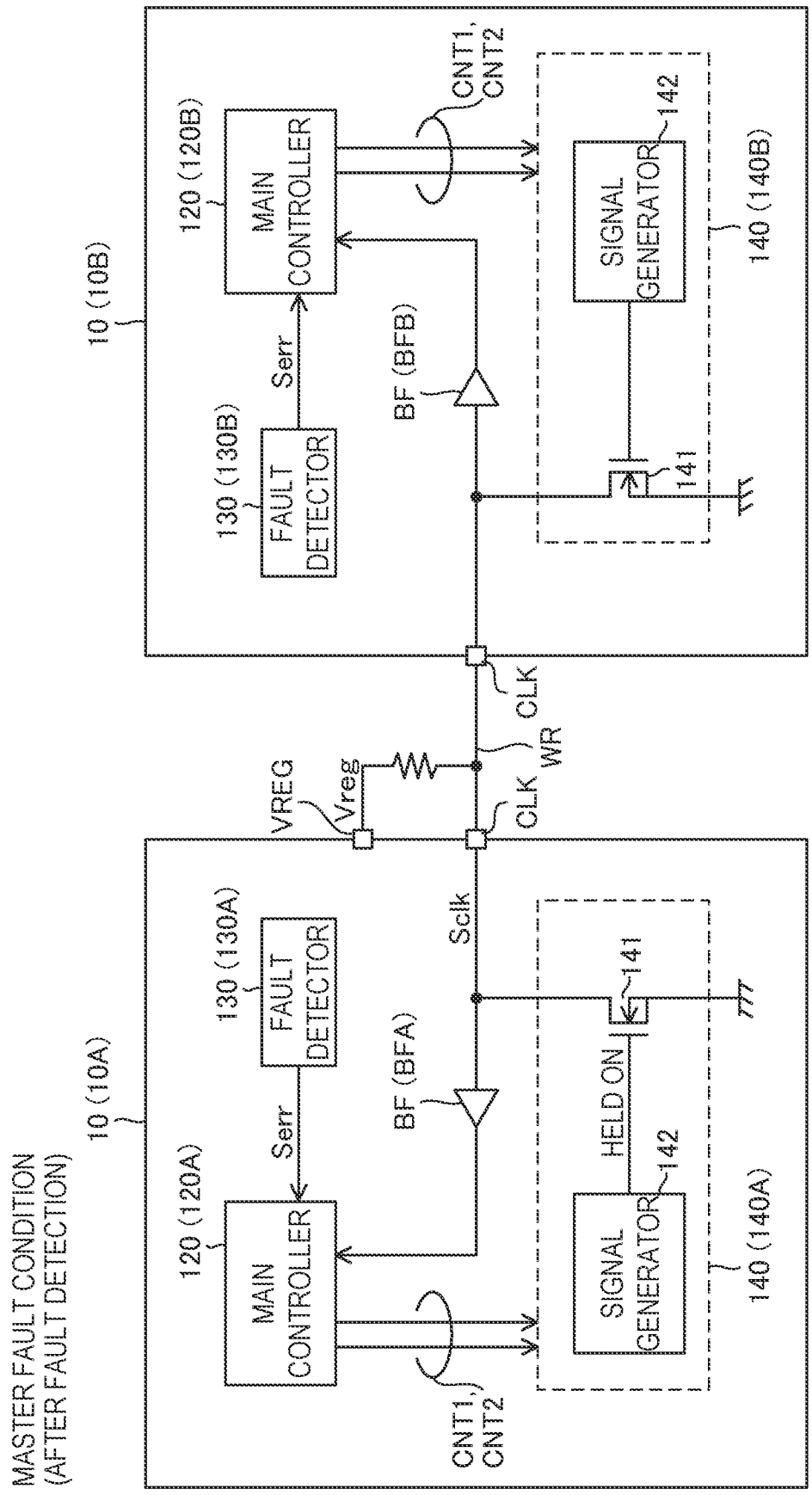
FIG. 17 is a diagram showing a state of two light emission control devices in a master fault condition in Practical Example EX1_3 belonging to the first embodiment of the present disclosure.

In the light emission control device 10A, making the values of the control signals CNT1 and CNT2 "0" and "1" respectively results in, as shown in FIG. 17, the transistor 141 (the transistor 141 in the light emission control device 10A) being held on and the potential of the clock signal Sclk being held at low level. Accordingly, the potentials at the respective terminals CLK of the light emission control devices 10A and 10B and the signal potential on the clock lead WR are held at low level, and also the output signal of the buffer circuit BFB in the light emission control device 10B is held at low level. In the example in FIG. 16, after time point $T_A[4]$, the clock signal Sclk turns to high level once before its potential is held at the low level.

In the first master fault condition, before time point $T_A[9]$, that is, before the start of the second driving sequence by the light emission control device 10B, the potentials at the terminals CLK are held at low level, and thus none of the light-emitting elements in the light-emitting element array 20B is lit. Thus, once the whole light-emitting element array 20A in the light emission device 1A is extinguished, the all-extinguished-at-fault requirement is met.

Figure 18:
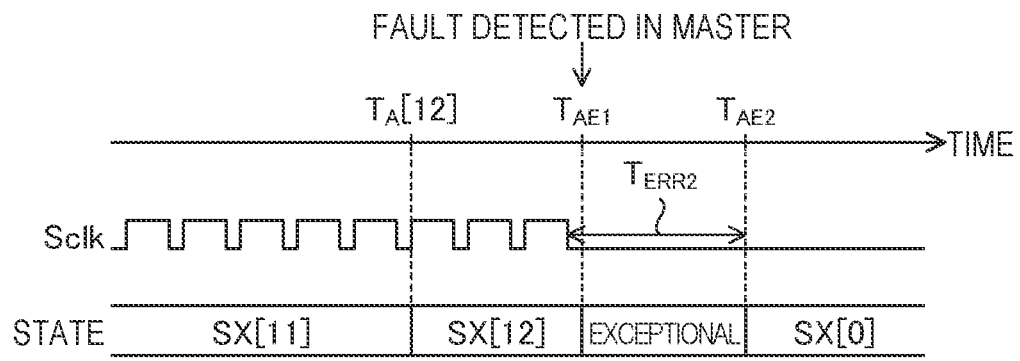
FIG. 18 is a timing chart observed in a second master fault condition in Practical Example EX1_3 belonging to the first embodiment of the present disclosure.

A fault (open fault or short fault) in the light-emitting element LED[4] in the light-emitting element array 20A may occur and be detected after time point $T_A[9]$, and this condition will be refereed to as a second master fault condition. In the second master fault condition, after through the first driving sequence by the light emission control device 10A the state SX[8] is reached, the second driving sequence by the light emission control device 10B is started and, at some time point with one or more light-emitting elements in the light-emitting element array 20B lit, a fault occurs in the light-emitting element LED[4] in the light-emitting element array 20A. Here, for the sake of concrete description, it is assumed that, as shown in FIG. 18, at a fault detection time point $T_{AE1}$ after time point $T_A[12]$ before time point $T_A[13]$, a fault occurs in the light-emitting element LED[4] in the light-emitting element array 20A and is detected by the fault detector 130A. FIG. 18 is a timing chart obtained in the second master fault condition.

In the second master fault condition, the fault detector 130A feeds a signal Serr indicating the detection of the fault in the light-emitting element LED[4] to the main controller 120A. In response to the signal Serr, the main controller 120A substitutes "1" in the fault flag FLGA it keeps in it. The fault flag FLGA is as described above.

Thus, in the second master fault condition, when triggered by the receipt of the signal Serr indicating the detection of the fault, that is, at the fault detection time point $T_{AE1}$, the main controller 120A turns on all the switch elements SW[1] to SW[8] (or turns off the switch element 185), thereby extinguishing all the light-emitting elements in the light-emitting element array 20A and thereafter holding all the light-emitting elements in the light-emitting element array 20A in the extinguished state; in addition, at the fault detection time point $T_{AE1}$, the main controller 120A switches the values of the control signals CNT1 and CNT2 to "0" and "1" respectively and thereafter holds the values of the control signals CNT1 and CNT2 at "0" and "1" respectively.

In the light emission control device 10A, turning the values of the control signals CNT1 and CNT2 to "0" and "1" respectively results in, as shown in FIG. 17, the transistor 141 (the transistor 141 in the light emission control device 10A) being held on and the potential of the clock signal Sclk being held at low level. Accordingly, the potential at the respective terminals CLK of the light emission control devices 10A and 10B and the signal potential on the clock lead WR are held at low level, and also the output signal of the buffer circuit BFB in the light emission control device 10B is held at low level.

The slave-side main controller 120B performs slave-side monitoring operation in which it monitors the potential at the terminal CLK (the terminal CLK of the light emission control device 10B) based on the output signal of the buffer circuit BFB. In the light emission control device 10B, the main controller 120B can start the slave-side monitoring operation after it has started up, or after the enable signal Sen switches from "0" to "1", or after starting to receive the clock signal Sclk with the second characteristic. In the slave-side monitoring operation, if the potential at the terminal CLK (the terminal CLK of the light emission control device 10B) is held (e.g., at low level) for a predetermined error determination time $t_{ERR2}$ or longer, the main controller 120B, with priority over the second driving sequence, extinguishes all the light-emitting elements in the light-emitting element array 20B. The error determination time $t_{ERR2}$ is longer than (e.g., twice to five times) the period of the clock signal Sclk.

In the second master fault condition, starting at the fault detection time point $T_{AE1}$ occurring after time point $T_A[12]$, the potential at the terminal CLK is held at low level. Thus, at the lapse of the error determination time $t_{ERR2}$ after the fault detection time point $T_{AE1}$, that is, at time point $T_{AE2}$, the main controller 120B suspends the second driving sequence it is performing and turns on all the switch elements SW[1] to SW[8] (or turns off the switch element 185 in FIG. 3), thereby extinguishing all the light-emitting elements in the light-emitting element array 20B and thereafter holding all the light-emitting elements in the light-emitting element array 20B in the extinguished state. Through this operation, also in the second master fault condition, the all-extinguished-at-fault requirement is met.

Incidentally, in FIG. 18, during the period between time points $T_{AE1}$ and $T_{AE2}$, an exceptional light emission state occurs in which, while all the light-emitting elements in the light-emitting element array 20A are in the extinguished state, only the light-emitting elements LED[1] to LED[4] in the light-emitting element array 20B are in the lit state. This period, however, is so short that the exceptional state is not perceptible to the human sight and poses no problem. If necessary, a configuration is possible where, in the light emission control device 10A, all the light-emitting elements in the light-emitting element array 20A are switched to the extinguished state at the lapse of the error determination time $t_{ERR2}$ after the detection of a fault in a light-emitting element.

Practical Example Ex1_4

Practical Example EX1_4 will be described. In Practical Example EX1_4, the operation performed when a fault occurs in a light-emitting element in the light-emitting element array 20B (see FIG. 4) will be described.

For the sake of concrete description, a slave fault condition will be considered in which a fault (open fault or short fault) is present in, of all the light-emitting elements in the light-emitting element arrays 20A and 20B, only the light-emitting element LED[4] in the light-emitting element array 20B. After the start of the second driving sequence in the light emission control device 10B, until immediately before time point $T_A[12]$, operation proceeds as described in connection with Practical Example EX1_1.

Figure 19:
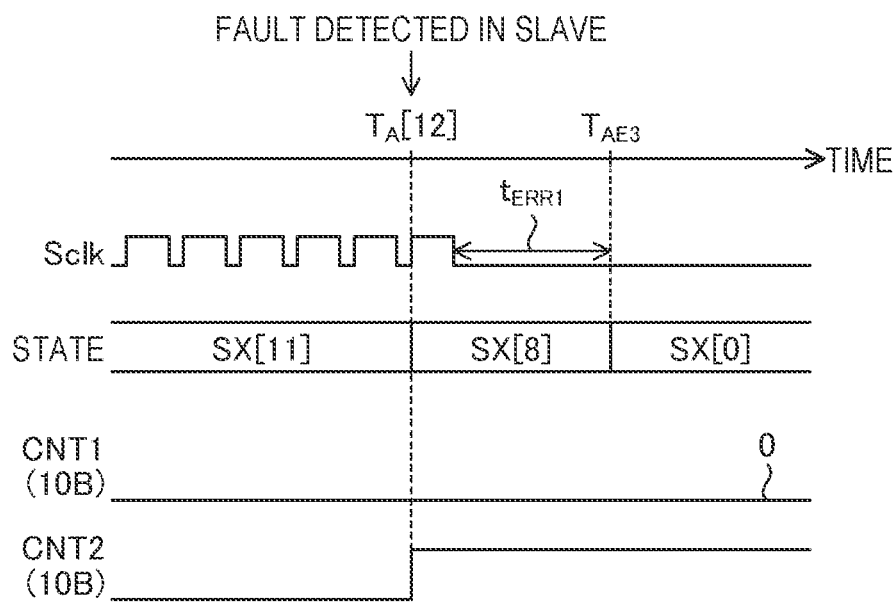
FIG. 19 is a timing chart observed in a slave fault condition in Practical Example EX1_4 belonging to the first embodiment of the present disclosure.

As a slave fault condition, consider the following situation: at time point $T_A[12]$, the main controller 120B turns off the switch element SW[4] to try to light the light-emitting element LED[4] in the light-emitting element array 20B; however a fault (open fault or short fault) is present in the light-emitting element LED[4] and the fault is detected immediately after time point $T_A[12]$. FIG. 19 is a timing chart obtained in the slave fault condition.

In the slave fault condition, on detecting the fault in the light-emitting element LED[4], the fault detector 130B transmits a signal Serr indicating the fault to the main controller 120B. In response to the signal Serr, the main controller 120B substitutes "1" in the fault flag FLGB it keeps in it. In the light emission control device 10B, when the main controller 120B starts up, an initial value "0" is stored in the fault flag FLGB; only in response to the receipt of a signal Serr indicating the detection of a fault in a light-emitting element from the fault detector 130B does the main controller 120B substitute and latch "1" in the fault flag FLGB.

In the light emission control device 10B, if the value in the fault flag FLGB is "1", the main controller 120B, with priority over the second driving sequence it can perform, extinguishes all the light-emitting elements in the light-emitting element array 20B, and in addition makes the values of the control signals CNT1 and CNT2 "0" and "1" respectively.

In terms of the example in FIG. 19, in the light emission control device 10B, when triggered by the receipt of the signal Serr indicating the detection of the fault, the main controller 120B suspends the second driving sequence it is performing and turns on all the switch elements SW[1] to SW[8] (or turns off the switch element 185 in FIG. 3), thereby extinguishing all the light-emitting elements in the light-emitting element array 20B and thereafter holding all the light-emitting elements in the light-emitting element array 20B in the extinguished state; in addition, the main controller 120B switches the values of the control signals CNT1 and CNT2 for the clock generator 140B to "0" and "1" respectively and thereafter holds the values of the control signals CNT1 and CNT2 at "0" and "1" respectively.

Figure 20:
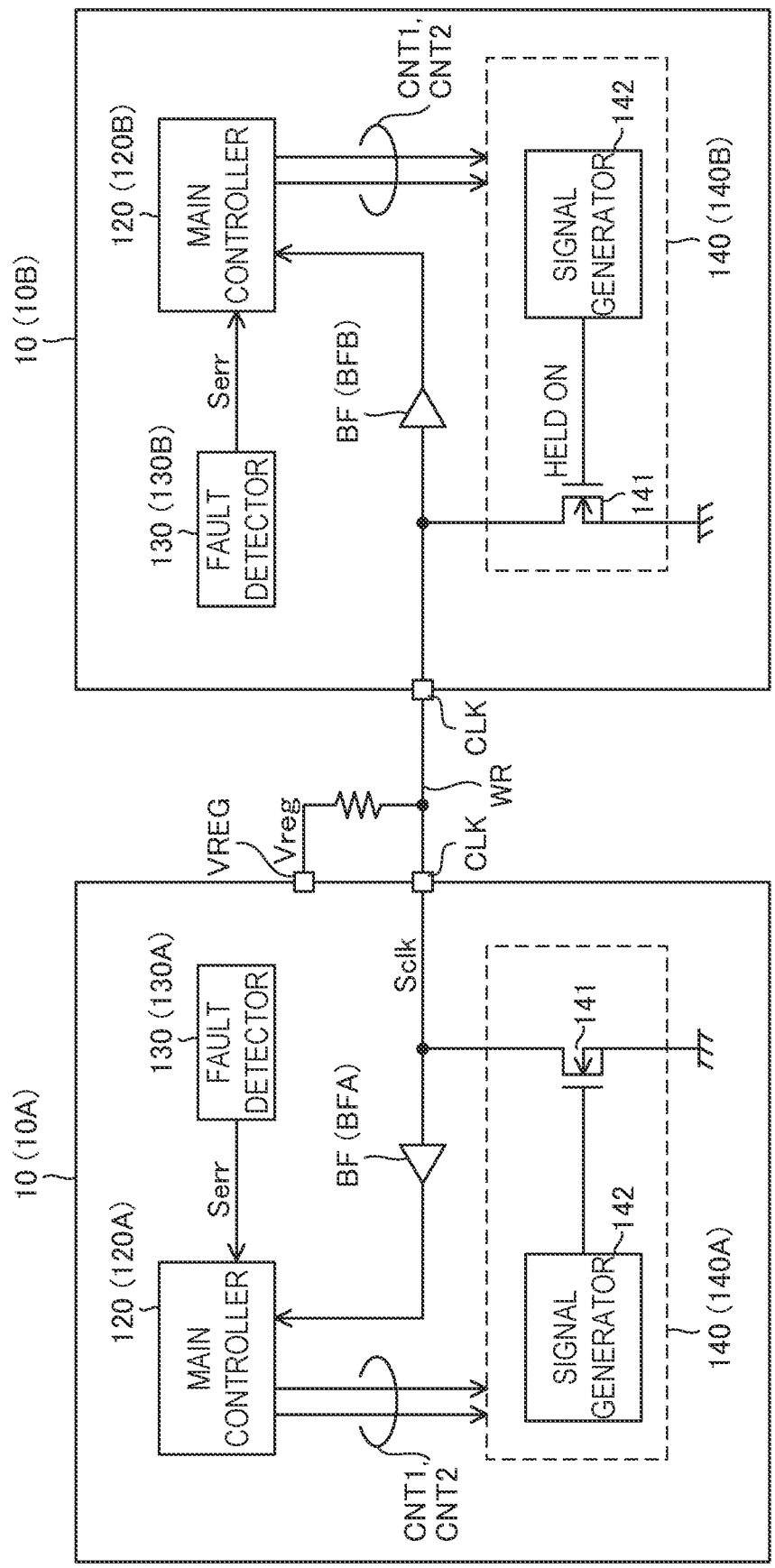
FIG. 20 is a diagram showing a state of two light emission control devices in a slave fault condition in Practical Example EX1_4 belonging to the first embodiment of the present disclosure.

In the light emission control device 10B, making the values of the control signals CNT1 and CNT2 "0" and "1" respectively results in, as shown in FIG. 20, the transistor 141 (the transistor 141 in the light emission control device 10B) being held on and the potential of the clock signal Sclk being held at low level. Accordingly, the potentials at the respective terminals CLK of the light emission control devices 10A and 10B and the signal potential on the clock lead WR are held at low level, and also the output signal of the buffer circuit BFA in the light emission control device 10A is held at low level. In the example in FIG. 19, after time point $T_A[12]$, the clock signal Sclk turns to high level once before its potential is held at the low level.

The master-side main controller 120A performs master-side monitoring operation in which it monitors the potential at the terminal CLK (the terminal CLK of the light emission control device 10A) based on the output signal of the buffer circuit BFA. The main controller 120A can start the master-side monitoring operation after it has started up, or after the enable signal Sen switches from "0" to "1", or after starting to transmit the clock signal Sclk with the second characteristic. In the master-side monitoring operation, if the potential at the terminal CLK (the terminal CLK of the light emission control device 10A) is held (e.g., at low level) for a predetermined error determination time $t_{ERR1}$ or longer, the main controller 120A, with priority over the first driving sequence, extinguishes all the light-emitting elements in the light-emitting element array 20A. The error determination time $t_{ERR1}$ is longer than (e.g., twice to five times) the period of the clock signal Sclk. The error determination time $t_{ERR1}$ may be or may not be equal to the error determination time $t_{ERR2}$ in Practical Example EX1_3.

In the slave fault condition supposed here, starting with immediately after time point $T_A[12]$, the potential at the terminal CLK is held at low level. After the time point that the potential at the terminal CLK is held at low level, at the lapse of the error determination time $t_{ERR1}$, that is, at time point $T_{AE3}$, the main controller 120A, with priority over the first driving sequence, turns on all the switch elements SW[1] to SW[8] (or turns off the switch element 185 in FIG. 3), thereby extinguishing all the light-emitting elements in the light-emitting element array 20A and thereafter holding all the light-emitting elements in the light-emitting element array 20A in the extinguished state. Through this operation, also in the slave fault condition, the all-extinguished-at-fault requirement is met.

Incidentally, in FIG. 19, during the period between time points $T_A[12]$ and $T_{AE3}$, as a state preceding the state SX[0], a state SX[8] momentarily occurs in which, while all the light-emitting elements in the light-emitting element array 20B is in the extinguished state, all the light-emitting elements in the light-emitting element array 20A are in the lit state. This period, however, is so short that the exceptional state is not perceptible to the human sight and poses no problem. If necessary, a configuration is possible where, in the light emission control device 10B, all the light-emitting elements in the light-emitting element array 20B are switched to the extinguished state at the lapse of the error determination time $t_{ERR1}$ after the detection of a fault in a light-emitting element.

Practical Example Ex1_5

Practical Example EX1_5 will be described. A single light emission control device 10 can operate in either the master mode or the signal level in accordance with the voltage at the terminal SEL0. That is, a single light emission control device 10, when operating in the master mode, acts as the light emission control device 10A and, when operating in the slave mode, acts as the light emission control device 10B.

Thus, in connection with the light emission system SYS with the configuration $W_{P1}$ described above, if attention is paid to a single light emission control device that constitutes the light emission system SYS, the single light emission control device can be said to have a configuration $W_{Q1}$ as described below.

Specifically, a light emission control device with the configuration $W_{Q1}$ includes:
- a switch circuit (100) composed of switch elements (SW[1] to SW[8]), corresponding to a plurality of channels, each connected in parallel with one of a plurality of light-emitting elements (LED[1] to LED [8]) included in a light-emitting element array (20);
- a controller (120) that can perform control whereby to control between the on and off states the switch elements in the switch circuit (100) and thereby light or extinguish individually the light-emitting elements in the light-emitting element array;

a clock generator (140) that can generate a clock signal (Sclk) with a variable characteristic; and a clock terminal (CLK), the light emission control device operating in either a first mode or a second mode.

In the first mode (i.e., in operation as the light emission control device 10A), the clock signal generated by the clock generator is fed to the clock terminal, and in the first mode, when triggered by the fulfillment of a predetermined sequence start condition (e.g., the start of supply of electric power), the controller performs a first driving sequence in which it, synchronously with the clock signal, sequentially switches between the on and off states the switch elements in the switch circuit and thereby sequentially switch between the lit and extinguished states the light-emitting elements in the light-emitting element array, and at a particular time point (here, at time point $T_A[8]$) after the start of the first driving sequence, the clock generator changes a characteristic of the clock signal from a predetermined first characteristic to a predetermined second characteristic.

In the second mode (i.e., in operation as the light emission control device 10B), the clock generator ceases to feed the clock signal to the clock terminal and another clock signal (corresponding to the clock signal Sclk output from the light emission control device 10A) generated in another light emission control device is received at the clock terminal, and in the second mode, after a characteristic of the another clock signal received at the clock terminal is changed from the first characteristic to the second characteristic, the controller performs a second driving sequence in which it, synchronously with the another clock signal, sequentially switches between the on and off states the switch elements in the switch circuit and thereby sequentially switches between the lit and extinguished states the light-emitting elements in the light-emitting element array, and the controller determines the time point at which to start the second driving sequence with reference to the time point at which the characteristic of the another clock signal received at the clock terminal is changed.

Practical Example Ex1_6

Practical Example EX1_6 will be described. It has thus far been assumed that eight light-emitting elements (LED[1] to LED[8]) are externally connected to each light emission control device 10. The number of light-emitting elements (hereinafter referred to as the connected light-emitting element number) that are externally connected to each light emission control device 10 can be seven or less.

Figures 21, 22:
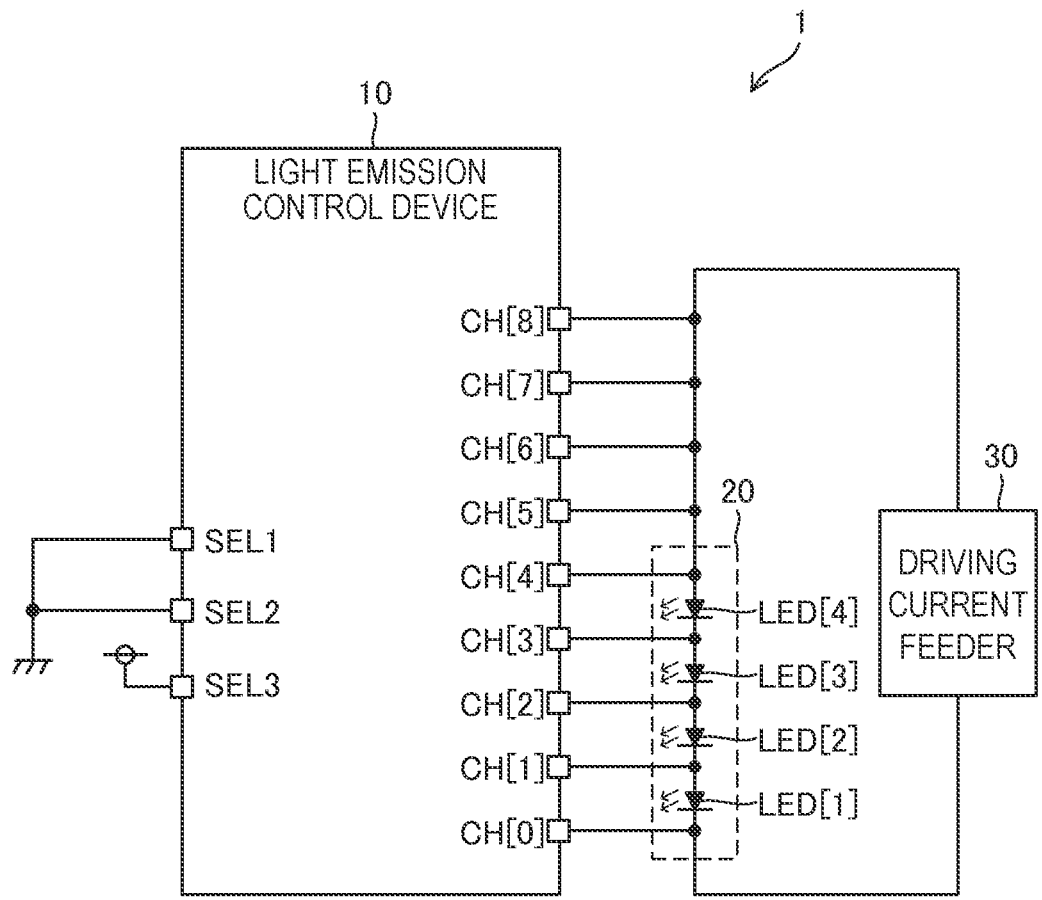
FIG. 21 is a diagram showing a relationship between three terminal voltages and the number of light-emitting elements connected in Practical Example EX1_6 belonging to the first embodiment of the present disclosure.
FIG. 22 is a configuration diagram of a light emission system for controlling four light-emitting elements in Practical Example EX1_6 belonging to the first embodiment of the present disclosure.

FIG. 21 shows the relationship between terminal voltages $V_{SEL1}$ to $V_{SEL3}$ and the connected light-emitting element number. The terminal voltages $V_{SEL1}$, $V_{SEL2}$, and $V_{SEL3}$ refer to the voltages applied to the terminals SEL1, SEL2, and SEL3 respectively. In each light emission control device 10, in accordance with the combination of the terminal voltages $V_{SEL1}$ to $V_{SEL3}$, the main controller 120 determines the number (i.e., the connected light-emitting element number) of light-emitting elements that are externally connected to the terminals CH[0] to CH[8]. In the main controller 120, if the terminal voltage $V_{SEL1}$ is higher than a positive threshold voltage lower than the voltage Vreg, the terminal voltage $V_{SEL1}$ is recognized to be at high level; otherwise the terminal voltage $V_{SEL1}$ is recognized to be at low level. The same applies to the terminal voltages $V_{SEL2}$ and $V_{SEL3}$. The terminals SEL1, SEL2, and SEL3 are each connected to either the terminal VREG or GND, and thus the terminal voltages $V_{SEL1}$ to $V_{SEL3}$ are each set at either high or low level.

When the terminal voltages $V_{SEL1}$ to $V_{SEL3}$ are all at low level, the main controller 120 recognizes that the terminals CH[0] to CH[8] are in an eighth connection state, and the light emission device 1 is actually brought into the eighth connection state. The eighth connection state is, as described above, a state where the light-emitting elements LED[0] to LED[8] are externally connected to the terminals CH[0] to CH[8].

When the terminal voltages $V_{SEL1}$ to $V_{SEL3}$ are at high level, low level, and low level respectively, the main controller 120 recognizes that the terminals CH[0] to CH[8] are in a seventh connection state, and the light emission device 1 is actually brought into the seventh connection state. The seventh connection state is a state where, as compared with the eighth connection state, the light-emitting element LED[8] is removed and the unnecessary interchannel path (between the terminals CH[8] and CH[7]) is short-circuited together outside the light emission control device 10.

When the terminal voltages $V_{SEL1}$ to $V_{SEL3}$ are at low level, high level, and low level respectively, the main controller 120 recognizes that the terminals CH[0] to CH[8] are in a sixth connection state, and the light emission device 1 is actually brought into the sixth connection state. The sixth connection state is a state where, as compared with the eighth connection state, the light-emitting elements LED[8] and LED[7] are removed and the unnecessary interchannel paths (between the terminals CH[8] and CH[6]) are short-circuited together outside the light emission control device 10.

When the terminal voltages $V_{SEL1}$ to $V_{SEL3}$ are at high level, high level, and low level respectively, the main controller 120 recognizes that the terminals CH[0] to CH[8] are in a fifth connection state, and the light emission device 1 is actually brought into the fifth connection state. The fifth connection state is a state where, as compared with the eighth connection state, the light-emitting elements LED[8] to LED[6] are removed and the unnecessary interchannel paths (between the terminals CH[8] and CH[5]) are short-circuited together outside the light emission control device 10.

When the terminal voltages $V_{SEL1}$ to $V_{SEL3}$ are at low level, low level, and high level respectively, the main controller 120 recognizes that the terminals CH[0] to CH[8] are in a fourth connection state, and the light emission device 1 is actually brought into the fourth connection state. The fourth connection state is a state where, as compared with the eighth connection state, the light-emitting elements LED[8] to LED[5] are removed and the unnecessary interchannel paths (between the terminals CH[8] and CH[4]) are short-circuited together outside the light emission control device 10.

When the terminal voltages $V_{SEL1}$ to $V_{SEL3}$ are at high level, low level, and high level respectively, the main controller 120 recognizes that the terminals CH[0] to CH[8] are in a third connection state, and the light emission device 1 is actually brought into the third connection state. The third connection state is a state where, as compared with the eighth connection state, the light-emitting elements LED[8] to LED[4] are removed and the unnecessary interchannel paths (between the terminals CH[8] and CH[3]) are short-circuited together outside the light emission control device 10.

When the terminal voltages $V_{SEL1}$ to $V_{SEL3}$ are at low level, high level, and high level respectively, the main controller 120 recognizes that the terminals CH[0] to CH[8] are in a second connection state, and the light emission device 1 is actually brought into the second connection state. The second connection state is a state where, as compared with the eighth connection state, the light-emitting elements LED[8] to LED[3] are removed and the unnecessary interchannel paths (between the terminals CH[8] and CH[2]) are short-circuited together outside the light emission control device 10.

When the terminal voltages $V_{SEL1}$ to $V_{SEL3}$ are all at high level, the main controller 120 recognizes that the terminals CH[0] to CH[8] are in a first connection state, and the light emission device 1 is actually brought into the first connection state. The first connection state is a state where, as compared with the eighth connection state, the light-emitting elements LED[8] to LED[2] are removed and the unnecessary interchannel paths (between the terminals CH[8] and CH[1]) are short-circuited together outside the light emission control device 10.

As one example, FIG. 22 shows the connection configuration of the light emission device 1 in the fourth connection state. As described above, while the fault detector 130 can detect a fault in the light-emitting element LED[i] based on the voltage between the terminals CH[i] and CH[i−1], in the light emission device 1 in FIG. 22 the main controller 120, based on the terminal voltages $V_{SEL1}$ to $V_{SEL3}$ being at low level, low level, and high level respectively, instructs the fault detector 130 to exclude from the targets of monitoring the voltages between the terminals CH[4] and CH[5], between the terminals CH[5] and CH[6], between the terminals CH[6] and CH[7], and between the terminals CH[7] and CH[8]. As a result, in the light emission device 1 in FIG. 22, the signal Serr does not depend on those voltages that are excluded from the targets of monitoring.

A description will now be given of the sequential lighting operation that is performed when the light emission control device 10 in the light emission device 1 in FIG. 22 is used as the light emission control device 10A. It is here assumed that eight light-emitting elements LED[1] to LED[8] are connected to the slave-side light emission control device 10B. In this case, in sequential lighting operation, the main controller 120A in the light emission control device 10A counts the number of clock pulses in the clock signal Sclk fed from the buffer circuit BFA and, starting with the all-extinguished state SX[0] up to the state SX[4], executes a transition from the state SX[i] to the state SX[i+1] every time the number of clock pulses increases by eight. At the time point when, starting at time point $T_A[0]$, the number of clock pulses counted becomes "32", that is, at time point $T_A[4]$, the main controller 120A switches the value of the control signal CNT2 from "0" to "1" and thereby switches the characteristic of the clock signal Sclk fed from the clock generator 140A from the first characteristic to the second characteristic. After the characteristic of the clock signal Sclk switches from the first characteristic to the second characteristic, the slave-side main controller 120B counts the number of clock pulses in the clock signal Sclk fed from the buffer circuit BFB and, starting with the state SX[4], sequentially lights the light-emitting elements LED[1] to LED[8] such that, of the light-emitting elements connected to the light emission control device 10B, the number of light-emitting elements lit increases by one every time the number of clock pulses increases by eight.

A description will now be given of the sequential lighting operation that is performed when the light emission control device 10 in the light emission device 1 in FIG. 22 is used as the light emission control device 10B. It is here assumed that eight light-emitting elements LED[1] to LED[8] are connected to the master-side light emission control device 10A. In this case, in sequential lighting operation, the main controller 120A in the light emission control device 10A counts the number of clock pulses in the clock signal Sclk fed from the buffer circuit BFA and, starting with the all-extinguished state SX[0] up to the state SX[8], executes a transition from the state SX[i] to the state SX[i+1] every time the number of clock pulses increases by eight. At the time point when, starting at time point $T_A[0]$, the number of clock pulses counted becomes "64", that is, at time point $T_A[8]$, the main controller 120A switches the value of the control signal CNT2 from "0" to "1" and thereby switches the characteristic of the clock signal Sclk fed from the clock generator 140A from the first characteristic to the second characteristic. After the characteristic of the clock signal Sclk switches from the first characteristic to the second characteristic, the slave-side main controller 120B counts the number of clock pulses in the clock signal Sclk fed from the buffer circuit BFB and, starting with the state SX[8] up to the state SX[12], sequentially lights the light-emitting elements LED[1] to LED[4] such that, of the light-emitting elements connected to the light emission control device 10B, the number of light-emitting elements lit increases by one every time the number of clock pulses increases by eight.

While the above description deals with an example where, of the light emission control devices 10A and 10B, one is in the eighth connection state and the other is in the fourth connection state, a similar description applies in cases where the light emission control devices 10A and 10B are both in a connection state other than the eighth. With this configuration, it is possible to flexibly meet different user requirements (as to the numbers of light-emitting elements needed in the light emission devices 1A and 1B).

Second Embodiment

A second embodiment of the present disclosure will be described. The second embodiment, and also the third to fifth embodiments described later, is an embodiment based on the first embodiment. For any feature that is not specifically described in connection with the second to fifth embodiments, unless inconsistent, the description of the corresponding feature in the first embodiment applies to the second to fifth embodiments. In interpreting the second embodiment, for any part of its description which contradicts that of the first embodiment, the description given in connection with the second embodiment can prevail (the same is true with the third to fifth embodiments described later). Unless inconsistent, any two or more of the first to fifth embodiments can be implemented in combination.

A law or regulation directed to vehicles (e.g., a US law or regulation at the time of the filing of the present application) may require that the brightness of a turn lamp at the start of its lighting be equal to or higher than a predetermined brightness. In sequential lighting operation, to meet that requirement, the brightness of the turn lamp in the state SX[1] (see FIG. 8) has to be equal to or higher than the predetermined brightness (i.e., the brightness of one light-emitting element, specifically LED[1] on its own, has to be equal to or higher than the predetermined brightness), and this is often difficult to satisfy. Accordingly, to meet the above-mentioned requirement, instead of sequential lighting operation, sequential extinguishing operation may be performed in a light emission system SYS.

With respect to sequential lighting operation and sequential extinguishing operation, a light emission control device 10 capable of only sequential lighting operation and a light emission control device 10 capable of only sequential extinguishing operation may be manufactured separately. Instead, a light emission control device 10 may be configured to be capable of both sequential lighting operation and sequential extinguishing operation. In this case, the light emission control device 10 can be provided with, as one external terminal, a terminal SEL4 (not shown) so that, in accordance with the voltage at the terminal SEL4, the main controller 120 can perform either sequential lighting operation or sequential extinguishing operation.

Figure 23:
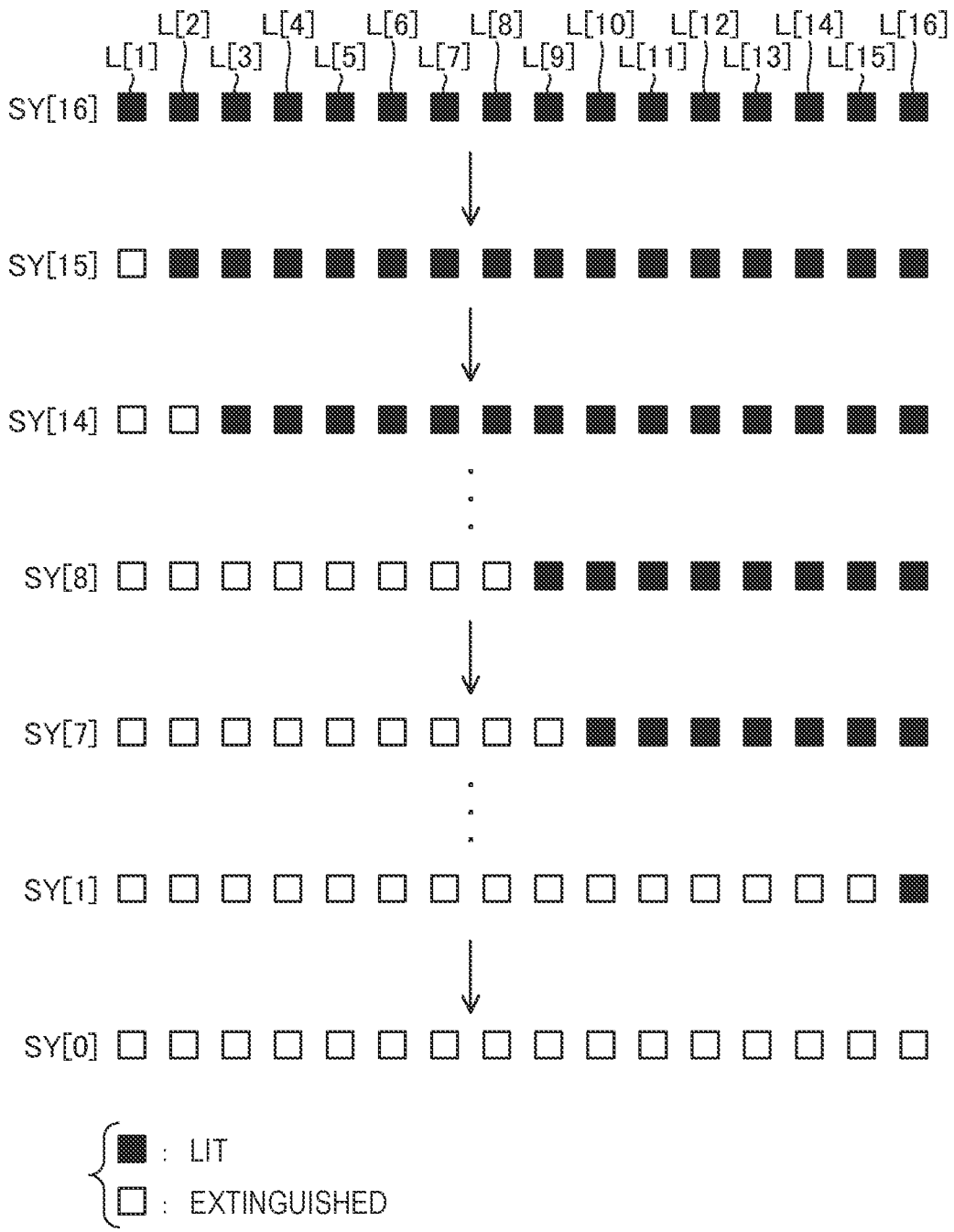
FIG. 23 is a diagram showing a sequence of sequential extinguishing operation according to a second embodiment of the present disclosure.

The following description of the second embodiment deals with sequential extinguishing operation that can be performed on the light emission system SYS in FIG. 4. It is assumed that a vehicle CC has a right turn lamp structured as in the first embodiment (see FIG. 7). FIG. 23 shows the sequence of sequential extinguishing operation. In sequential extinguishing operation, the light emission devices 1A and 1B operate in coordination so as to extinguish, starting with the state where all the light-emitting segments L[1] to L[16] are lit, the light-emitting segments one after another as time passes from the light-emitting segment L[1] toward the light-emitting segment L[16].

The state where all the light-emitting segments L[1] to L[16] are lit (i.e., the state where all the light-emitting elements in the light-emitting element arrays 20A and 20B are lit) will be referred to as the all-lit state SY[16], and the state where all the light-emitting segments L[1] to L[16] are extinguished (i.e., the state where all the light-emitting elements in the light-emitting element arrays 20A and 20B are extinguished) will be referred to as the all-extinguished state SY[0]. For an integer j that satisfies 2≤j≤16, a state where, of the light-emitting segments L[1] to L[16], only the light-emitting segment L[j] the L[16] are lit, will be identified by SY[17−j].

In sequential extinguishing operation, starting with the all-lit state SY[16] up to the all-extinguished state SY[0], a transition from the state SY[i+1] to the state SY[i] occurs at equal time intervals. Once the all-extinguished state SY[0] is reached, the all-extinguished state SY[0] is kept.

Figure 24:
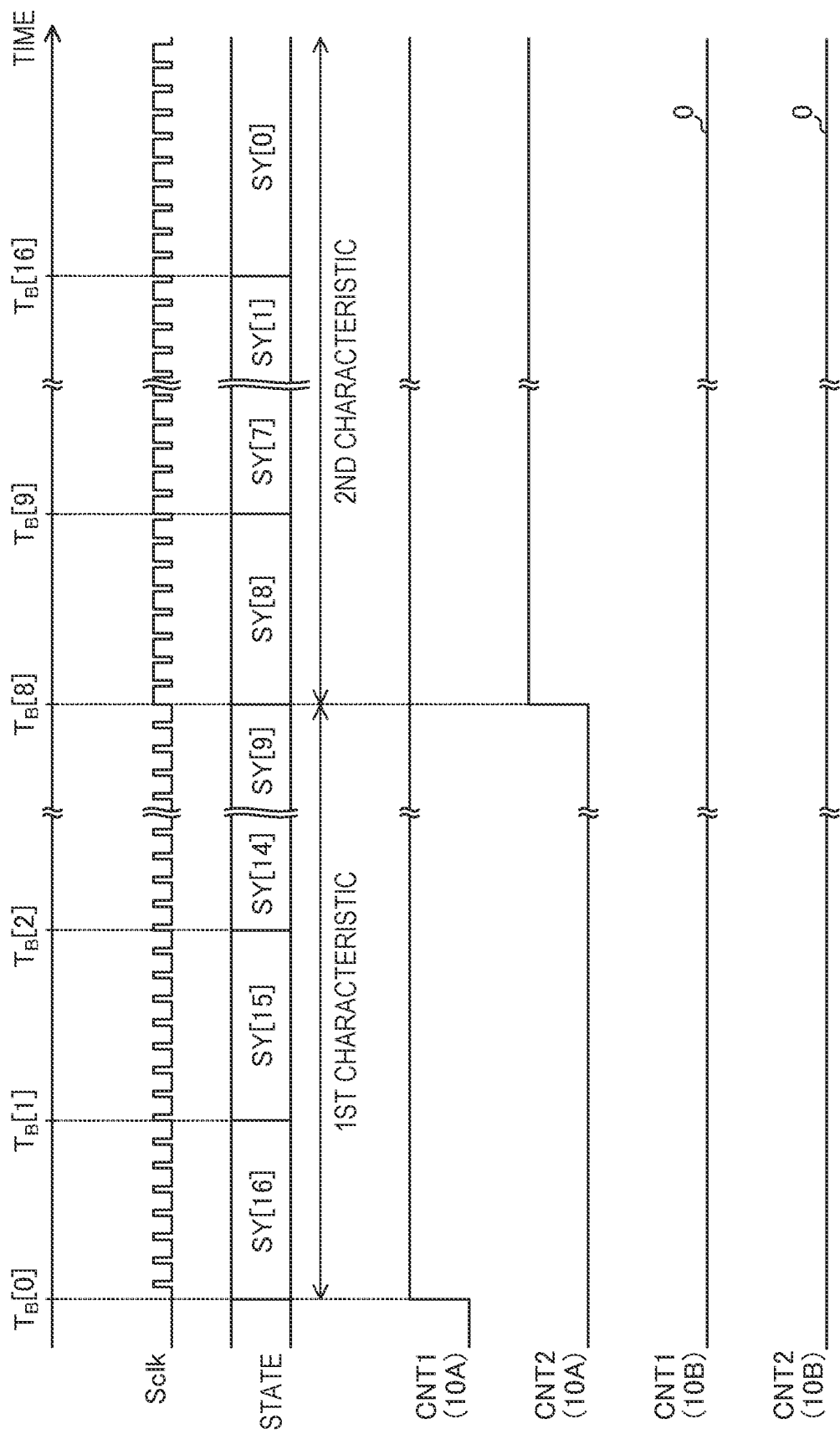
FIG. 24 is a diagram showing a sequence of sequential extinguishing operation in a normal condition according to the second embodiment of the present disclosure.

With reference to FIG. 24, assuming a normal condition where no fault (open fault or short fault) is present in any of the light-emitting elements constituting the light-emitting element arrays 20A and 20B, the sequential extinguishing operation on the light emission system SYS will be described in detail. FIG. 24 is a timing chart of sequential extinguishing operation in the normal condition.

When the light emission system SYS starts to be supplied with the input voltage Vin, the light emission control devices 10A and 10B (main controllers 120A and 120B) start up substantially at the same time. Time point $T_B[0]$ is the time point when a predetermined start-up delay time has elapsed since the light emission control devices 10A and 10B (the main controllers 120A and 120B) started up. In the light emission control device 10A, when the main controller 120A starts up, the value of the control signal CNT1 is "0", and at time point $T_B[0]$, the value of the control signal CNT1 is switched from "0" to "1"; at this time the value of the control signal CNT2 is "0" (see FIG. 10). In the light emission control device 10A, the value of the control signal CNT1 being switched from "0" to "1" triggers the start of the generation and output of the clock signal Sclk with the first characteristic (see FIG. 10). In the normal condition, from time point $T_B[0]$ on, the value of the control signal CNT1 in the light emission control device 10A is kept at "1".

On the other hand, in the light emission control device 10B operating in the slave mode, the value of the control signal CNT1 is "0" throughout. Moreover, in the light emission control device 10B, the value of the control signal CNT2 is in principle "0" so that the transistor 141 is held off. In the normal condition, as in principle, the voltage of the control signal CNT2 in the light emission control device 10B is "0".

The main controller 120A, at the time point when the predetermined start-up delay time has elapsed since it started up, turns off all the switch elements SW[1] to SW[8] and thereby lights all the light-emitting elements in the light-emitting element array 20A. Independently of that, the main controller 120B, at the time point when the predetermined start-up delay time has elapsed since it started up, turns off all the switch elements SW[1] to SW[8] and thereby lights all the light-emitting elements in the light-emitting element array 20B. In strict terms, the time point at which the switch elements SW[1] to SW[8] in the light emission device 1A are turned off and the time point at which the switch elements SW[1] to SW[8] in the light emission device 1B are turned off may slightly differ; here, the difference is ignored and those time points are assumed to coincide at time point $T_B[0]$. Thus, at time point $T_B[0]$, a transition occurs from the all-extinguished state SY[0] to the all-lit state SY[16].

Starting at time point $T_B[0]$, the main controller 120A starts to count the number of clock pulses in the clock signal Sclk fed from the buffer circuit BFA and executes, every time the number of clock pulses increases by eight, a transition from the state SY[i] to the state SY[i−1], starting with the all-lit state SY[16] up to the state SY[8]. The number of clock pulses in the clock signal Sclk denotes the number of times that an up edge occurs in the clock signal Sclk.

That is, starting at time point $T_B[0]$, at time point $T_B[1]$, when the number of times that an up edge has occurred in the clock signal Sclk becomes "8", the main controller 120A turns on, of the switch elements SW[1] to SW[8], only the switch element SW[1] to execute a transition from the all-lit state SY[16] to the state SY[15]. After that, starting at time point $T_B[1]$, at time point $T_B[2]$, when the number of times that an up edge has occurred in the clock signal Sclk has increased by another "8", the main controller 120A, while keeping the switch element SW[1] on, turns on, of the switch elements SW[2] to SW[8], only the switch element SW[2] to execute a transition from the state SY[15] to the state SY[14]. After that, similar operation is repeated. Time point $T_B[i]$ is the time point when a transition occurs from the state SY[17−i] to the state SY[16−i].

At the time point when the number of clock pulses that has been counted starting at time point $T_B[0]$ becomes "64", that is, at time point $T_B[8]$, the main controller 120A switches the value of the control signal CNT2 from "0" to "1" and thereafter keeps the value of the control signal CNT2 at "1". In the normal condition, from time point $T_B[8]$ on, the main controller 120A keeps all the switch elements SW[1] to SW[8] on (or keeps the switch element 185 in FIG. 3 off) and thereby keeps all the light-emitting elements in the light-emitting element array 20A extinguished.

At time point $T_B[8]$, under the control of the main controller 120A, the characteristic of the clock signal Sclk output from the clock generator 140A switches from the first characteristic to the second characteristic. In the light emission control device 10B, the main controller 120B can perform characteristic check operation as mentioned in connection with the first embodiment. Through the characteristic check operation, the main controller 120B detects as a characteristic change time point the time point that the characteristic of the clock signal Sclk switches from the first characteristic to the second characteristic. The detected characteristic change time point is, here, time point $T_B[8]$.

After the characteristic of the clock signal Sclk switches form the first characteristic to the second characteristic, the slave-side main controller 120B counts the number of clock pulses in the clock signal Sclk fed from the buffer circuit BFB, and executes a shift from the state SY[i] to the state SY[i−1] every time the number of clock pulses increases by eight, starting with the state SY[8] up to the state SY[0].

That is, starting at time point $T_B[8]$, at time point $T_B[9]$, when the number of times that an up edge has occurred in the clock signal Sclk becomes "8", the main controller 120B turns on, of the switch elements SW[1] to SW[8], only the switch element SW[1] to execute a transition from the state SY[8] to the state SY[7]. After that, starting at time point $T_B[9]$, at time point $T_B[10]$, when the number of times that an up edge has occurred in the clock signal Sclk has increased by another "8", the main controller 120B, while keeping the switch element SW[1] on, turns on, of the switch elements SW[2] to SW[8], only the switch element SW[2] to execute a transition from the state SY[7] to the state SY[6]. After that, similar operation is repeated.

At the time point when the number of clock pulses that has been counted starting at time point $T_B[8]$ becomes "64", that is, at time point $T_B[16]$, a transition occurs from the state SY[1] to the all-extinguished state SY[0], and thereafter the all-extinguished state SY[0] is kept. In the normal condition, the clock generator 140A continues to generate and output the clock signal Sclk after time point $T_B[16]$ until the light emission device 1A ceases to be supplied with the input voltage Vin.

As described above, with the turn lever provided near the driver's seat in the vehicle CC inclined in the right turn direction from the predetermined neutral position, the ECU 5 turns on and off the switch element 4 periodically and alternately to supply the light emission system SYS (the light emission devices 1A and 1B) intermittently with electric power based on the input voltage Vin. In each period at which the switch element 4 is repeatedly turned on and off, the length of time for which the switch element 4 is kept on is longer than the length of time between time points $T_B[0]$ and $T_B[16]$, and is, for example, twice the length of time between time points $T_B[0]$ and $T_B[16]$. Thus, so long as the turn lever remains inclined in the right turn direction, sequential extinguishing operation involving sequential transitions from the all-lit state SY[16] via the states SY[15] to SY[1] to the all-extinguished state SY[0] is performed repeatedly.

In sequential extinguishing operation, the first driving sequence denotes a sequence of operation in which the light-emitting elements in the first light-emitting element array (20A) are switched between the lit and extinguished states sequentially from the state SY[16] to the state SY[8]. In sequential extinguishing operation, the second driving sequence is a sequence performed subsequently to the first driving sequence, and denotes a sequence of operation in which the light-emitting elements in the second light-emitting element array (20B) are switched between the lit and extinguished states sequentially from the state SY[8] to the state SY[0].

In the second embodiment, with the fulfillment of a predetermined sequence start condition, first, the main controllers 120A and 120B light all the light-emitting elements in the light-emitting element arrays 20A and 20B; after that, through the first driving sequence by the main controller 120A, the number of light-emitting elements lit in the first light-emitting element array (20A) is decreased sequentially at time intervals synchronous with the clock signal; subsequently through the second driving sequence by the main controller 120B, the number of light-emitting elements lit in the second light-emitting element array (20B) is decreased sequentially at time intervals synchronous with the clock signal. Here, while in the example in FIG. 24 the time intervals synchronous with the clock signal equal eight times the clock period, this is not meant as any limitation; the time intervals may be any integer times the clock period.

In sequential extinguishing operation, at a particular time point (here, $T_B[8]$) after the start of the first driving sequence, the clock generator 140A changes a characteristic of the clock signal Sclk from a predetermined first characteristic to a predetermined second characteristic. In the example of operation described above, time point $T_B[8]$ corresponds to the particular time point. Time point $T_B[8]$ can be said to be the time point of the end of the first driving sequence. The particular time point may be any other time point after the start of the first driving sequence. For example, after the time point $T_B[8]$ of the transition from the state SY[9] to the state SY[8], the time point of the fourth up edge in the clock signal Sclk may be taken as the particular time point. In that case, after the characteristic of the clock signal Sclk switches from the first characteristic to the second characteristic, when the number of clock pulses in the clock signal Sclk fed from the buffer circuit BFB reaches "4", the slave-side main controller 120B can execute a transition from the state SY[8] to the state SY[7]. After the time point $T_B[9]$ of the transition from the state SY[8] to the state SY[7], operation proceeds as described above. Any time point between time points between $T_B[6]$ and $T_B[7]$ or between $T_B[7]$ and $T_B[8]$ may be taken as the particular time point.

The sequence start condition is fulfilled when the light emission system SYS starts to be fed with electric power, and this is as in Practical Example EX1_1. The sequence start condition may instead be fulfilled based on an enable signal Sen as described in connection with Practical Example EX1_2.

In the second embodiment, the operation in a master fault condition may be similar to that described in connection with Practical Example EX1_3. Specifically, after time point $T_B[0]$, if the master-side fault detector 130A detects a fault in any of the light-emitting elements in the light-emitting element array 20A, a signal Serr indicating fault detection is transmitted to the main controller 120A. In response to the signal Serr, the main controller 120A substitutes and latches "1" in the fault flag FLGA it keeps in it. When the value of the fault flag FLGA is "1", the main controller 120A, with priority over the first driving sequence it can perform, extinguishes all the light-emitting elements in the light-emitting element array 20A and in addition makes the values of the control signals CNT1 and CNT2 "0" and "1" respectively.

In the light emission control device 10A, making the values of the control signals CNT1 and CNT2 "0" and "1" respectively results in, as shown in FIG. 17, the transistor 141 (the transistor 141 in the light emission control device 10A) being held on and the potential of the clock signal Sclk being held at low level. Accordingly, the potentials at the respective terminals CLK of the light emission control devices 10A and 10B and the signal potential on the clock lead WR are held at low level, and also the output signal of the buffer circuit BFB in the light emission control device 10B is held at low level.

The slave-side main controller 120B performs slave-side monitoring operation in which it monitors the potential at the terminal CLK (the terminal CLK of the light emission control device 10B) based on the output signal of the buffer circuit BFB. In the light emission control device 10B, the main controller 120B can start the slave-side monitoring operation after it has started up, or after the enable signal Sen switches from "0" to "1". In the slave-side monitoring operation, if the potential at the terminal CLK (the terminal CLK of the light emission control device 10B) is held (e.g., at low level) for a predetermined error determination time $t_{ERR2}$ or longer, the main controller 120B, with priority over the second driving sequence, extinguishes all the light-emitting elements in the light-emitting element array 20B. This takes place even before the start of the second driving sequence. That is, for example, if it is judged at time point $T_B[2]$ in FIG. 24 that the potential at the terminal CLK (the terminal CLK of the light emission control device 10B) is held for the predetermined error determination time $t_{ERR2}$ or longer, the main controller 120B immediately extinguishes all the light-emitting elements in the light-emitting element array 20B, and thereafter does not perform the second driving sequence.

In the second embodiment, the operation in a slave fault condition may be similar to that described in connection with Practical Example EX1_4. Specifically, after time point $T_B[0]$, if the slave-side fault detector 130B detects a fault in any of the light-emitting elements in the light-emitting element array 20B, a signal Serr indicating fault detection is transmitted to the main controller 120B. In response to the signal Serr, the main controller 120B substitutes and latches "1" in the fault flag FLGB it keeps in it. When the value of the fault flag FLGB is "1", the main controller 120B, with priority over the second driving sequence it can perform, extinguishes all the light-emitting elements in the light-emitting element array 20B and in addition makes the values of the control signals CNT1 and CNT2 "0" and "1" respectively. This takes place even before the start of the second driving sequence. That is, for example, if the value of the fault flag FLGB switches from "0" to "1" at time point $T_B[2]$, the main controller 120B immediately extinguishes all the light-emitting elements in the light-emitting element array 20B, and thereafter does not perform the second driving sequence.

In the light emission control device 10B, making the values of the control signals CNT1 and CNT2 "0" and "1" respectively results in, as shown in FIG. 20, the transistor 141 (the transistor 141 in the light emission control device 10B) being held on and the potential of the clock signal Sclk being held at low level. Accordingly, the potentials at the respective terminals CLK of the light emission control devices 10A and 10B and the signal potential on the clock lead WR are held at low level, and also the output signal of the buffer circuit BFA in the light emission control device 10A is held at low level.

The master-side main controller 120A performs master-side monitoring operation in which it monitors the potential at the terminal CLK (the terminal CLK of the light emission control device 10A) based on the output signal of the buffer circuit BFA. The main controller 120A can start the master-side monitoring operation after it has started up, or after the enable signal Sen switches from "0" to "1". In the master-side monitoring operation, if the potential at the terminal CLK (the terminal CLK of the light emission control device 10A) is held (e.g., at low level) for a predetermined error determination time $t_{ERR1}$ or longer, the main controller 120A, with priority over the first driving sequence, extinguishes all the light-emitting elements in the light-emitting element array 20A.

Third Embodiment

Figure 25:
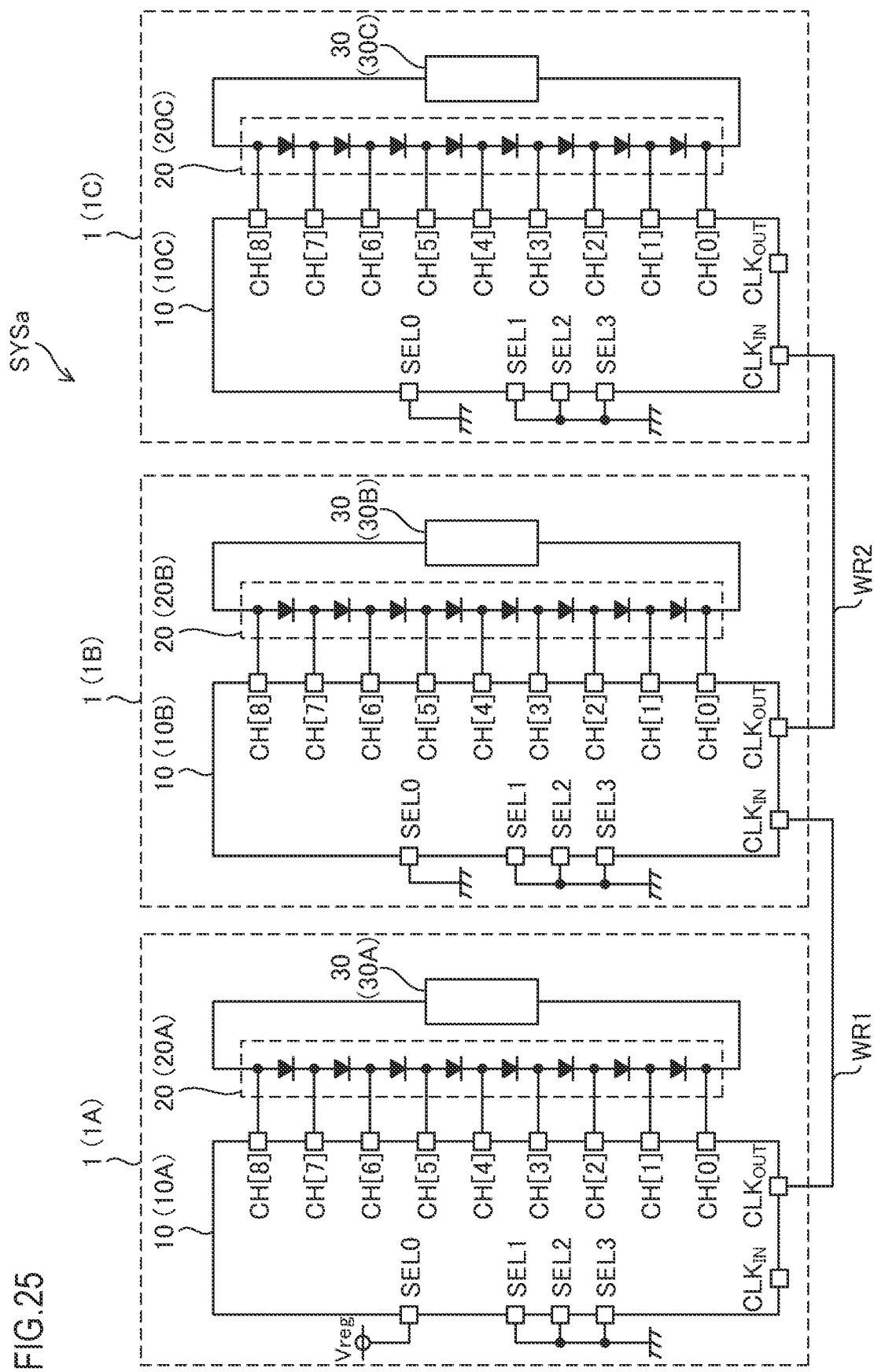
FIG. 25 is a configuration diagram of a light emission system according to a third embodiment of the present disclosure.

A third embodiment of the present disclosure will be described. A light emission system SYS may include three or more light emission devices 1. FIG. 25 shows the configuration of a light emission system SYSa, which is a light emission system SYS that includes three light emission devices 1. The configuration of each of the light emission devices 1 in the light emission system SYSa can be as described in connection with the first or second embodiment. One difference is that, in the light emission system SYSa, each light emission device 1 has, as external terminals, terminals $CLK_{OUT}$ and $CLK_{IN}$ instead of the terminal CLK described above. A description will be given below of special sequential lighting operation that uses the terminals $CLK_{OUT}$ and $CLK_{IN}$.

In the light emission system SYSa, one light emission device 1 operates in the master mode, and the other two light emission devices 1 operate in the slave mode. In the light emission system SYSa, the one light emission device 1 operating in the master mode will be referred to as the light emission device 1A, and the two light emission devices 1 operating in the slave mode will be referred to as the light emission devices 1B and 1C. It is assumed that the light emission devices 1A, 1B, and 1C are all in the eighth connection state mentioned above (the state where the light-emitting elements LED[1] to LED[8] are connected to them) (though they may be in any connection state other than the eighth). The light emission control devices 10 in the light emission devices 1A, 1B, and 1C will be identified by the reference signs "10A", "10B", and "10C" respectively, the light-emitting element arrays 20 in the light emission devices 1A, 1B, and 1C will be identified by the reference signs "20A", "20B", and "20C" respectively, and the driving current feeders 30 in the light emission devices 1A, 1B, and 1C will be identified by the reference signs "30A", "30B", and "30C" respectively. The terminal $CLK_{OUT}$ of the light emission control device 10A is connected to the terminal $CLK_{IN}$ of the light emission control device 10B via a clock lead WR1, which is a cable provided between the devices 10A and 10B. The terminal $CLK_{OUT}$ of the light emission control device 10B is connected to the terminal $CLK_{IN}$ of the light emission control device 10C via a clock lead WR2, which is a cable provided between the devices 10B and 10C. In the light emission system SYSa, the terminal $CLK_{IN}$ of the light emission control device 10A and the terminal $CLK_{OUT}$ of the light emission control device 10C are left unused.

The terminal $CLK_{OUT}$ of the light emission control device 10A in the light emission system SYSa functions as the terminal CLK of the light emission control device 10A in the first embodiment, and the terminal $CLK_{IN}$ of the light emission control device 10B in the light emission system SYSa functions as the terminal CLK of the light emission control device 10B in the first embodiment. Based on the clock signal Sclk generated in the light emission control device 10A, the light emission control devices 10A and 10B operate in coordination to sequentially light the light-emitting elements in the light-emitting element arrays 20A and 20B, and this operation (sequential lighting operation) is as described in connection with the first embodiment.

In the third embodiment, each light emission control device 10 includes a clock signal wave shaping circuit (not shown). In each light emission control device 10, the clock signal wave shaping circuit is fed with the output signal of a buffer circuit BF.

In each light emission control device 10, if the characteristic of the clock signal Sclk input via the terminal $CLK_{IN}$ is the first characteristic, the clock signal wave shaping circuit outputs via the terminal $CLK_{OUT}$ the clock signal Sclk input via the terminal $CLK_{IN}$ unchanged.

In each light emission control device 10, after the characteristic of the clock signal Sclk input via the terminal $CLK_{IN}$ switches form the first characteristic to the second characteristic, during a wave-shaping target period, the clock signal wave shaping circuit changes the characteristic of the clock signal Sclk input via the terminal $CLK_{IN}$ to the first characteristic and outputs via the terminal $CLK_{OUT}$ the clock signal Sclk having its characteristic so changed; subsequently in a through period, the clock signal wave shaping circuit outputs via the terminal $CLK_{OUT}$ the clock signal Sclk input via the terminal $CLK_{IN}$ unchanged. In each light emission control device 10, the wave-shaping target period is the period from when the characteristic of the clock signal Sclk input via the terminal $CLK_{IN}$ changes from the first characteristic to the second characteristic to when the number of clock pulses in the clock signal Sclk as counted starting with the time point of the switch of the clock signal Sclk input via the terminal $CLK_{IN}$ from the first characteristic to the second characteristic reaches "64", and the through period is a period subsequent to the end of the wave-shaping target period.

The clock signal wave shaping circuit operates only in a light emission control device 10 operating in the slave mode, and remains inoperative in the light emission control device 10 operating in the master mode. In the light emission system SYSa in FIG. 25, only the clock signal wave shaping circuit in the light emission control device 10B operates effectually.

On the basis of the operation example in FIG. 14, the sequential lighting operation on the light emission system SYSa in FIG. 25 will be described. Immediately after the light emission control devices 10A to 10C start up, at time point $T_A[0]$, all the light-emitting elements in the light-emitting element arrays 20A to 20C are in the extinguished state.

After time point $T_A[0]$, the operation starting with the all-extinguished state SX[0] up to the state SX[16] is as described above in connection with Practical Example EX1_1. Accordingly, at time point $T_A[8]$, the characteristic of the clock signal Sclk output from the clock generator 140 in the light emission control device 10A switches from the first characteristic to the second characteristic, and through the characteristic check operation in the light emission control device 10B, time point $T_A[8]$ is detected as the characteristic change time point; after that, with reference to the characteristic change time point ($T_A[8]$), the second driving sequence is performed by the light emission control device 10B.

In the light emission control device 10B, the clock signal wave shaping circuit sets as the wave-shaping target period the period starting with the characteristic change time point ($T_A[8]$) and ending when the number of clock pulses in the clock signal Sclk reaches "64" and sets as the through period a period subsequent to it. Accordingly, in the operation example in FIG. 14, the period from time point $T_A[8]$ to time point $T_A[16]$ is the wave-shaping target period. In the light emission control device 10B, during the wave-shaping target period (the period between time points $T_A[8]$ and $T_A[16]$), the clock signal wave shaping circuit changes the characteristic of the clock signal Sclk input via the terminal $CLK_{IN}$ to the first characteristic, and outputs via the terminal $CLK_{OUT}$ the clock signal Sclk having its characteristic so changed. In the light emission control device 10B, the clock signal Sclk output via the terminal $CLK_{OUT}$ has a frequency equal to that of the clock signal Sclk input via the terminal $CLK_{IN}$. That is, in the light emission control device 10B, during the wave-shaping target period, the clock signal Sclk input via the terminal $CLK_{IN}$ and the clock signal Sclk output via the terminal $CLK_{OUT}$ differ only in duty factor or pulse width.

Time point $T_A[16]$ is the boundary time point between the wave-shaping target period and the through period. Accordingly, from time point $T_A[16]$ on, the clock signal wave shaping circuit in the light emission control device 10B outputs via the terminal $CLK_{OUT}$ the clock signal Sclk input via the terminal $CLK_{IN}$ unchanged. After time point $T_A[16]$, until the light emission system SYSa ceases to be supplied with the input voltage Vin (or until the enable signal Sen is turned to "0"), all the light-emitting elements in the light-emitting element group arrays 20A and 20B remain lit.

The light emission control device 10C operates in the same manner as the light emission control device 10B (except that the clock signal wave shaping circuit in the light emission control device 10C does not function effectually). The characteristic of the clock signal Sclk fed from the light emission control device 10B to the terminal $CLK_{IN}$ of the light emission control device 10C switches, at time point $T_A[16]$, from the first characteristic to the second characteristic. That is, the clock signal wave shaping circuit in the light emission control device 10B so functions that, as seen from the light emission control device 10C, the time point of the change of the characteristic of the clock signal Sclk is time point $T_A[16]$. Accordingly, through the characteristic check operation by the light emission control device 10C, time point $T_A[16]$ is detected as the characteristic change time point, and after that, with reference to this characteristic change time point ($T_A[16]$), a third driving sequence is performed by the light emission control device 10C.

In the third driving sequence, the main controller 120 in the light emission control device 10C counts the number of clock pulses in the clock signal Sclk input via the terminal $CLK_{IN}$ of the light emission control device 10C based on the output signal of the buffer circuit BF, and can then increase, starting with the state where all the light-emitting elements in the light-emitting element array 20C are extinguished, the number of light-emitting elements lit among the light-emitting elements in the light-emitting element array 20C every time the number of clock pulses increases by eight.

In the light emission system SYSa in FIG. 25, instead of sequential lighting operation, sequential extinguishing operation as described in connection with the second embodiment may be performed. Sequential lighting operation and sequential extinguishing operation differ only in whether the number of light-emitting elements lit increases or decreases as time passes. In a case where sequential extinguishing operation is performed on the light emission system SYSa, in accordance with what has been described above in connection with the third embodiment, the number of light-emitting elements lit can be decreased as time passes across all of the light-emitting element arrays 20A to 20C.

It is also possible to build a light emission system that includes four or more light emission devices 1, and in such cases, sequential lighting operation or sequential extinguishing operation can be performed in similar manners as described above.

Fourth Embodiment

Figure 26:
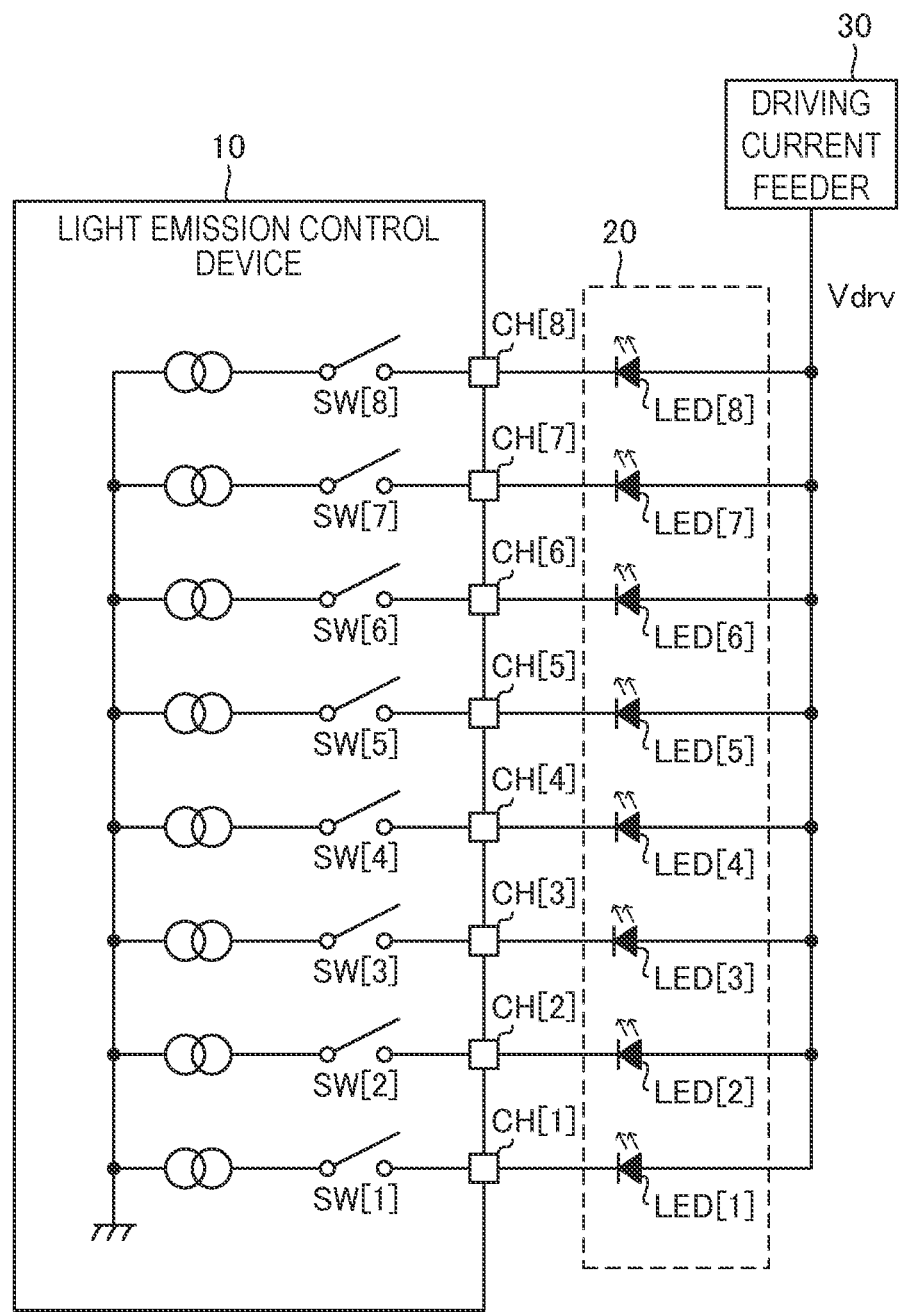
FIG. 26 is a diagram showing interconnection between a light emission control device and a light-emitting element array according to a fourth embodiment of the present disclosure.

A fourth embodiment of the present disclosure will be described. Within a light-emitting element array 20, the interconnection among the plurality of light-emitting elements is not limited to what has been described above; the plurality of light-emitting elements may be connected in parallel with each other. A configuration example of the light emission device 1 so modified that a plurality of light-emitting elements are connected in parallel is shown in FIG. 26. FIG. 26 only shows part of the modified light emission control device 10.

Specifically, assuming that the light-emitting element array 20 includes light-emitting elements LED[1] to LED[8], the anodes of all the light-emitting elements LED[1] to LED[8] are fed with the driving voltage Vdrv output from the driving current feeder 30, and the cathodes of the light-emitting elements LED[1] to LED[8] are connected respectively to the terminals CH[1] to CH[8] of the light emission control device 10. In the light emission control device 10 in FIG. 26, between the terminal CH[i] and the ground, a switch element SW[i] and a constant current circuit are inserted in series (where i is an integer equal to or more than one but equal to or less than eight). Accordingly, with the configuration in FIG. 26, when the switch element SW[i] is on, a current passes through the light-emitting element LED[i], which is thus lit; when the switch element SW[i] is off, no current passes through the light-emitting element LED[i], which thus remains in the extinguished state.

Thus, when what has been described in connection with the first to third embodiments is applied to the configuration in FIG. 26, attention needs to be paid to the fact that the states of the switch element SW[i] for lighting and extinguishing the light-emitting element LED[i] are reversed. Specifically, the state of the switch element SW[i] for lighting the light-emitting element LED[i] is the off state in the first to third embodiments, whereas it is the on state in the configuration in FIG. 26; the state of the switch element SW[i] for extinguishing the light-emitting element LED[i] is the on state in the first to third embodiments, whereas it is the off state in the configuration in FIG. 26. Also in the configuration in FIG. 26, based on the voltage at the terminal CH[i] with the switch element SW[i] on, the presence of a fault in the light-emitting element LED[i] can be detected.

Fifth Embodiment

A fifth embodiment of the present disclosure will be described. The fifth embodiment deals with applied technologies and modified technologies that can be employed in any of the first to fourth embodiments will be described.

As mentioned above, a fault in a light-emitting element can be a short fault or an open fault. When a short fault or open fault is detected in any of the light-emitting elements included in a light emission system (SYS, SYSa), it is possible, by any of the methods described above, to perform a process for extinguishing all the light-emitting elements included in the light emission system (hereinafter called "all-extinguishing process"). The all-extinguishing process may be performed only on detection of an open fault and not on detection of a short fault (that is, the faults mentioned in connection with the first to fourth embodiments may be limited to open faults in light-emitting elements). A setting for disabling the all-extinguishing process may be allowed.

Each light emission control device 10 may be provided with, as external terminals, a first setting terminal and a second setting terminal for determining the details of and whether to perform the all-extinguishing process. In that case,

- when the light emission control device 10 receives a low-level voltage at both the first and second setting terminals, the all-extinguishing process is performed on detection of either of a short fault and an open fault;
- when the light emission control device 10 receives a high-level voltage and a low-level voltage at the first and second setting terminals respectively, the all-extinguishing process is not performed on detection of a short fault but is performed on detection of an open fault;
- when the light emission control device 10 receives a low-level voltage and a high-level voltage at the first and second setting terminals respectively, the all-extinguishing process is performed on detection of a short fault but is not performed on detection of an open fault;
- when the light emission control device 10 receives a high-level voltage at both the first and second setting terminals, the all-extinguishing process is not performed on detection of either a short fault or an open fault.

While FIG. 4 shows a configuration where the light emission system SYS includes separate driving current feeders 30A and 30B corresponding one to one to the light-emitting element arrays 20A and 20B, the light emission system SYS may instead include a single driving current feeder (not shown) that supplies the light-emitting elements (all the light-emitting elements) in the light-emitting element arrays 20A and 20B with the driving current Idrv for lighting them. Or the driving current feeders 30A and 30B in FIG. 4 constitute a driving current feeder that supplies the light-emitting elements (all the light-emitting elements) in the light-emitting element arrays 20A and 20B with the driving current Idrv for lighting them. A similar description applies to a light emission system that includes three or more light-emitting element arrays like the light emission system SYSa in FIG. 25.

For example, in the light emission system SYS in FIG. 4 (see also FIG. 1), a configuration is also possible where the cathode of the light-emitting element LED[1] in the light-emitting element array 20A is connected to the anode of the light-emitting element LED[8] in the light-emitting element array 20B (that is, the light-emitting elements LED[8] to LED[1] in the light-emitting element array 20A and the light-emitting elements LED[8] to LED[1] in the light-emitting element array 20B are connected in series) so that the driving current feeder supplies the driving current Idrv, by application of the driving voltage Vdrv, to a total of 16 light-emitting elements including the light-emitting elements LED[8] to LED[1] in the light-emitting element array 20A and the light-emitting elements LED[8] to LED[1] in the light-emitting element array 20B. In a case where the configuration in FIG. 3 is applied to the light emission system SYS in FIG. 4, a configuration is possible where the diode 319 in FIG. 3 is omitted, the cathode of the light-emitting element LED[1] connected to the light emission control device 10A is connected to the anode of the light-emitting element LED[8] connected to the light emission control device 10B, and a diode is inserted between the cathode of the light-emitting element LED[1] connected to the light emission control device 10B and the terminal VIN of the light emission control device 10A, with the forward direction of the diode pointing from the cathode of the light-emitting element LED[1] connected to the light emission control device 10B to the terminal VIN of the light emission control device 10A.

While the embodiments described above deal with examples where the maximum number of light-emitting elements that can be connected to each light emission control device 10 is "8", the maximum number may be any integer of two or greater (and can even be one).

Instead of the operating mode being switched between the master mode and the slave mode in accordance with the voltage at the terminal SEL0, there may be separately provided a light emission control device 10 dedicated to operating in the master mode and a light emission control device 10 dedicated to operating in the slave mode.

The light-emitting elements that constitute a light-emitting element array 20 may be any light-emitting elements other than light-emitting diodes; they may be light-emitting elements that employ organic electroluminescence.

While the above description assumes a light-emitting element array 20 constituting a right turn lamp, a light-emitting element array 20 may constitute a left turn lamp, or any lamp mounted on a vehicle CC, such as a head lamp, a fog lamp, or a tail lamp.

The present disclosure may be employed in any applications other than vehicle onboard applications.

For any signal or voltage, the relationship between its high and low levels may be reversed so long as that can be done with no essential deviation from what has been described above.

Any of the transistors mentioned above may be of any type. For example, any of the transistors mentioned above as a MOSFET may be replaced with a junction FET, an IGBT (insulated-gate bipolar transistor), or a bipolar transistor.

Embodiments of the present disclosure can be modified in many ways as necessary without departure from the scope of the technical concepts defined in the appended claims. The embodiments described herein are merely examples of how the present disclosure can be implemented, and what is meant by any of the terms used to describe the present disclosure and its constituent elements is not limited to that mentioned in connection with the embodiments. The specific values mentioned in the above description are merely illustrative and needless to say can be modified to different values.

The invention claimed is:

1. A light emission control system comprising:
   a first light emission control device including:
      a first controller configured to be able to perform control whereby to light or extinguish individually a plurality of light-emitting elements included in a first light-emitting element array;
      a clock generator configured to generate a clock signal with a variable characteristic; and
      a first clock terminal connected to a clock lead across which to transmit the clock signal; and
   a second light emission control device including:
      a second controller configured to be able to perform control whereby to light or extinguish individually a plurality of light-emitting elements included in a second light-emitting element array; and
      a second clock terminal connected to the clock lead,
   wherein
      the first controller is configured, when triggered by fulfillment of a predetermined condition, to perform a first driving sequence in which the first controller sequentially switches between lit and extinguished states of the light-emitting elements in the first light-emitting element array synchronously with the clock signal,
      the clock generator is configured, at a particular time point after a start of the first driving sequence, to change the characteristic of the clock signal from a predetermined first characteristic to a predetermined second characteristic, and
      the second controller is configured,
         after the characteristic of the clock signal received at the second clock terminal is changed from the first characteristic to the second characteristic, to perform a second driving sequence in which the second controller sequentially switches between lit and extinguished states of the light-emitting elements in the second light-emitting element array synchronously with the clock signal and
         to determine a time point at which to start the second driving sequence with reference to a time point at which the characteristic of the clock signal received at the second clock terminal is changed.

2. The light emission control system according to claim 1, wherein
   the first light emission control device further includes a first fault detector configured to detect a fault in any of the light-emitting elements in the first light-emitting element array based on a voltage at a connection node between the first light emission control device and each of the light-emitting elements in the first light-emitting element array, and
   the first controller is configured, when the first fault detector detects a fault in any of the light-emitting elements in the first light-emitting element array, to extinguish all the light-emitting elements in the first light-emitting element array with priority over the first driving sequence and hold an electrical potential at the first clock terminal at a predetermined electrical potential.

3. The light emission control system according to claim 2, wherein
   the second controller is configured, when an electrical potential at the second clock terminal is held for a predetermined length of time or longer, to extinguish all the light-emitting elements in the second light-emitting element array with priority over the second driving sequence.

4. The light emission control system according to claim 1, wherein
   the second light emission control device further includes a second fault detector configured to detect a fault in any of the light-emitting elements in the second light-emitting element array based on a voltage at a connection node between the second light emission control device and each of the light-emitting elements in the second light-emitting element array, and
   the second controller is configured, when the second fault detector detects a fault in any of the light-emitting elements in the second light-emitting element array, to extinguish all the light-emitting elements in the second light-emitting element array with priority over the second driving sequence and hold an electrical potential at the second clock terminal at a predetermined electrical potential, and
   the first controller is configured, when an electrical potential at the first clock terminal is held for a predetermined length of time or longer, to extinguish all the light-emitting elements in the first light-emitting element array with priority over the first driving sequence.

5. The light emission control system according to claim 1, wherein
before the fulfillment of the predetermined condition, all the light-emitting elements in the first and second light-emitting element arrays are in the extinguished state,
the first controller is configured, after the fulfillment of the predetermined condition, in the first driving sequence, to sequentially increase a number of light-emitting elements lit in the first light-emitting element array at time intervals synchronous with the clock signal, and
the second controller is configured, in the second driving sequence, to sequentially increase a number of light-emitting elements lit in the second light-emitting element array at time intervals synchronous with the clock signal.

6. The light emission control system according to claim 1, wherein
with the fulfillment of the predetermined condition, the first and second controllers light all the light-emitting elements in the first and second light-emitting element arrays,
the first controller is configured, after the fulfillment of the predetermined condition, in the first driving sequence, to sequentially reduce a number of light-emitting elements lit in the first light-emitting element array at time intervals synchronous with the clock signal, and
the second controller is configured, in the second driving sequence, to sequentially reduce a number of light-emitting elements lit in the second light-emitting element array at time intervals synchronous with the clock signal.

7. The light emission control system according to claim 1, wherein
the characteristic of the clock signal is a duty factor or pulse width of the clock signal.

8. The light emission control system according to claim 1, wherein
the predetermined condition is fulfilled by the light emission control system being supplied with electric power.

9. The light emission control system according to claim 1, wherein
the predetermined condition is fulfilled by the light emission control system starting to be fed with a predetermined signal.

10. The light emission control system according to claim 1, wherein
the first and second light emission control devices are two light emission control devices that share a common configuration,
the two light emission control devices respectively have external terminals for setting,
the two light emission control devices are configured such that feeding different voltages to the respective external terminals for setting of the two light emission control devices causes one of the two light emission control devices to operate as the first light emission control device and the other to operate as the second light emission control device.

11. A light emission system comprising:
a first light-emitting element array including a plurality of light-emitting elements;
a second light-emitting element array including another plurality of light-emitting elements;
a driving current feeder configured to be able to supply each of the light-emitting elements in the first and second light-emitting element arrays with a driving current for lighting it; and
the light emission control system according to claim 1.

12. A light emission control device comprising:
a controller configured to be able to perform control whereby to light or extinguish individually a plurality of light-emitting elements included in a light-emitting element array;
a clock generator configured to be able to generate a clock signal with a variable characteristic; and
a clock terminal,
the light emission control device operating in either a first mode or a second mode,
wherein the controller and the clock generator are configured such that,
in the first mode, in which the clock signal generated by the clock generator is fed to the clock terminal,
the controller, when triggered by fulfillment of a predetermined condition, performs a first driving sequence in which the controller sequentially switches between lit and extinguished states of the light-emitting elements in the light-emitting element array synchronously with the clock signal, and
the clock generator, at a particular time point after a start of the first driving sequence, changes a characteristic of the clock signal from a predetermined first characteristic to a predetermined second characteristic, and
in the second mode, in which the clock generator ceases to feed the clock signal to the clock terminal and another clock signal generated by another light emission control device is received at the clock terminal,
the controller, after a characteristic of the another clock signal received at the clock terminal is changed from the first characteristic to the second characteristic, performs a second driving sequence in which the controller sequentially switches between lit and extinguished states of the light-emitting elements in the light-emitting element array synchronously with the another clock signal, and
determines a time point at which to start the second driving sequence with reference to a time point at which the characteristic of the another clock signal received at the clock terminal is changed.

13. The light emission control device according to claim 12, further comprising a fault detector configured to detect a fault in any of the light-emitting elements in the light-emitting element array based on a voltage at a connection node between the light emission control device and each of the light-emitting elements in the light-emitting element array,
wherein the controller is configured such that,
in the first mode, when the fault detector detects a fault in any of the light-emitting elements in the light-emitting element array, the controller extinguishes all the light-emitting elements in the light-emitting element array with priority over the first driving sequence and holds an electrical potential at the clock terminal at a predetermined electrical potential.

14. The light emission control device according to claim 13, wherein
the controller is configured, in the second mode, when the electrical potential at the clock terminal is held for a predetermined length of time or longer, to extinguish all the light-emitting elements in the light-emitting element array with priority over the second driving sequence.

15. The light emission control device according to claim 12, further comprising a fault detector configured to detect a fault in any of the light-emitting elements in the light-emitting element array based on a voltage at a connection node between the light emission control device and each of the light-emitting elements in the light-emitting element array,
wherein the controller is configured such that,
in the second mode, when the fault detector detects a fault in any of the light-emitting elements in the light-emitting element array, the controller extinguishes all the light-emitting elements in the light-emitting element array with priority over the second driving sequence and holds an electrical potential at the clock terminal at a predetermined electrical potential, and
in the first mode, when the electrical potential at the clock terminal is held for a predetermined length of time or longer, the controller extinguishes all the light-emitting elements in the light-emitting element array with priority over the first driving sequence.

16. The light emission control device according to claim 12, wherein
before the fulfillment of the predetermined condition, all the light-emitting elements in the light-emitting element arrays are in the extinguished state, and
the controller is configured such that,
in the first mode, after the fulfillment of the predetermined condition, in the first driving sequence, the controller sequentially increases a number of light-emitting elements lit in the light-emitting element array at time intervals synchronous with the clock signal, and,
in the second mode, in the second driving sequence, the controller sequentially increases the number of light-emitting elements lit in the light-emitting element array at time intervals synchronous with the another clock signal.

17. The light emission control device according to claim 12, wherein
with the fulfillment of the predetermined condition, the controller light all the light-emitting elements in the light-emitting element array, and
the controller is configured such that,
in the first mode, after the fulfillment of the predetermined condition, in the first driving sequence, the controller sequentially reduces a number of light-emitting elements lit in the light-emitting element array at time intervals synchronous with the clock signal, and,
in the second mode, in the second driving sequence, the controller sequentially reduces the number of light-emitting elements lit in the light-emitting element array at time intervals synchronous with the another clock signal.

18. The light emission control device according to claim 12, wherein
the characteristic of the clock signal is a duty factor or pulse width of the clock signal, and
the characteristic of the another clock signal is a duty factor or pulse width of the another clock signal.

19. The light emission control device according to claim 12, wherein
the predetermined condition is fulfilled by the light emission control device starting to be supplied with electric power.

20. The light emission control device according to claim 12, wherein
the predetermined condition is fulfilled by the light emission control device being fed with a predetermined signal.

21. The light emission control device according to claim 12, further comprising an external terminal for setting,
wherein the light emission control device operates in either of the first and second modes in accordance with a voltage fed to the external terminal for setting.

22. A light emission device comprising:
a light-emitting element array including a plurality of light-emitting elements;
a driving current feeder configured to be able to supply each of the light-emitting elements in the light-emitting element array with a driving current for lighting it; and
the light emission control device according to claim 12.

* * * * *